June 8, 1948.   F. M. CARROLL ET AL   2,442,970
PAPER FEEDING DEVICE
Filed May 3, 1941   29 Sheets-Sheet 1

INVENTORS
BY
ATTORNEY

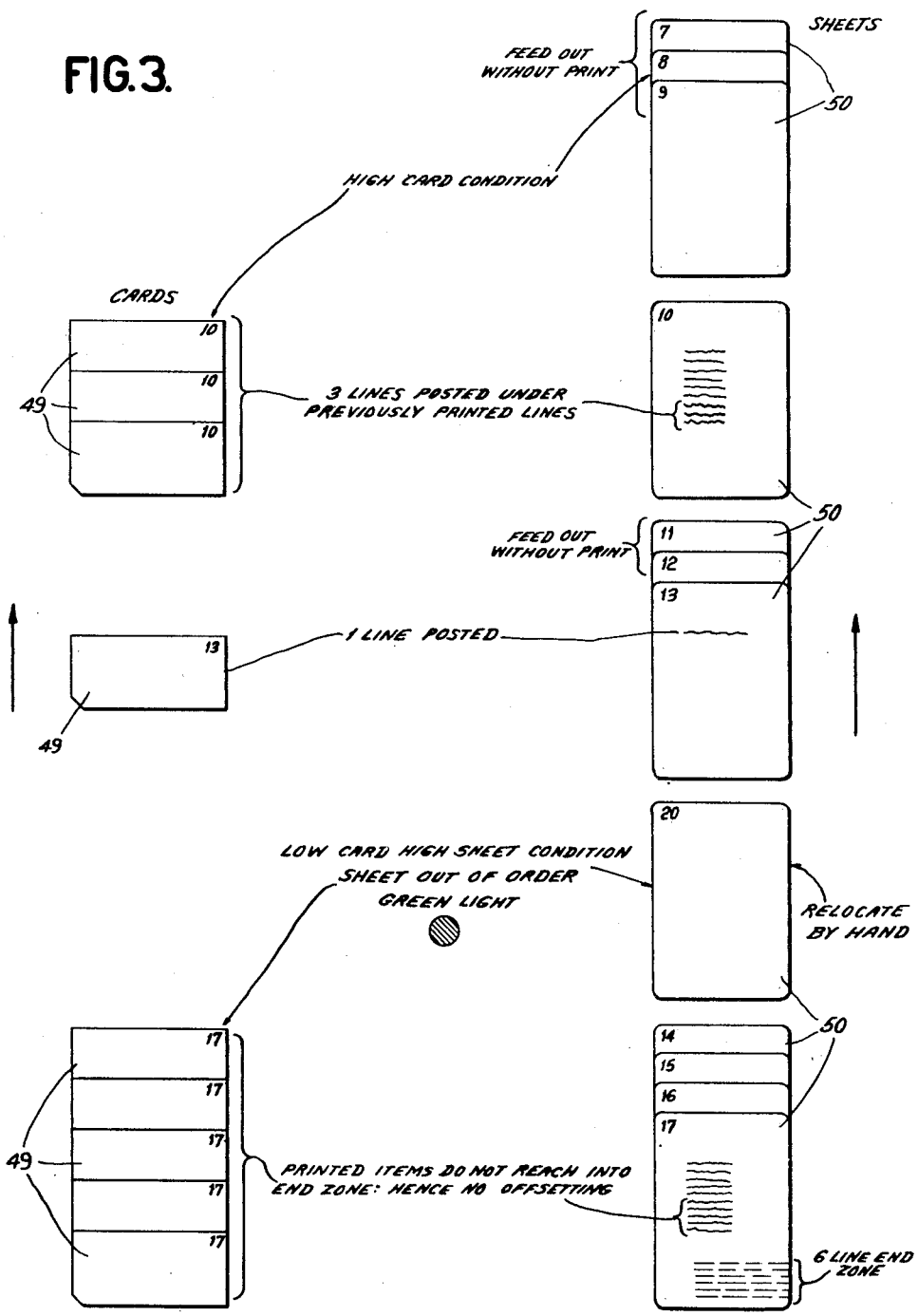

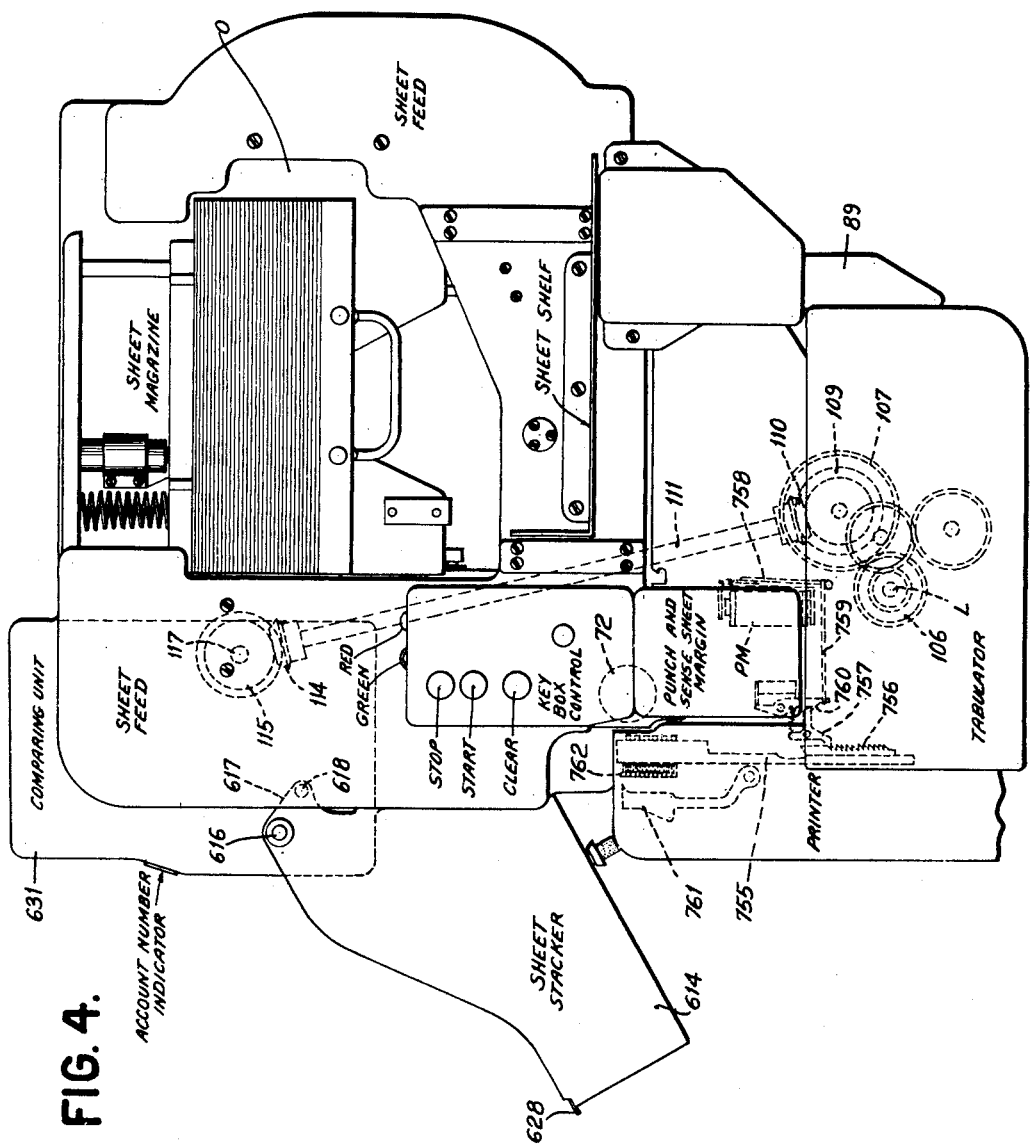

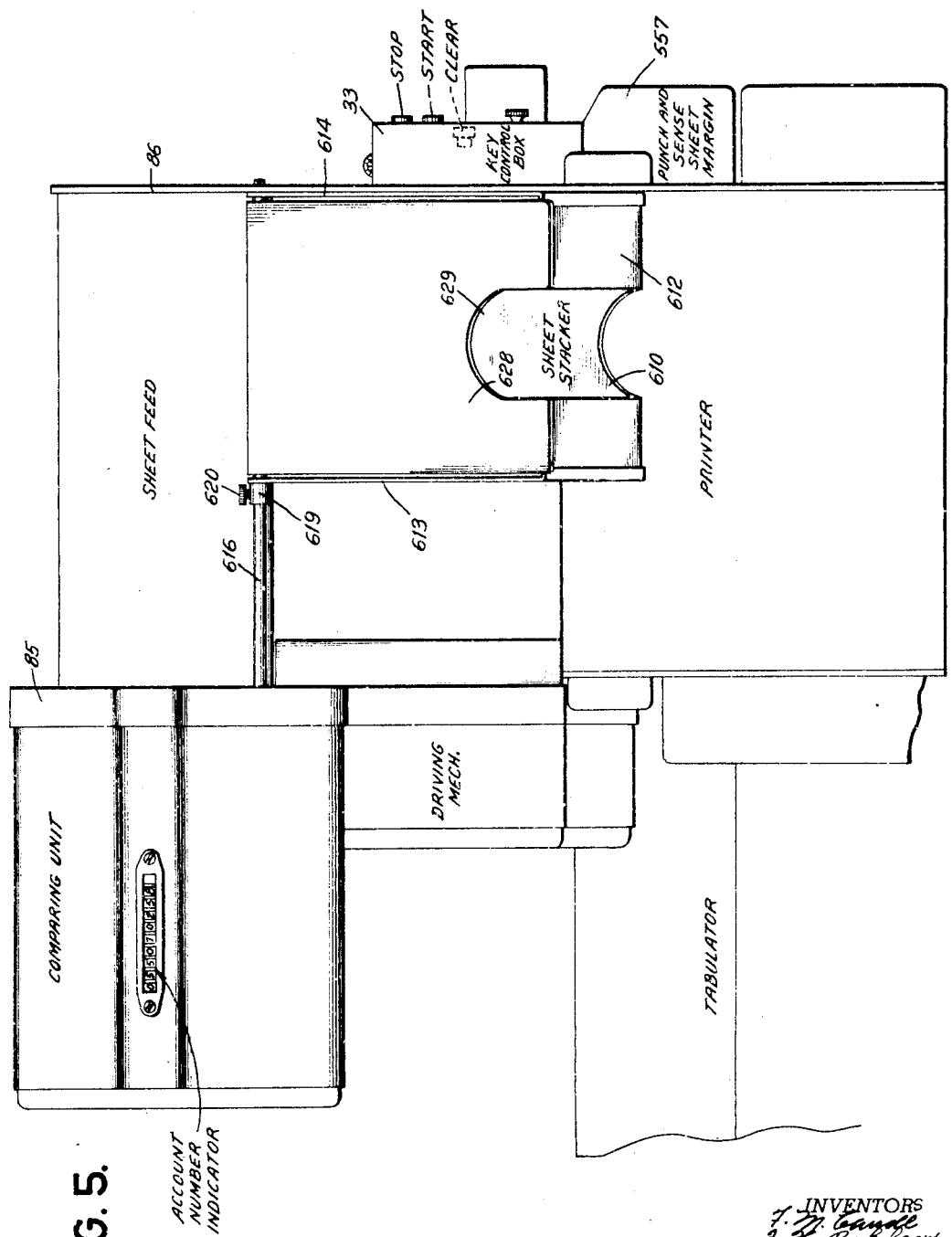

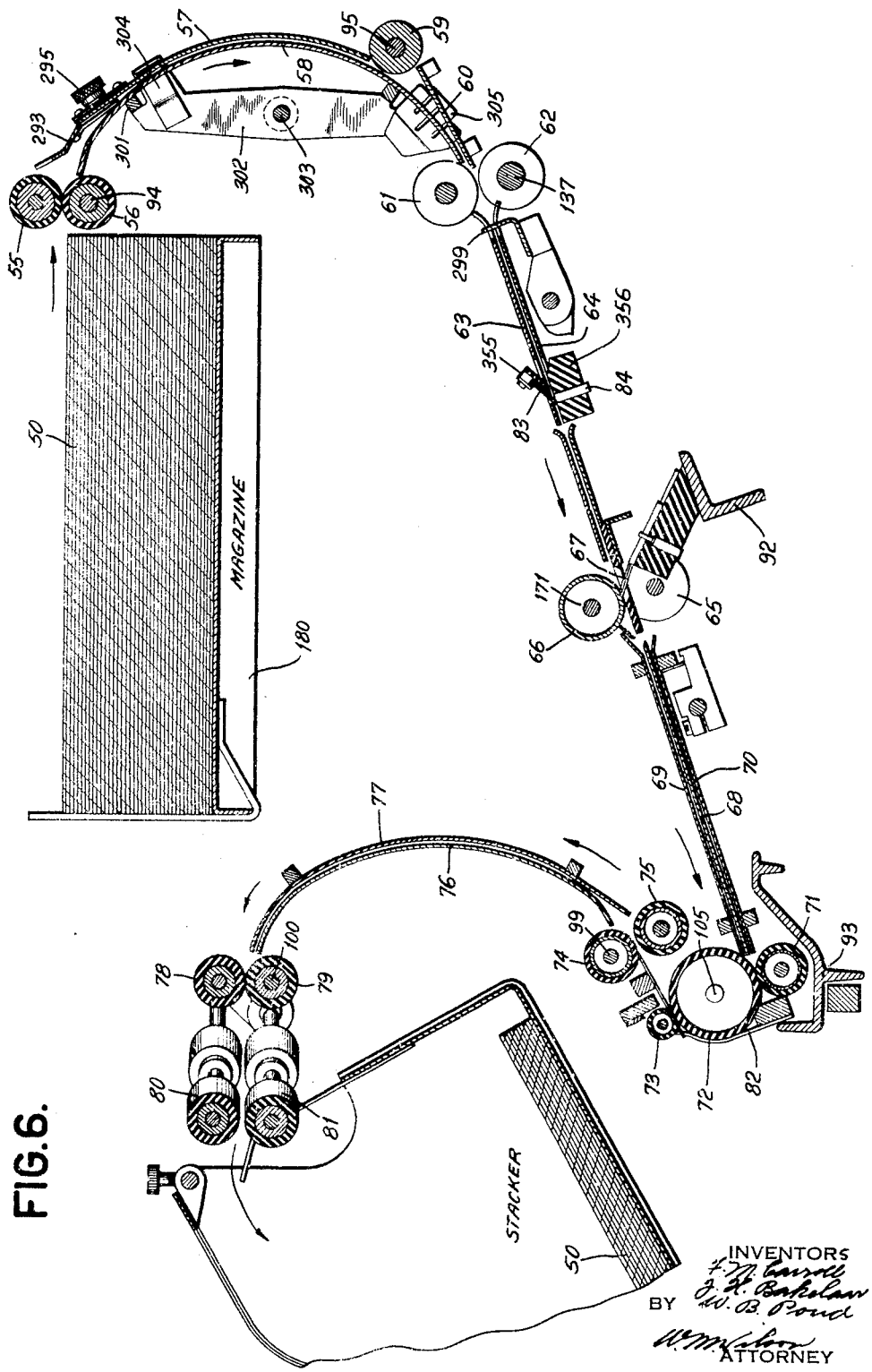

June 8, 1948.  F. M. CARROLL ET AL  2,442,970
PAPER FEEDING DEVICE
Filed May 3, 1941  29 Sheets-Sheet 11
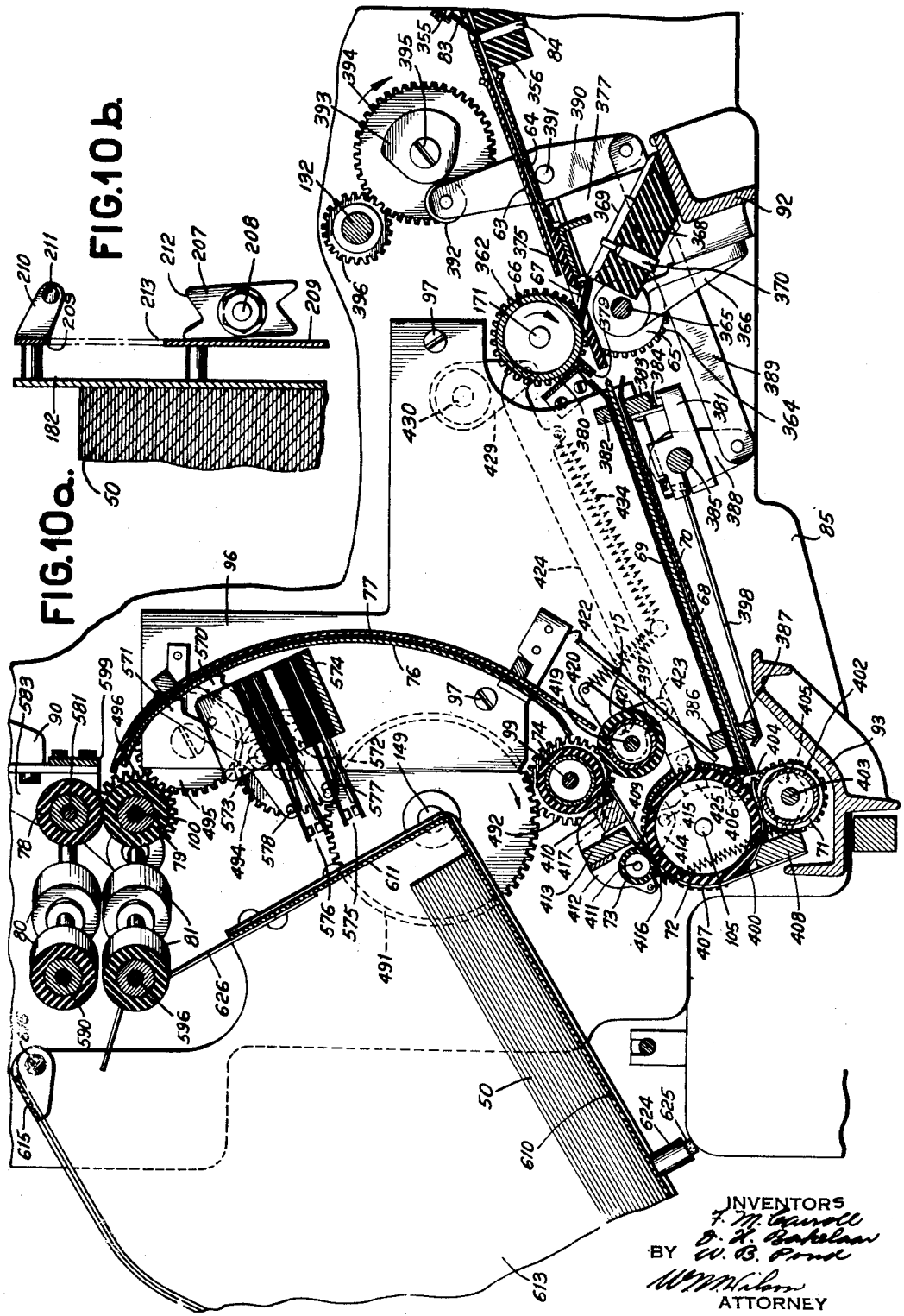

June 8, 1948. F. M. CARROLL ET AL 2,442,970
PAPER FEEDING DEVICE
Filed May 3, 1941 29 Sheets-Sheet 12

INVENTORS
F. M. Carroll
BY
ATTORNEY

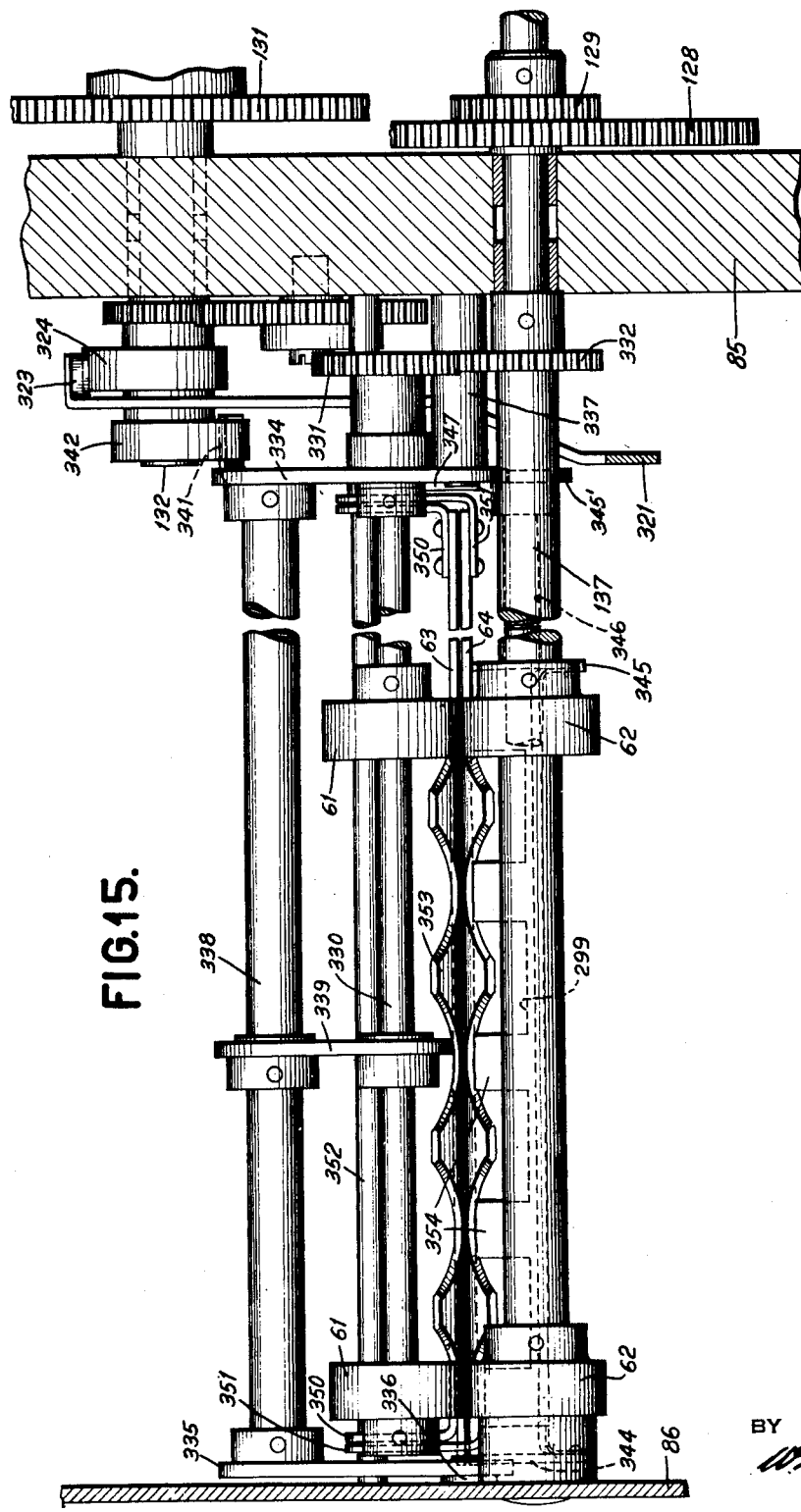

June 8, 1948.   F. M. CARROLL ET AL   2,442,970
PAPER FEEDING DEVICE
Filed May 3, 1941   29 Sheets-Sheet 15
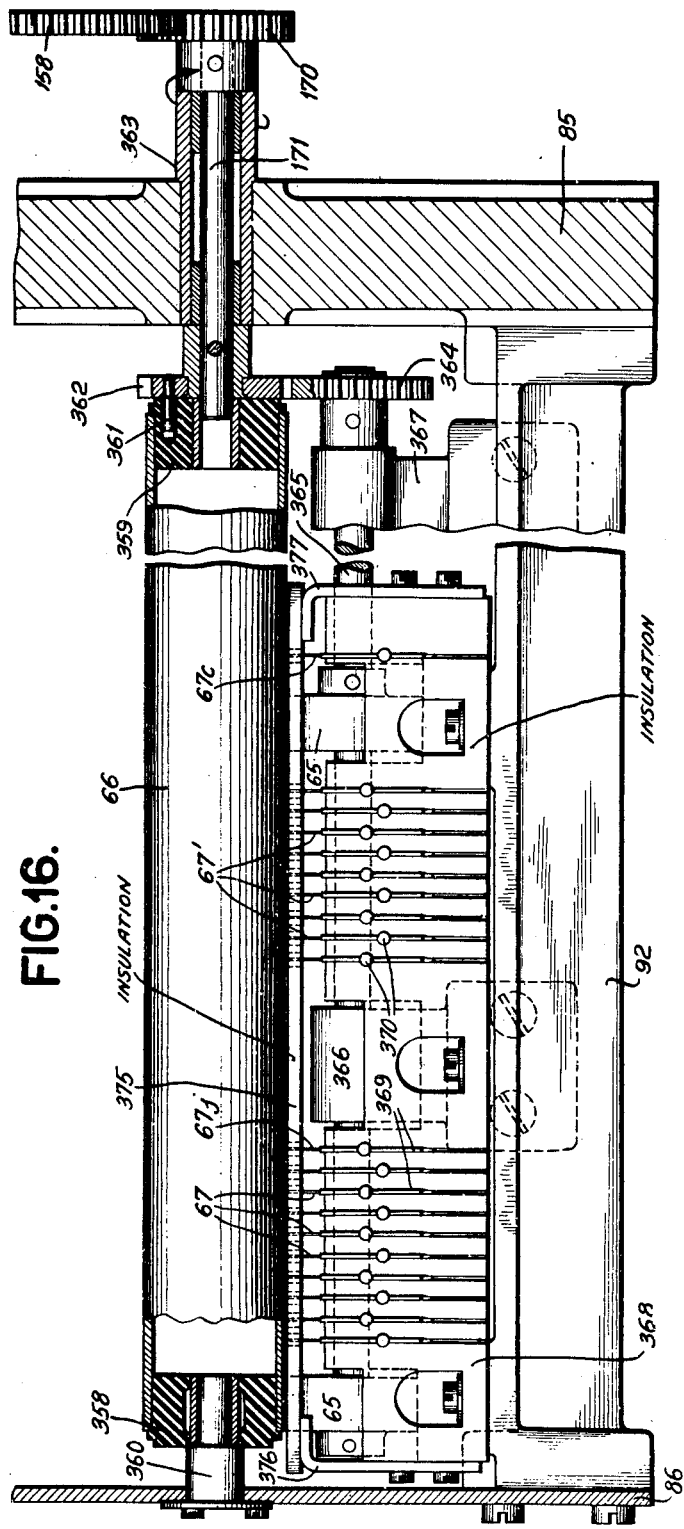
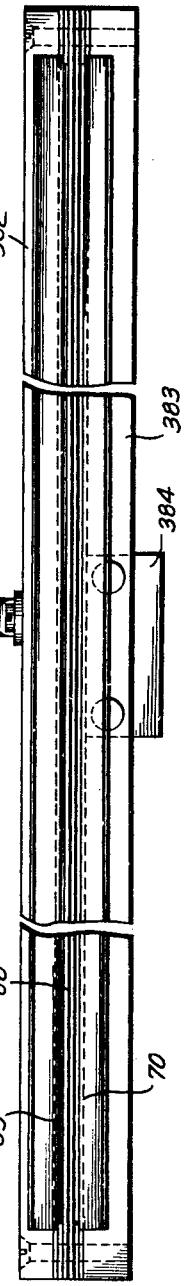

June 8, 1948.  F. M. CARROLL ET AL  2,442,970
PAPER FEEDING DEVICE

Filed May 3, 1941  29 Sheets-Sheet 16

INVENTORS
F. M. Carroll
J. H. Bakelaar
W. B. Pond
BY W. M. Wilson
ATTORNEY

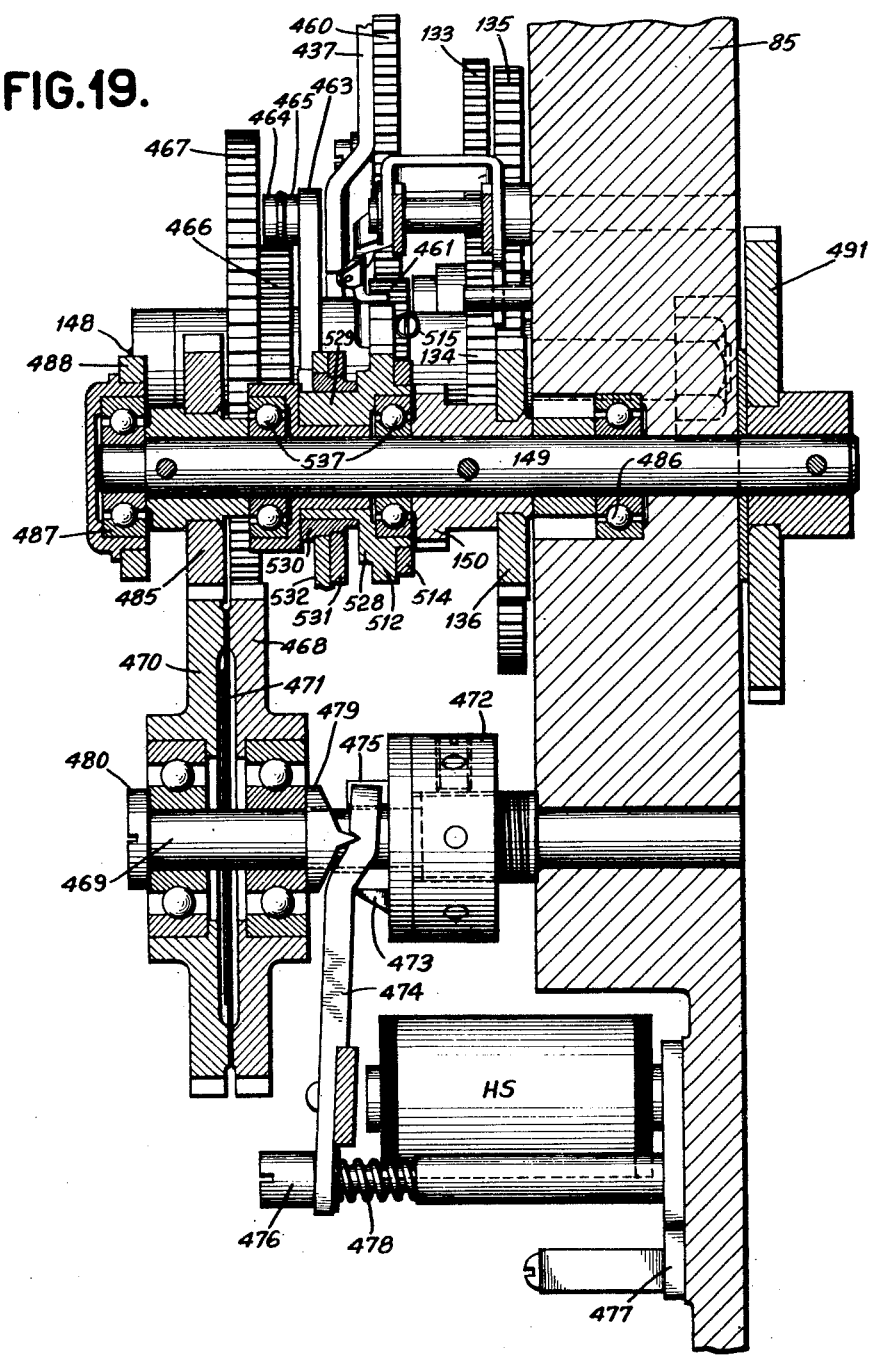

June 8, 1948.  F. M. CARROLL ET AL  2,442,970
PAPER FEEDING DEVICE
Filed May 3, 1941  29 Sheets-Sheet 18
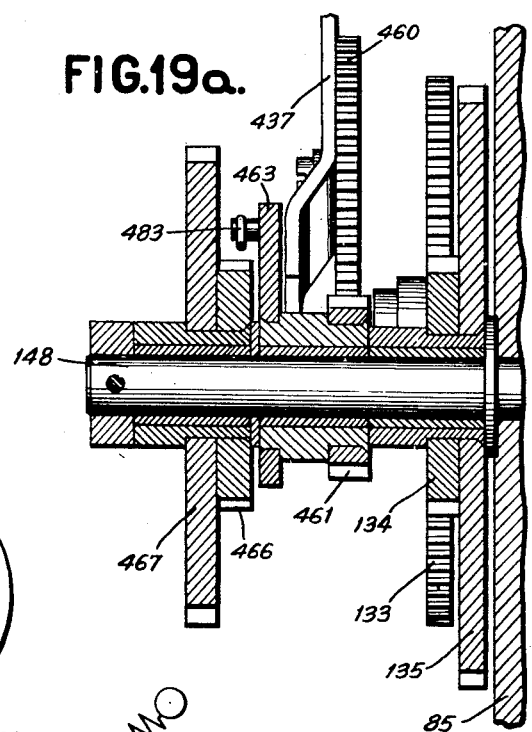
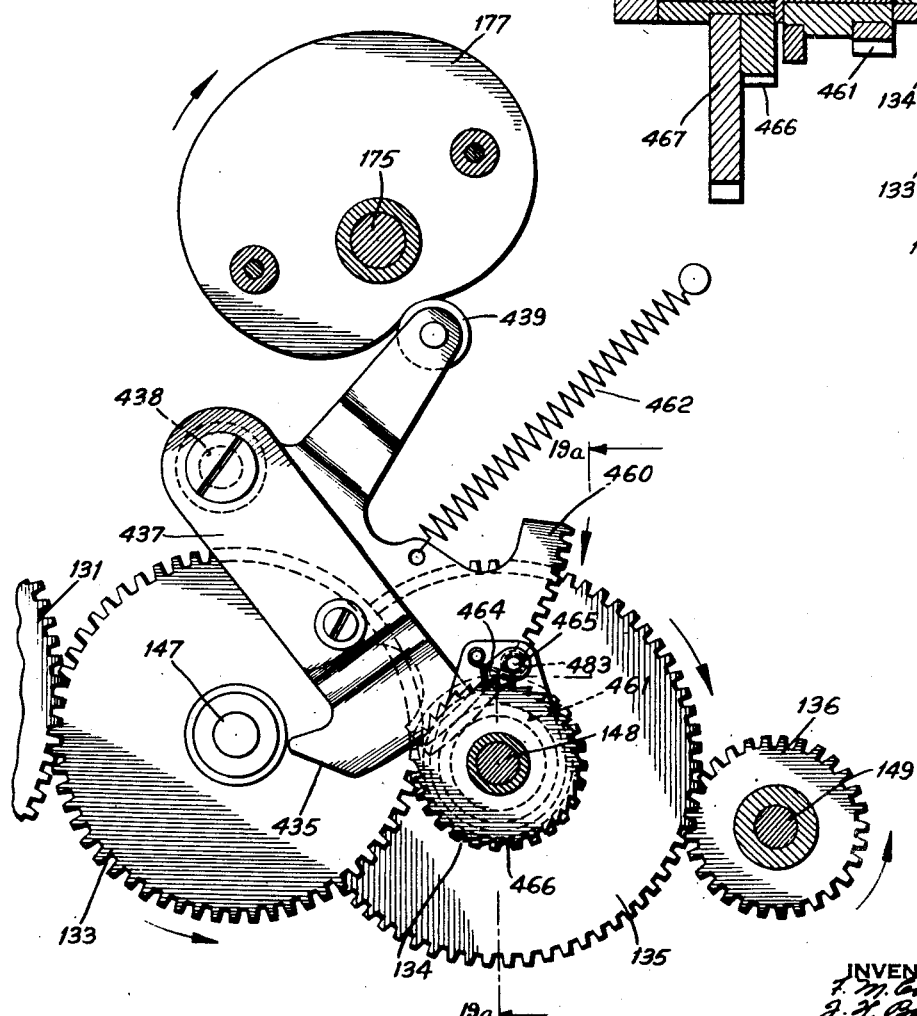
INVENTORS
F. M. Carroll
J. X. Bakelaar
W. B. Pond
BY
W. M. Wilson
ATTORNEY June 8, 1948.　　　F. M. CARROLL ET AL　　　2,442,970
PAPER FEEDING DEVICE Filed May 3, 1941　　　　　　　　　　　29 Sheets-Sheet 20

INVENTORS
F. M. Carroll
J. X. Bakelaar
W. D. Pond
BY
ATTORNEY

June 8, 1948.　　　F. M. CARROLL ET AL　　　2,442,970
PAPER FEEDING DEVICE
Filed May 3, 1941　　　　　　　　　　　　　29 Sheets-Sheet 21

June 8, 1948.  F. M. CARROLL ET AL  2,442,970
PAPER FEEDING DEVICE
Filed May 3, 1941
29 Sheets-Sheet 23

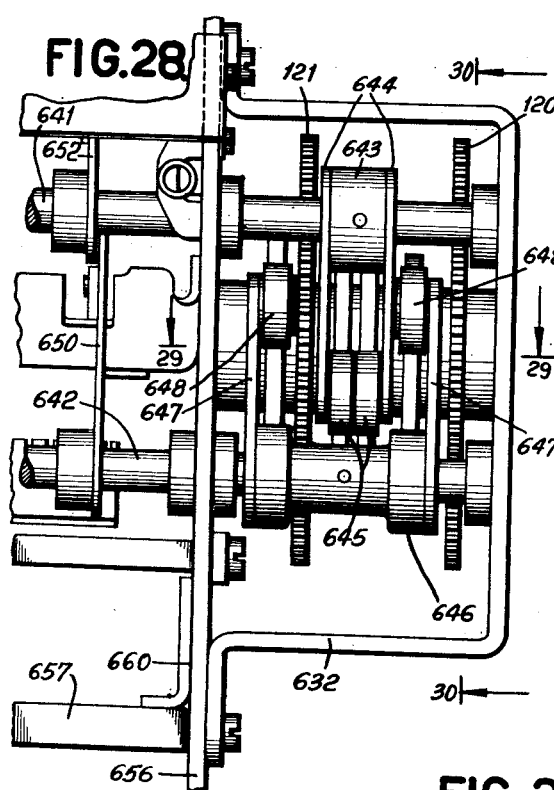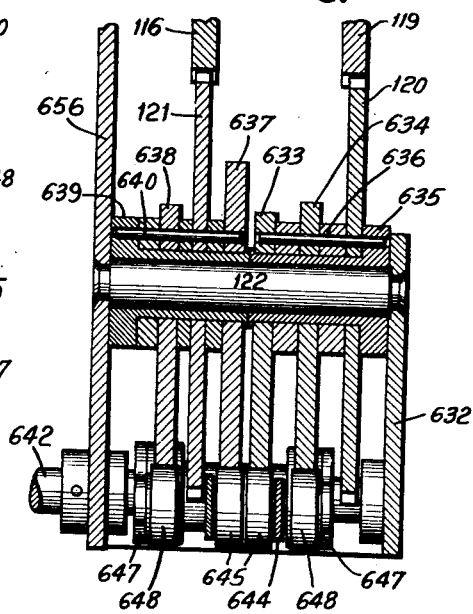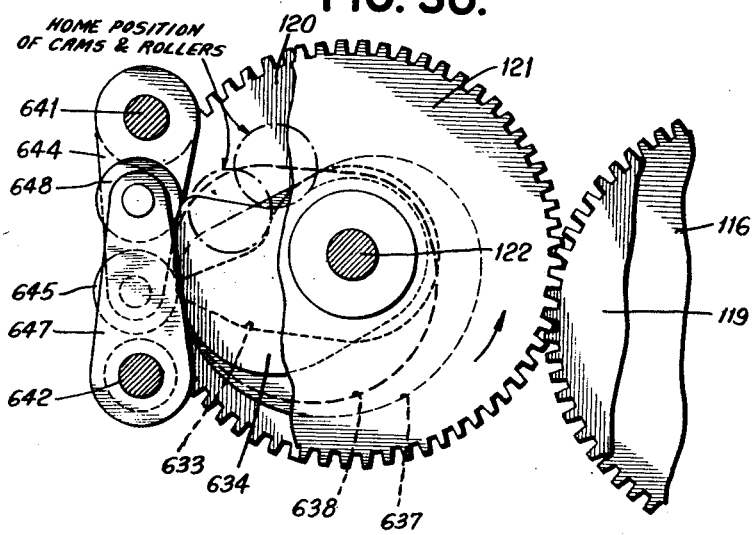

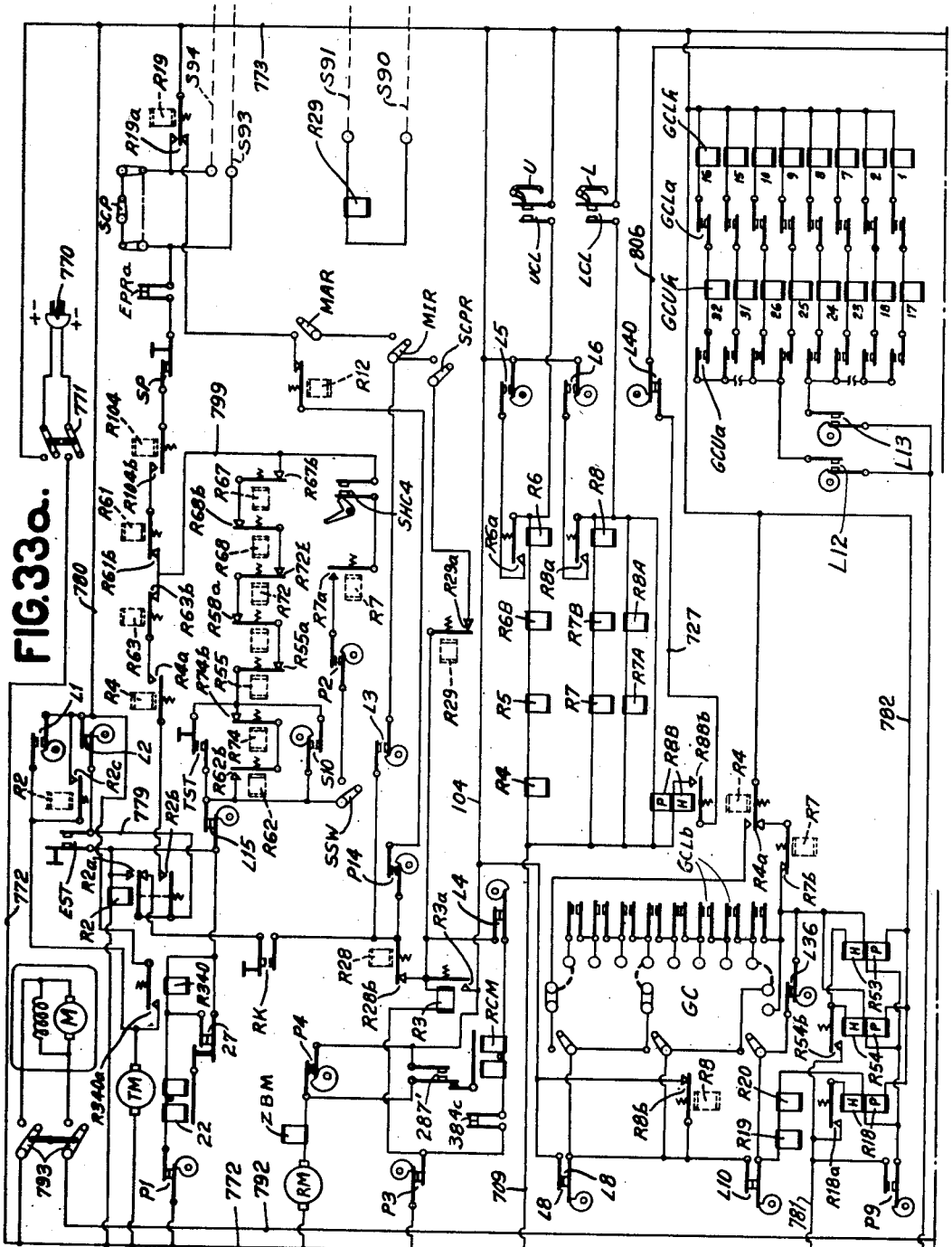

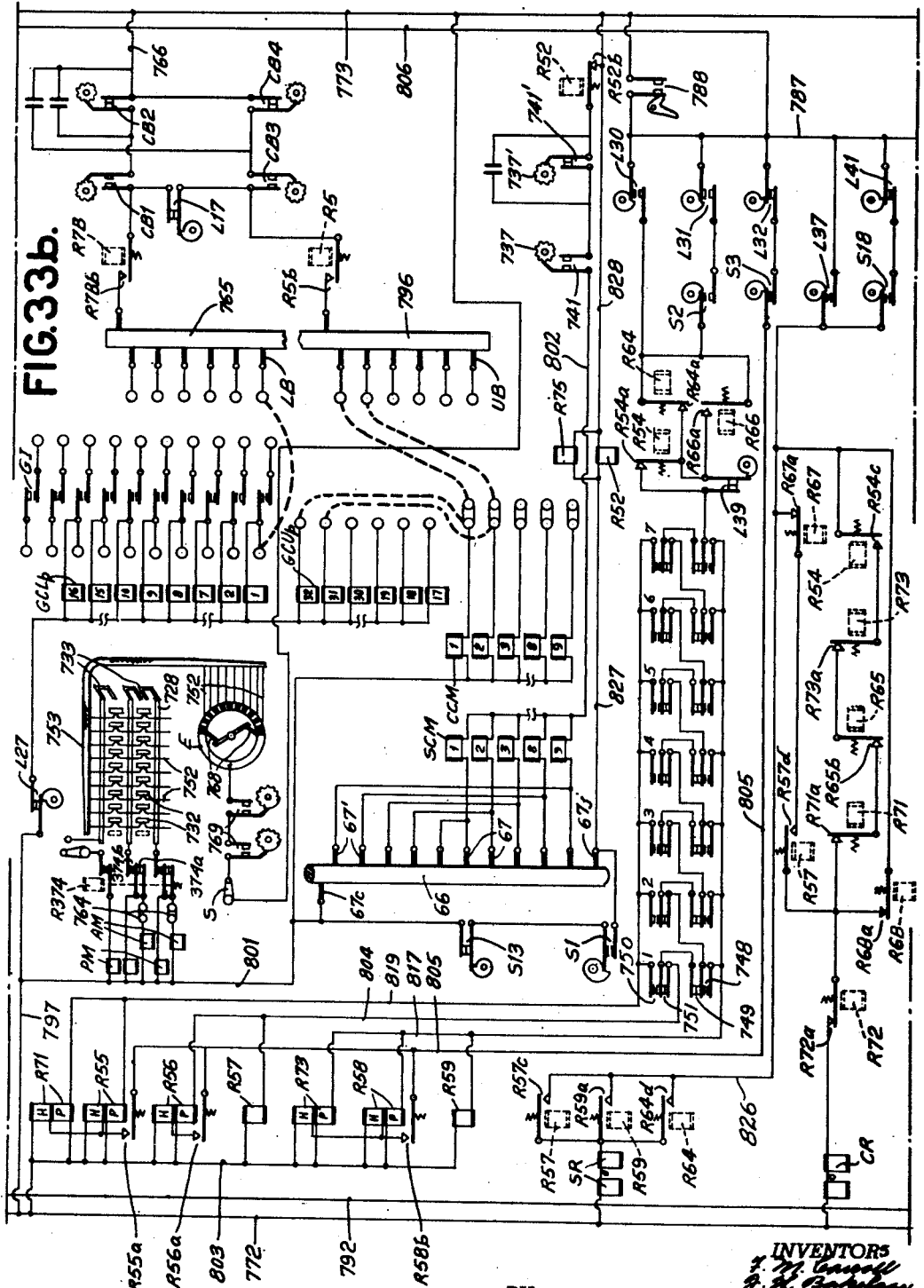

June 8, 1948.  F. M. CARROLL ET AL  2,442,970
PAPER FEEDING DEVICE

Filed May 3, 1941  29 Sheets-Sheet 28

FIG. 33c.

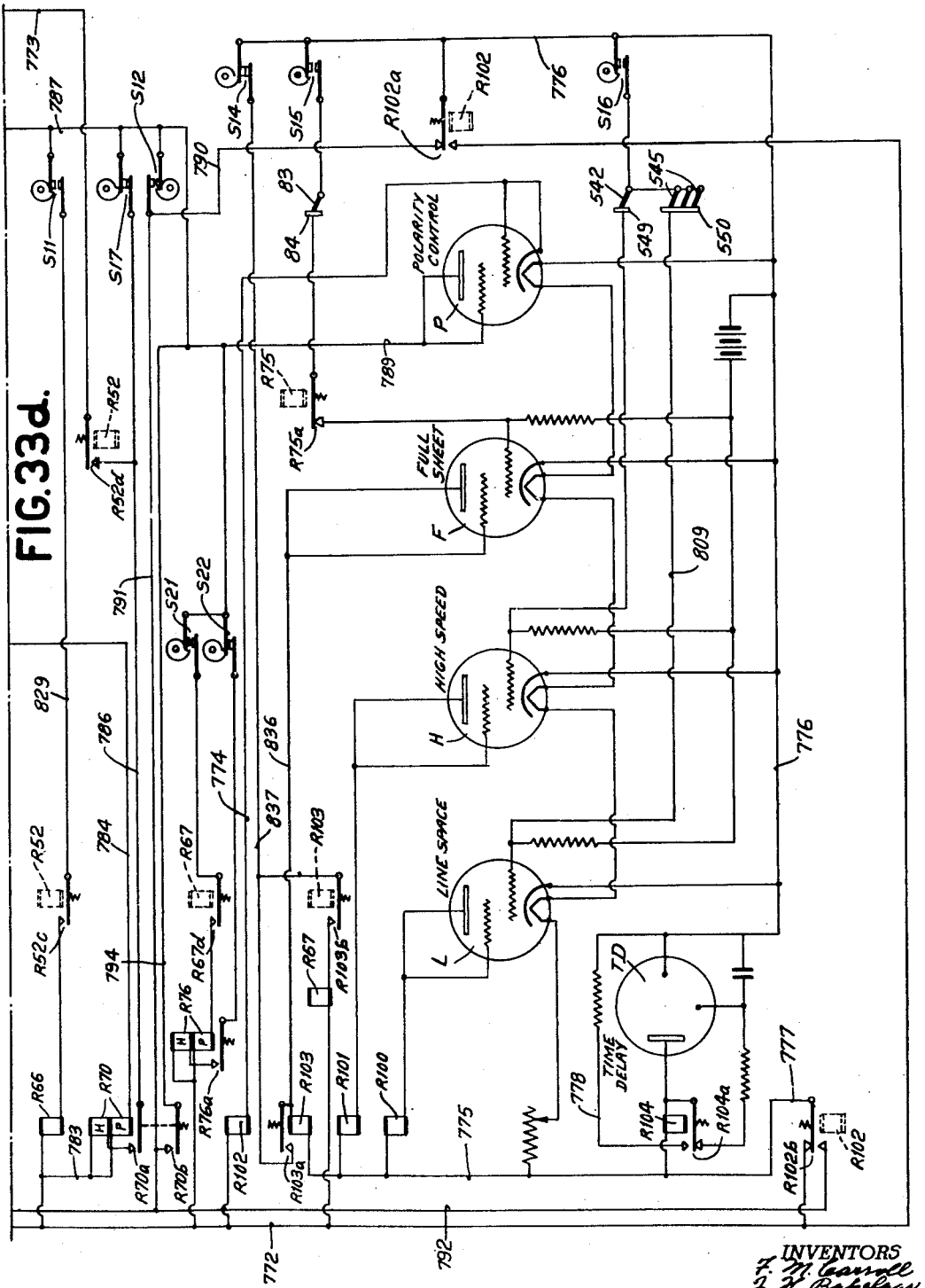

Patented June 8, 1948

2,442,970

UNITED STATES PATENT OFFICE 2,422,970

PAPER FEEDING DEVICE

Fred M. Carroll and John H. Bakelaar, Binghamton, and William B. Pond, Endicott, N. Y., assignors to International Business Machines Corporation, New York, N. Y., a corporation of New York Application May 3, 1941, Serial No. 391,732

27 Claims. (Cl. 235—61.7)

1

This invention relates generally to paper feeding devices and more particularly to machines of the class in which perforated record cards control the preparation of ledger sheets.

The main object of the invention is to provide a posting mechanism for tabulating machines or other office appliances in which provision is made for feeding classified ledger sheets past a printing station and stopping certain of the sheets in posting positions for receiving items of data of the same account or classification. The invention is illustrated as applied to a tabulating machine of the kind disclosed in Patent 1,-976,617 in which the usual perforated record cards are fed through the machine and the perforated data thereon analyzed and used to control the operation of accumulating and printing mechanism. Ledger sheets perforated to represent classification data are fed through the posting mechanism concurrently with the feeding of record cards through the tabulating machine. The data of the cards is compared with the classification data on the sheets and, if they are in agreement, posting takes place on the first blank line beneath previously printed lines, all recording being performed under control of the perforations in the record cards. The ledger sheet is provided with a plurality of lines in which item printing is to be effective, and along the margin of the sheet a perforation is cut to represent the entry made on the corresponding printing line. Feed stopping controls are provided to sense the number of marginal perforations to determine on which line of the ledger sheet the next entry is to be made. The field of classification data and the marginal area allotted for the feed control perforations are arranged symmetrically on the sheet, so that after one side is filled with items the sheet may be turned over to receive a like number of items on the other side.

The record cards are arranged in groups from which they are fed in succession through the tabulating machine. The ledger sheets, of which there should be one for each group of cards, are sent through the posting device and upon agreement of the classification data of the first card of a group with the corresponding data on the ledger sheet further long feeding of the latter is interrupted, and successive entries are made thereon under control of one or more of the cards in the group. The ledger sheet is advanced line by line to receive each entry on a different printing line.

Another object of the invention is the provision

2 of comparing devices with high and low controls for determining the relationship between the account numbers of groups of cards and ledger sheets as they appear under correlated sensing devices. When the account number of a card group is greater than the account number of the sheets, the feeding of the cards is suspended while the feeding of the sheets is maintained to carry them past the printing devices without the reception of any entries. Feeding is allowed to continue until there is an equal comparison indicating that the ledger sheet related to the card group is approaching the position wherein it can receive the items of data represented on the cards. The third variation of the control exercised by the comparing unit is brought into play when the account number on the ledger sheet is found to be greater than the number on the cards. This is an indication that the sheet is out of place and the machine is stopped, so that the operator can remove the sheet and put it where it belongs. An indication in the form of a green light is flashed at the same time that the machine is stopped to indicate to the operator the reason for the failure to continue.

An object of the invention is to place the operation and restoration of the comparing unit under control of the group control devices of the tabulator and also make the unit responsive to dual control; i. e., control from the sheet feeding devices as well as from the tabulator.

Another object of the invention is the provision of devices for detecting when the lines of printing are approaching the end of the sheet and also to detect when a full sheet is presented to receive additional items. A number of lines at the end of the ledger sheet are designated as an "end zone" into which items of a group are permitted to be printed, but after such a run it is advisable that the operator should turn the sheet over or remove it and substitute a blank sheet bearing the same classification designations. However, in the event that the operator fails to add a new sheet or fails to remove the old sheet or fails to do both, the controls are designed to be effective under all conditions. When the full sheet is not followed by another sheet with the same account number, the controls are exercised to stop the machine and flash red and green warning lights to inform the operator that an additional ledger sheet must be inserted manually to take other items.

In other cases, when the full sheet is followed by a related blank sheet inserted before automatic operation, the machine does not stop upon the appearance of a full sheet but flashes the red signal and continues in operation to place the overflow items on the second sheet. Controls are also provided to permit the insertion of a blank sheet without account number perforations. This is done to expedite machine operation and then later punch the sheet.

Another condition is encountered when the number of cards in a group is greater than the number of lines available at the end of a sheet. Then printing continues until there is only one line left at the bottom of the sheet, and the machine is then stopped and the red light is flashed to call the operator's attention to the need for a manually inserted sheet to take the remaining items of the account.

Another object of the invention is the provision of offset feeding controls for directing certain of the sheets to one side when they are thrown into the stacker. The offset feeding devices are operated under control of the end zone and full sheet sensing controls so that, after items are printed near the bottom of a sheet, the sheet is ejected at an angle to the usual direct line of ejection. This causes all full sheets to project out of one side of the pile of sheets in the stacker.

Another object of the invention is the provision of aligning devices for cooperating with the sides of the ledger sheet to insure that it enters the classification sensing devices with the perforations aligned with respect to the sensing brushes. A double set of sheet sensing brushes are provided in order that a sheet may be handled with either face uppermost. The two sets of brushes are arranged symmetrically with respect to the area on the record material containing the perforations, so that the sheet may be reversed in position to receive printing impressions on either surface and at the same time have one or the other of the sensing devices analyze the perforation area appearing in either of two positions.

Another feature of the invention is the provision of a movable sheet guide with two alternately receptive channels. This guide provides a means whereby the sheets may assume an overlapping condition during the continuous successive presentation of such sheets. In other words, while a leading sheet is presented at the platen to receive lines of data, the second sheet may pass through the classification sensing means and approach the platen through the second path in the guide without interfering with the bottom of the first sheet over which it is passing.

A number of novel interlocks are provided to control the starting and stopping of tabulating and sheet feeding operations according to the condition of the comparing unit, the sensing of full sheets and the detection of a jam. If the sheets jam, they are retarded at the sheet sensing brushes and relays are operated to suspend feed operation and suspend energization of the amplifying tubes used with the sheet detecting brushes. A clearing key is provided to operate the sheet feeding devices independent of all restraints except the disconnection due to a jam of the sheets.

A feature of the invention is the provision of a common operating device for controlling platen pressure rollers and sheet ejection rollers. When the ejection rollers are closed to pass out a sheet, the pressure rollers are lifted to permit the threading of a succeeding sheet around the platen. Then, when the pressure rollers are dropped to grasp the sheet for feeding and line spacing, the ejection rollers are separated.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a view showing both sides of a ledger sheet relating to account 055 07 0258. It may be noted that the sheet is perforated with feed control perforations in both side margins and that the one marginal edge is filled with feed control perforations. This is an indication that the sheet has been used to receive printing impressions on both sides, the number of impressions on the second side being indicated by the number of marginal perforations in the right margin as viewed from the rear.

Fig. 2 is a view showing one of the record cards relating to the same account. The amount represented on the card is to be printed on the sheet shown in Fig. 1.

Figs. 3 and 3a together form a diagrammatic showing of the relationship between related and unrelated cards and sheets. The various conditions encountered because of misplaced sheets, the appearance of overflow conditions and the presence of full sheets are illustrated diagrammatically.

Fig. 4 is a side elevation view of the card sheet handling unit and the adjacent printing device of the tabulator.

Fig. 5 is a front elevation view showing all the units of the feeding devices assembled above the tabulator.

Fig. 6 is a diagrammatic side elevation view showing the path taken by the ledger sheets in moving from the magazine, past the platen and into the stacker.

Figure 10:
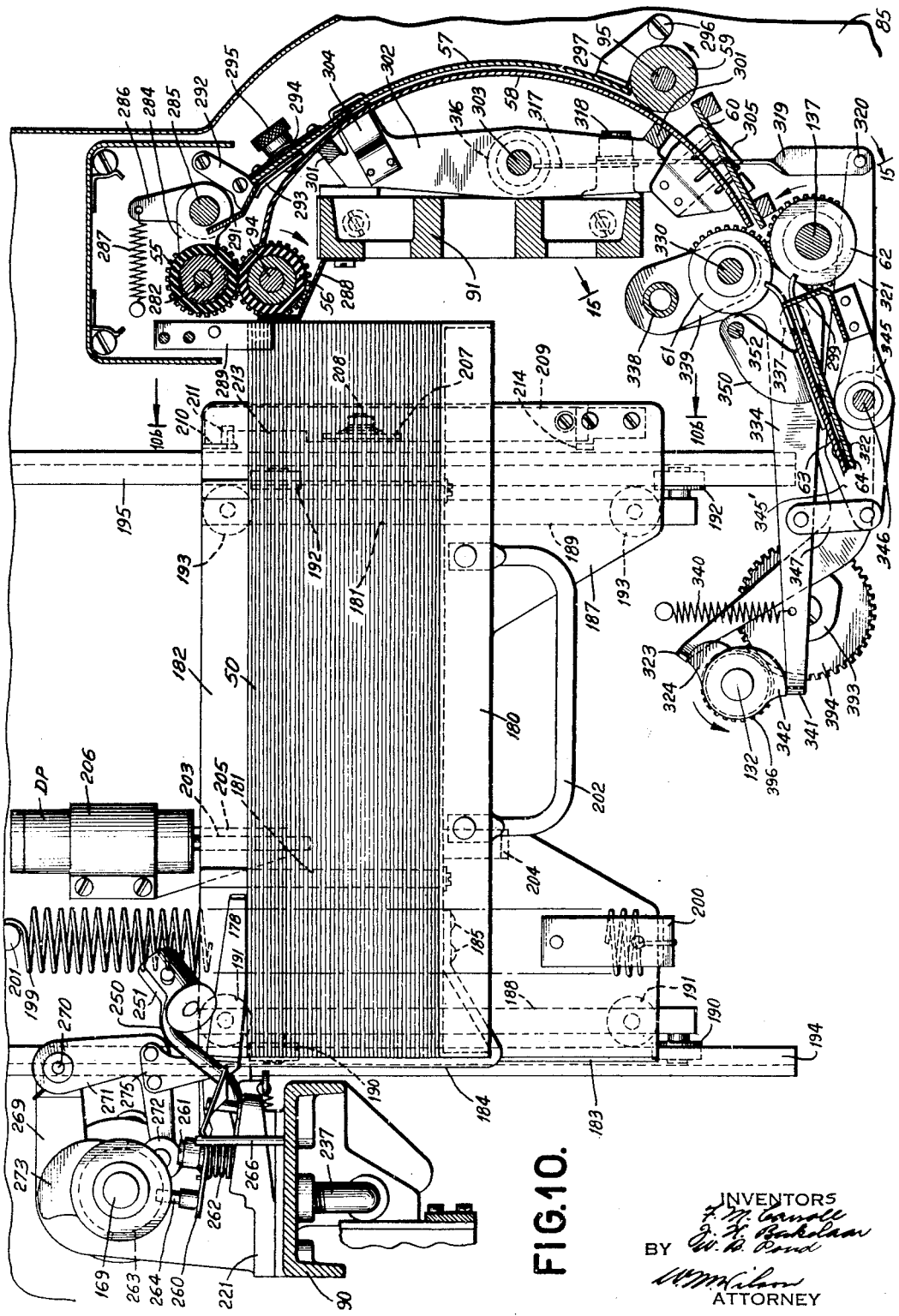

Figs. 10 and 10a when taken together illustrate a cross-section of the guides and feed rollers arranged along the path of the sheets to guide them and control their movement from the magazine to the stacker.

Fig. 10b is a detail view of a section taken along line 10b—10b in Fig. 10 and showing the locking device cooperating with the magazine tray.

Figure 11:
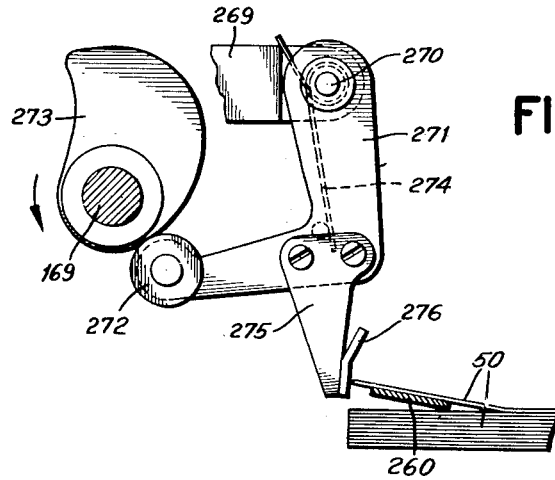

Fig. 11 is a detail view of the sheet pushing device for advancing the upper sheet into the bite of the first set of feed rollers.

Figure 12:
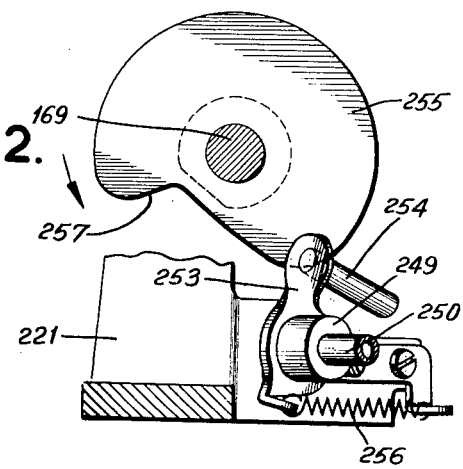

Fig. 12 shows the cam and associated controls for operating the suction devices which serve to lift the corner of the top sheet.

Figure 13:
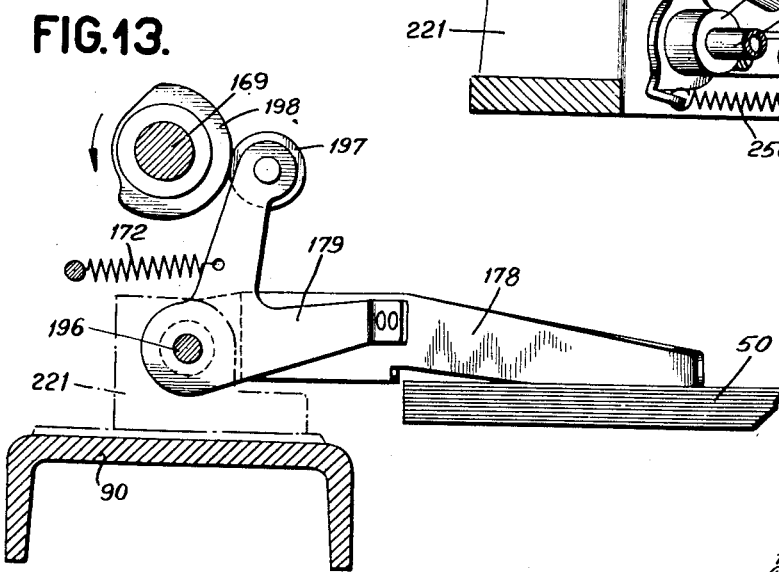

Fig. 13 is a detail view of the sheet depressing member used to hold the sheets down in the magazine while the corner of the upper sheet is lifted.

Figure 14:
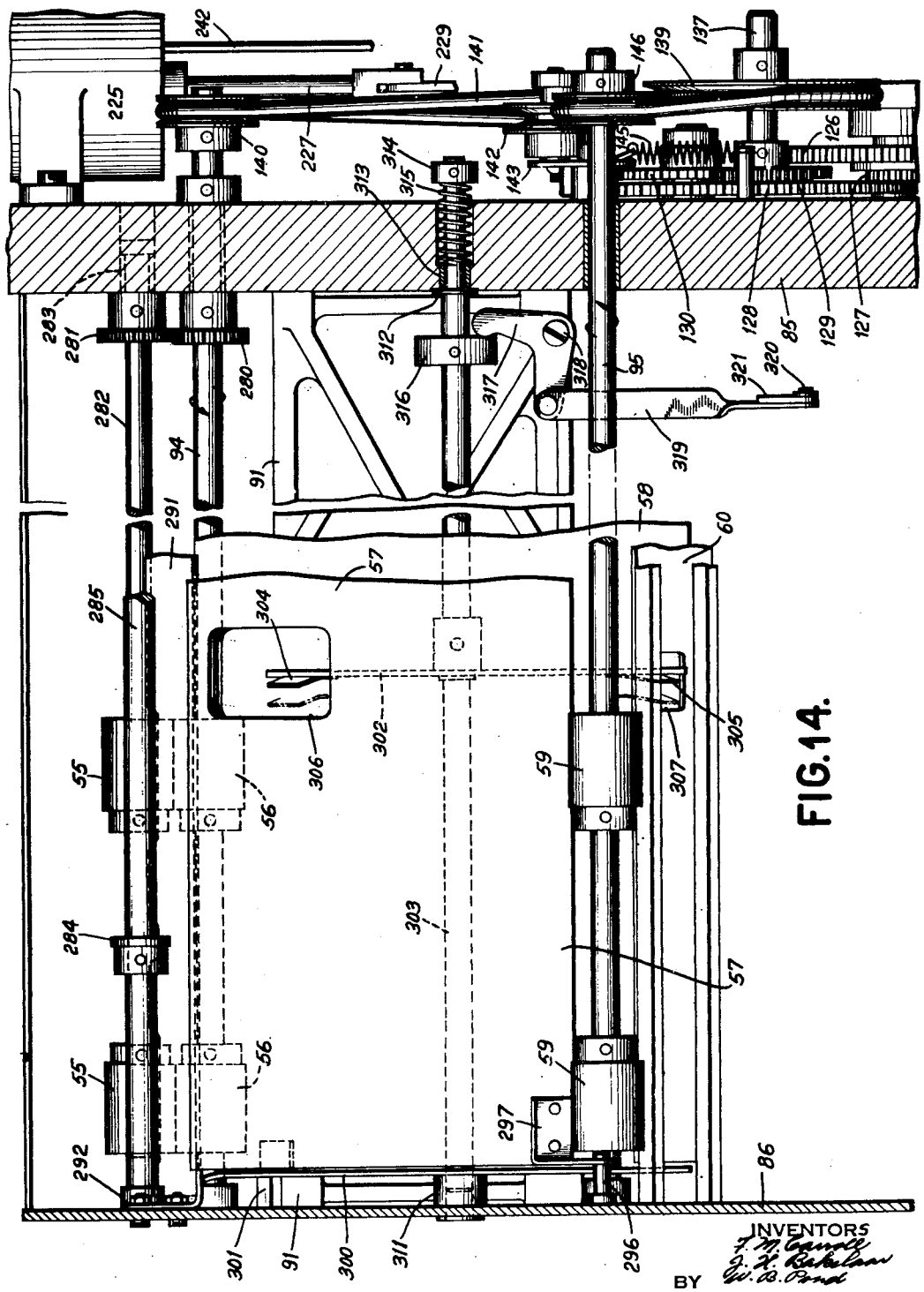

Fig. 14 is a rear elevation view partly in section showing the sheet aligning devices and the drive connections to the sheet feeding rollers.

Fig. 15 is a rear elevation view partly in section taken along the lines 15—15 in Fig. 10 and showing the intermediate set of sheet feeding rollers. This view also shows the sheet gate or stop for limiting the initial movement of each sheet as it is drawn out of the magazine.

Fig. 16 is an elevation view of the sheet sensing devices for reading the account number perforations appearing in the ledger sheets. It is noted that the sensing brushes are duplicated and arranged symmetrically to sense both sides of the sheet.

Fig. 16a is an end view of the double channel guide leading the sheets up to the platen.

Figure 17:
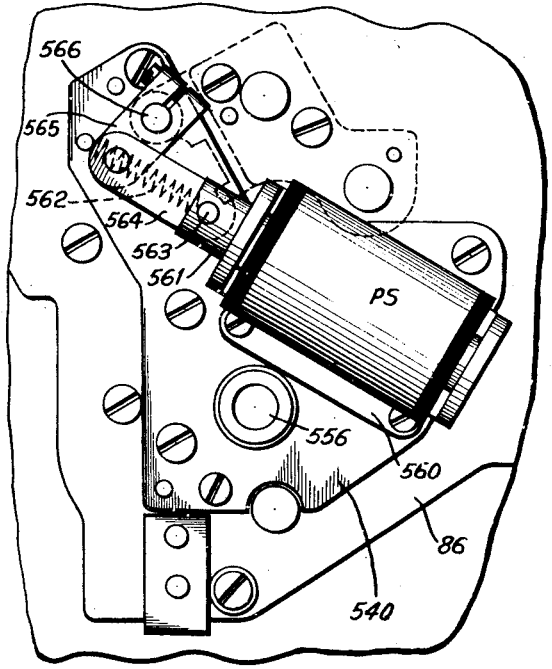

Fig. 17 is an elevation view of the punch control solenoid for cutting the marginal feed control perforations in the ledger sheet.

Figure 18:
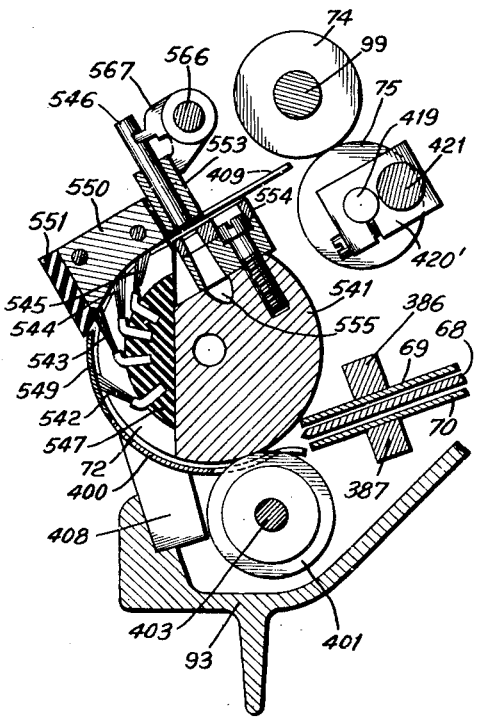

Fig. 18 is a sectional view taken along line 18—18 (Fig. 8) through the punch die. It also shows the line space and high speed feed control brushes which cooperate with the marginal perforations in the sheet.

Figure 7:
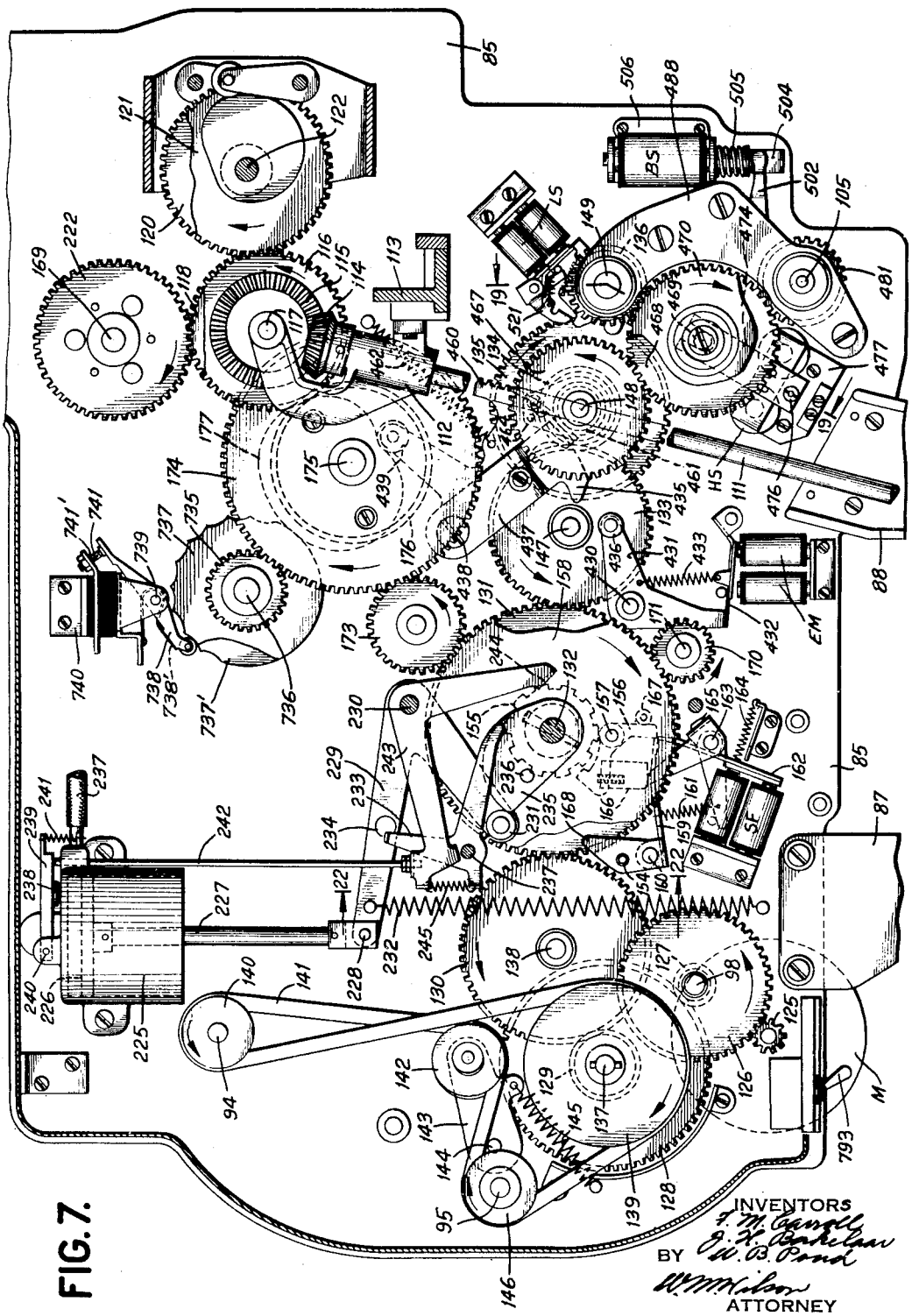
Fig. 7 is a side elevation view partly in section taken along line 7—7 in Fig. 9 and disclosing the driving connections of the feeding devices and the drive connection from the tabulator listing control shaft.

Fig. 19 is a sectional view taken along line 19—19 of Fig. 7 and illustrating the line spacing and high speed drive connections to the platen.

Fig. 19a is a detailed sectional view along line 19a—19a in Fig. 19b through the head spacing drive.

Fig. 19b is a detail side elevation view of the head space operating cam and ratchet drive connections.

Figure 20:
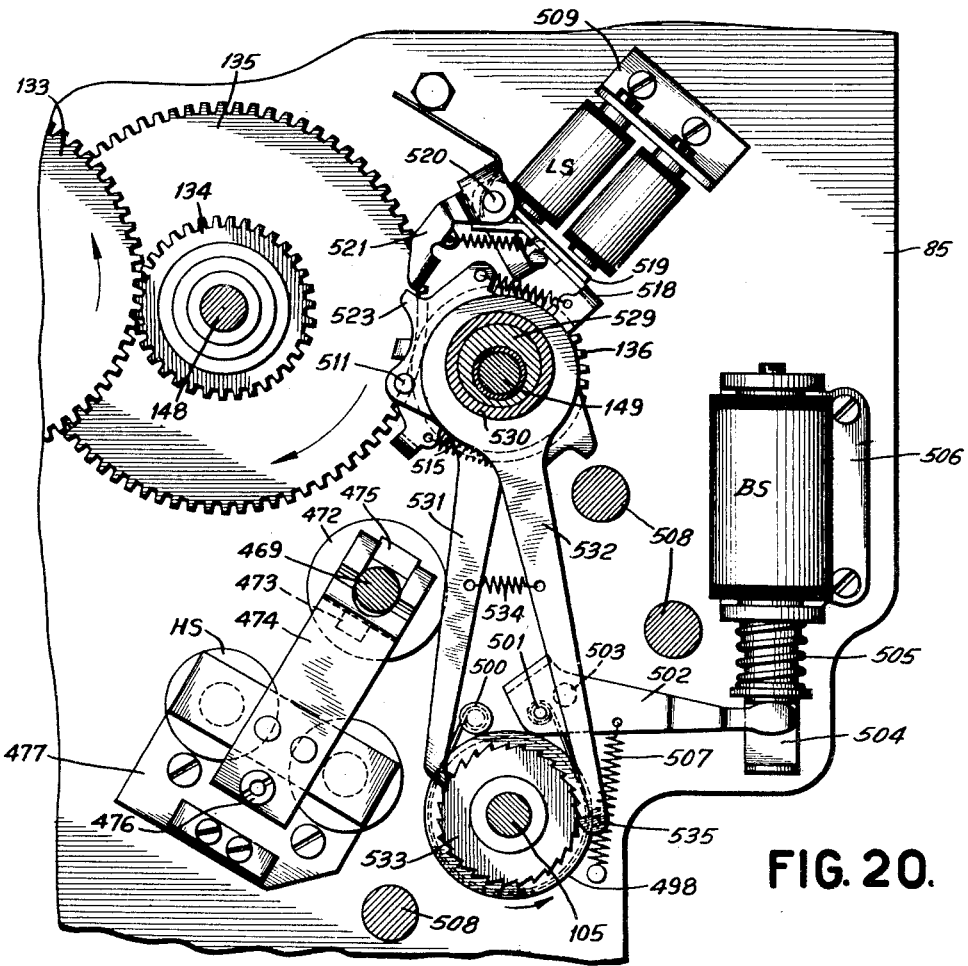

Fig. 20 is a side elevation view of the line spacing devices.

Figure 21:
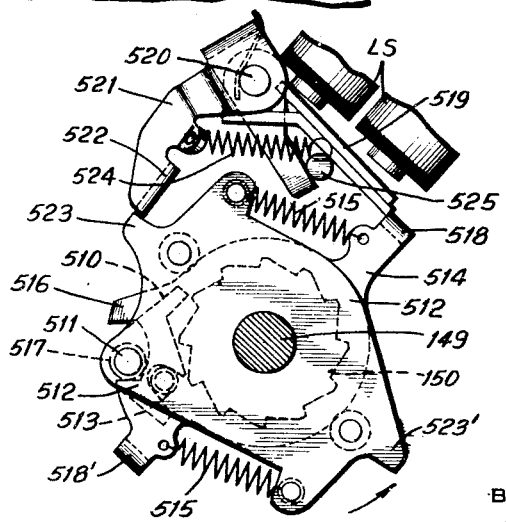

Fig. 21 is an elevation view of the half revolution clutch devices for operating the line spacing mechanism.

Figure 22:
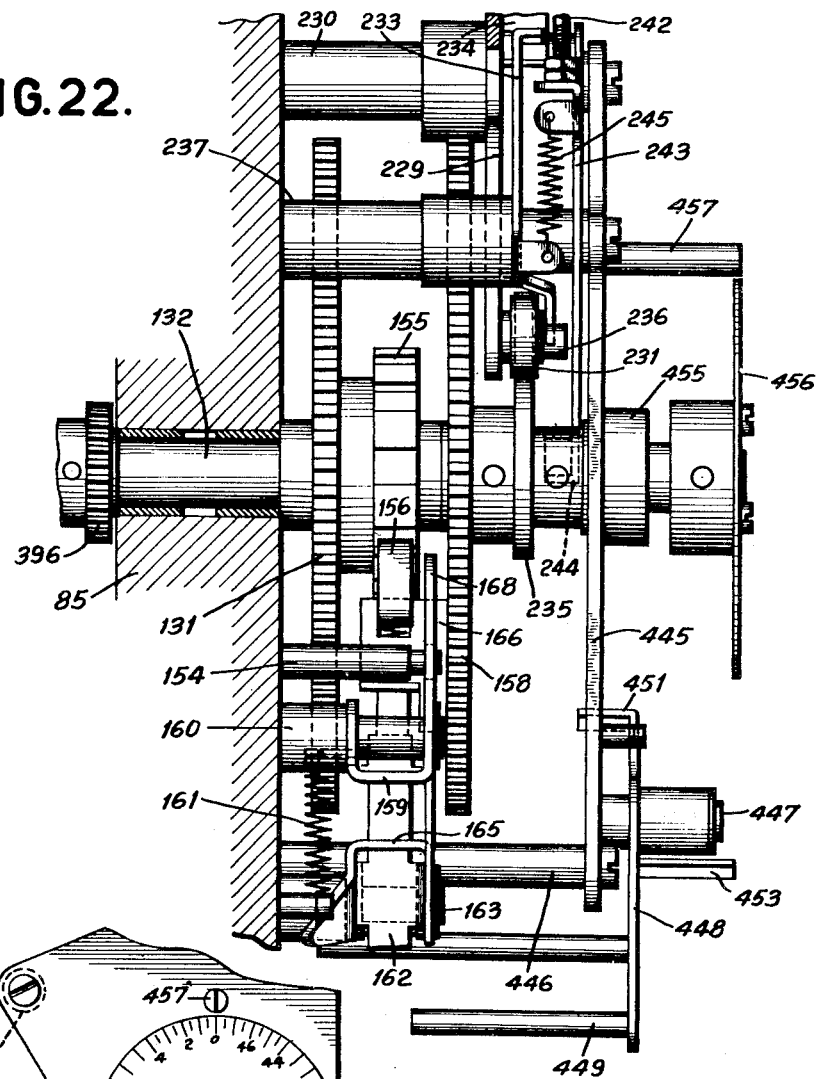

Fig. 22 is a sectional elevation view taken along line 22—22 in Fig. 7 and showing the clutching drive connections associated with the sheet feed.

Figure 23:
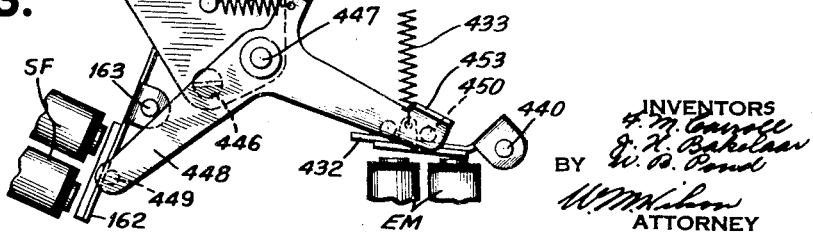

Fig. 23 is a detail view showing the manual tripping device cooperating with the sheet feeding and ejecting clutch armatures.

Figure 24:
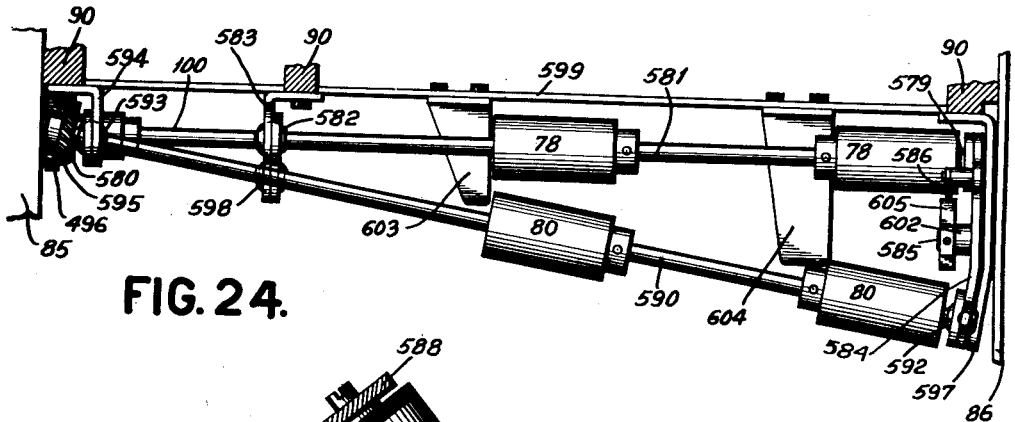

Fig. 24 is a plan view showing the offsetting rollers for feeding certain sheets to one side when directed into the stacker.

Figure 8:
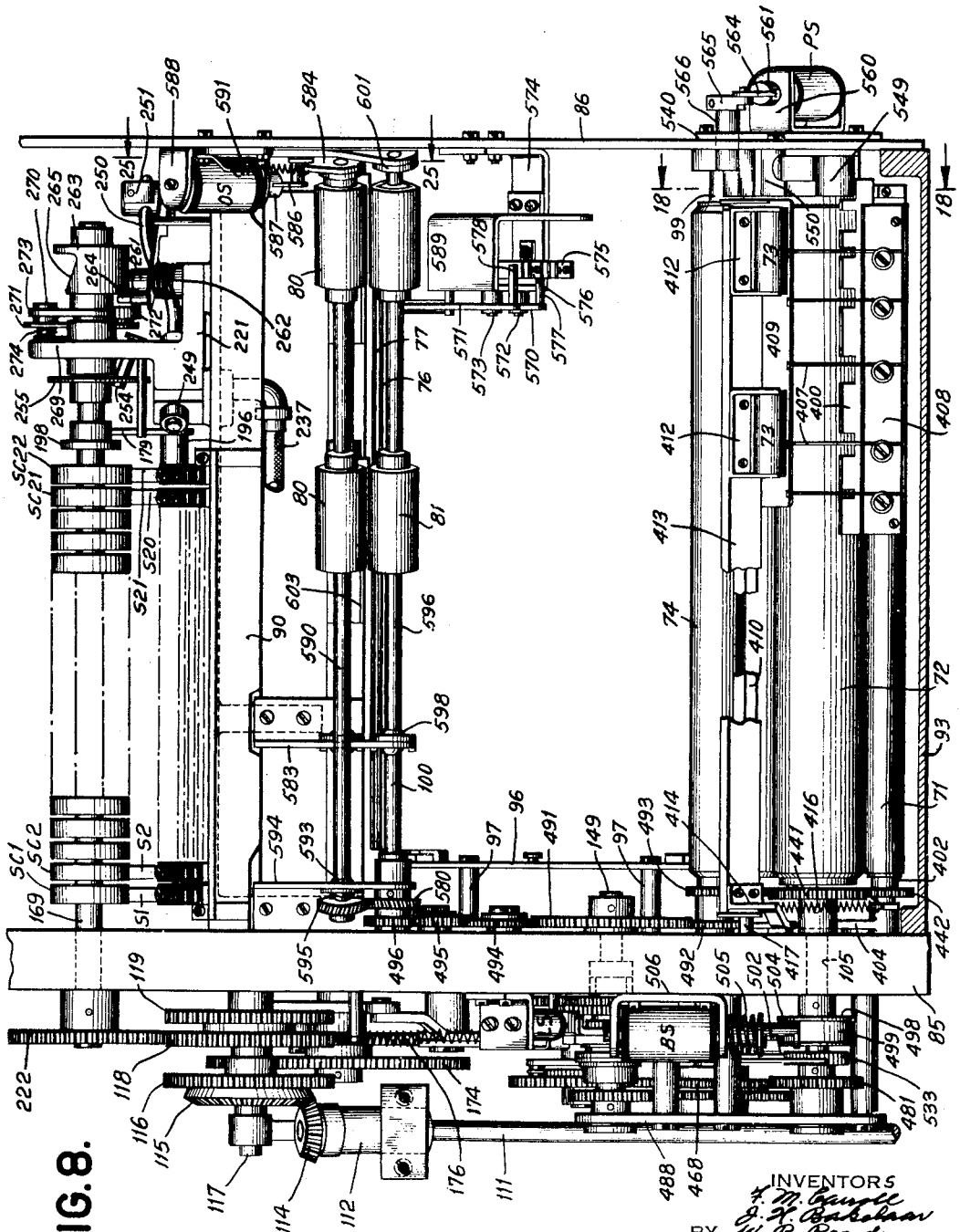
Fig. 8 is a front elevation view partly in section taken along line 8—8 in Fig. 9 and showing part of the sheet feeding devices and the printing platen.
Figure 25:
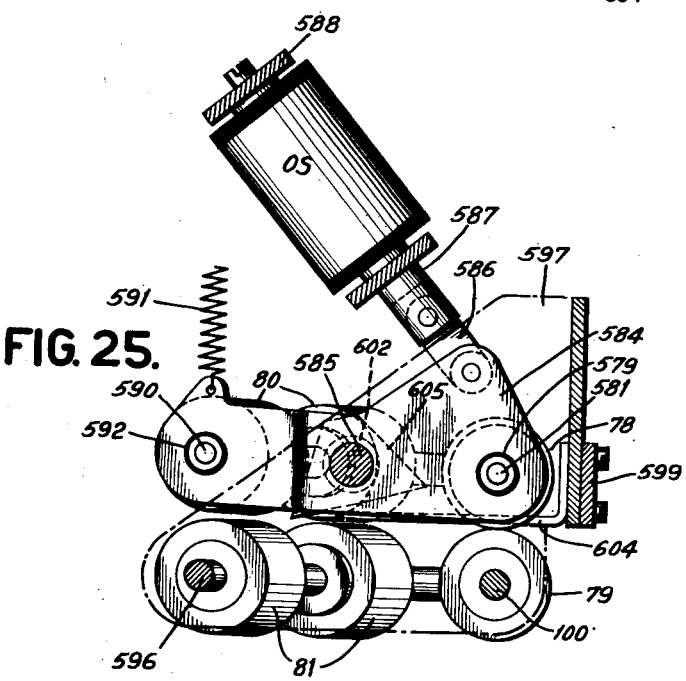

Fig. 25 is a detail elevation view in a section taken along line 25—25 of Fig. 8 to the side of the offsetting rollers and the solenoid operating connections.

Figure 26:
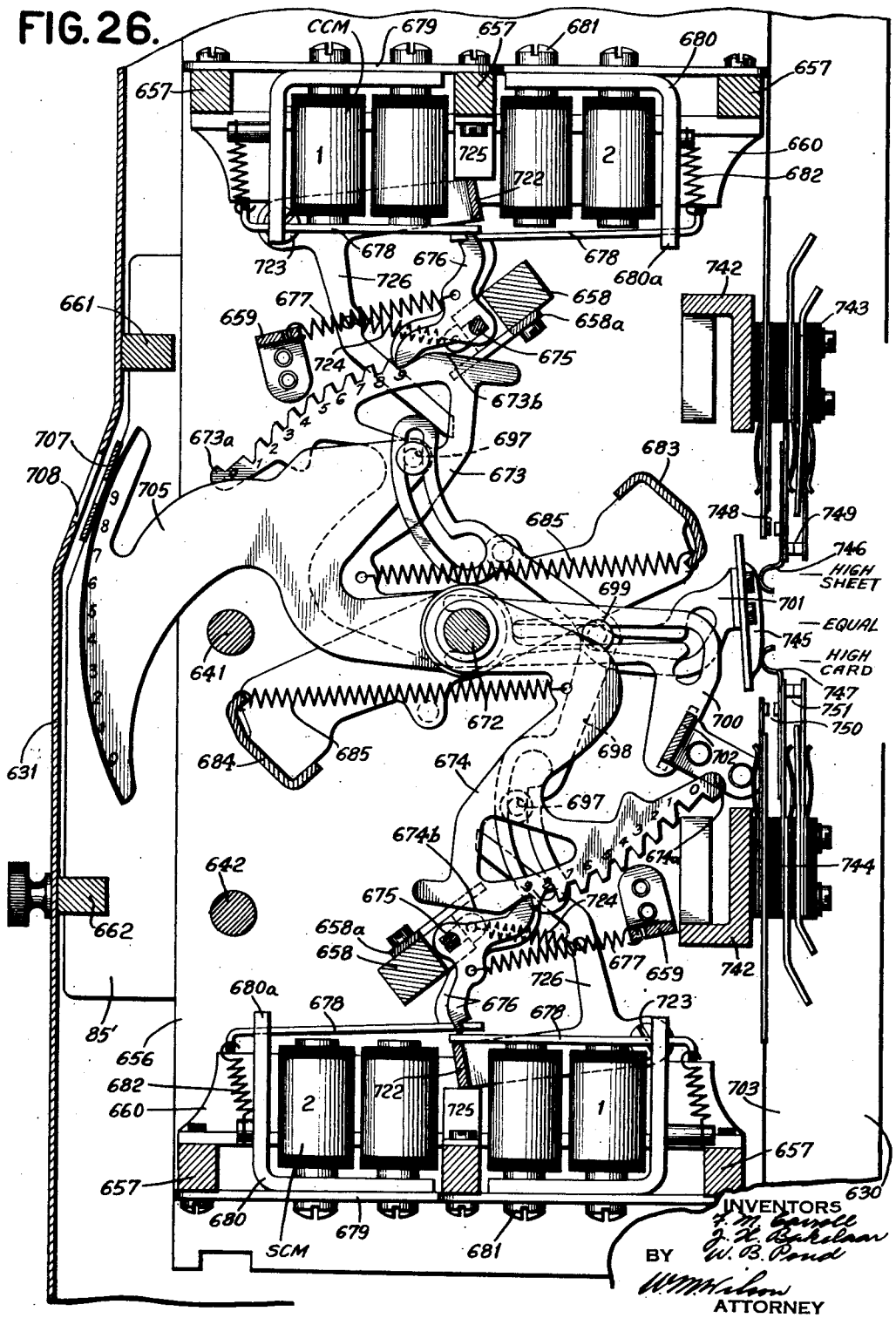

Fig. 26 is a side elevation view partly in section showing one order of the comparing unit and the indicators carried thereby for flashing the account numbers on the incoming groups of record cards.

Figure 27:
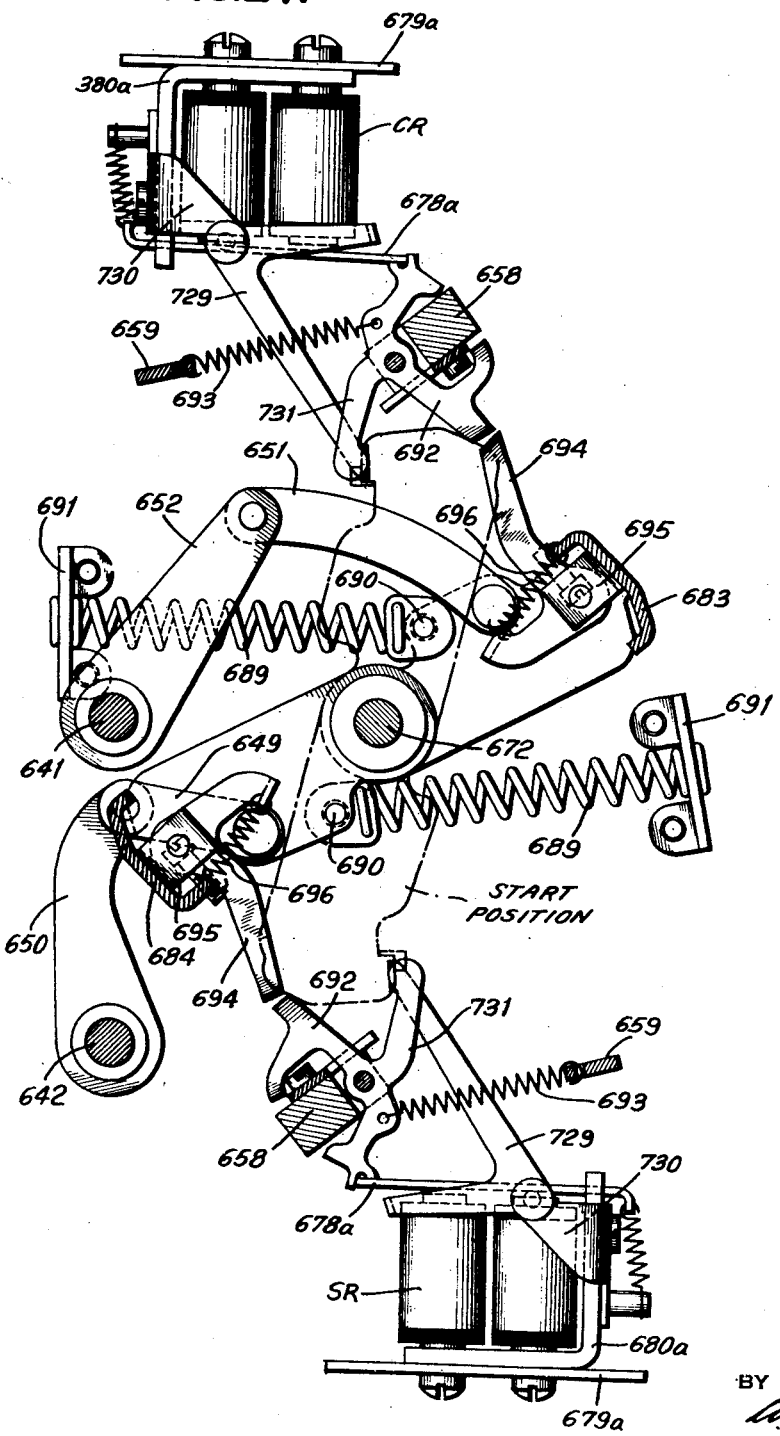

Fig. 27 is a sectional view through the operating mechanism for controlling the comparing unit.

Fig. 28 is an elevation view of the cams and gearing for controlling operation of the comparing unit.

Fig. 29 is a sectional view taken along line 29—29 of Fig. 28 showing the connections of the cams and gears in the drive for the comparing unit.

Fig. 30 is a detailed side elevation view taken along line 30—30 of Fig. 28 to the side of the cams for operating and restoring the comparing mechanism.

Figure 31:
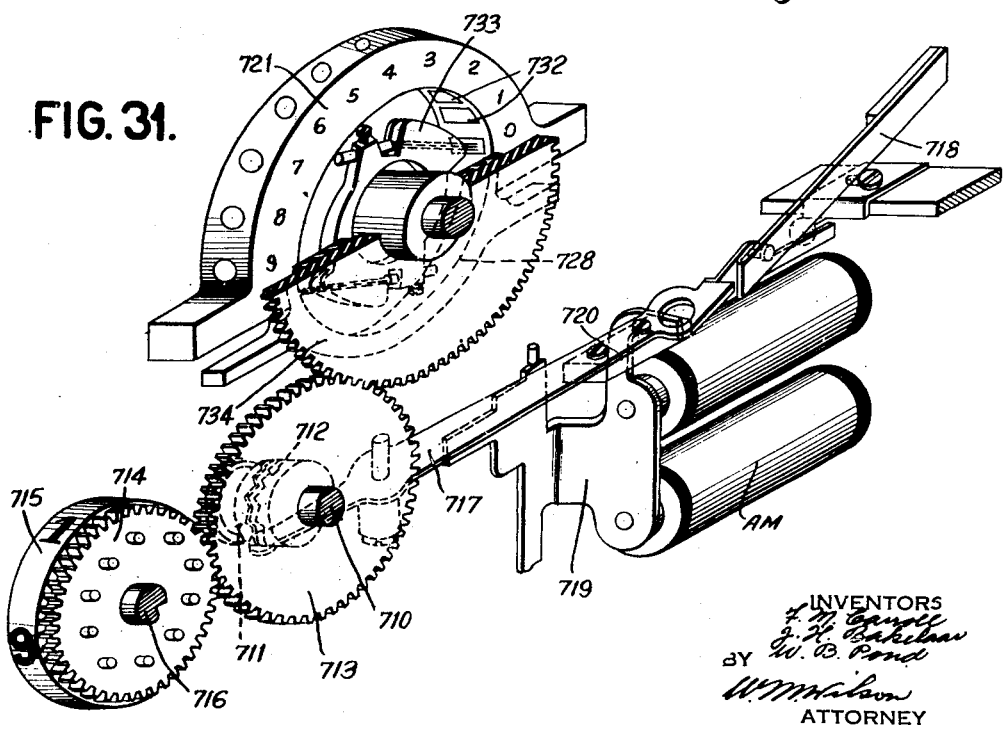

Fig. 31 is a perspective view showing one order of the accumulating mechanism.

Figure 32:
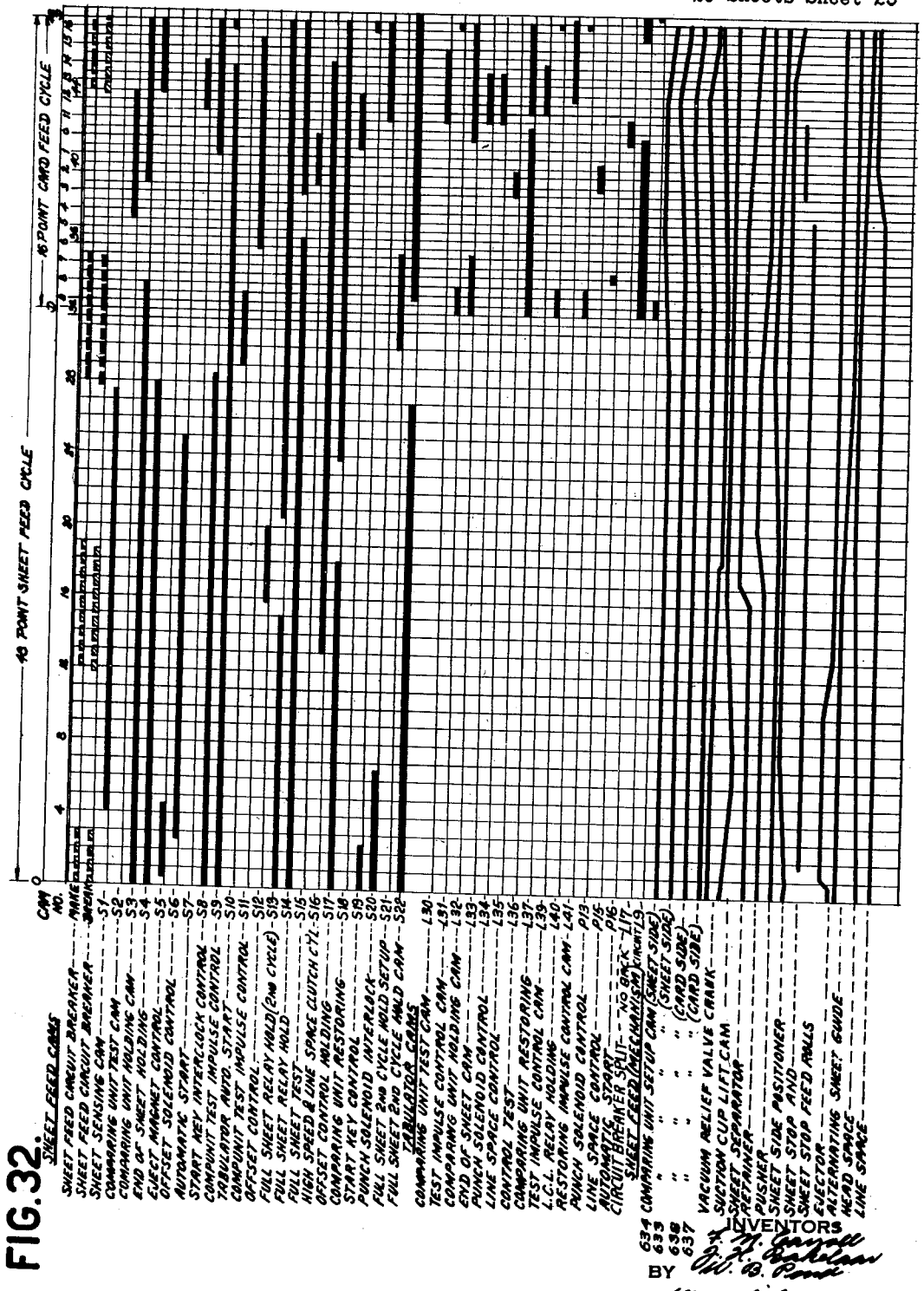

Fig. 32 is a view showing a cam and contact timing chart.

Figs. 33a, 33b, 33c and 33d when taken together form a wiring diagram of the electrical controls in the machine.

The devices of the present invention are shown in the disclosed embodiment as a ledger sheet feeding mechanism cooperating with a tabulating machine generally of the kind revealed in the U. S. Patent 1,976,617. The machine is adapted to sense the data on perforated record cards and add and print a record thereof. The cards are arranged in groups according to a group number perforated therein, and the machine may be set for listing to print a record of the data on each item card of a group, or for tabulating to print only a record of the total amount of a group. A stack of ledger sheets related to the groups of cards is placed in the magazine of the sheet feeding mechanism. The group numbers on the cards correspond with similar ledger numbers perforated in the ledger sheets to identify an account. The tabulating machine, through the group control devices, exercises control over the operation of the ledger posting sheet feeding devices. A group number comparing unit is also provided between the cards and sheets to insure that the items from a group of cards are printed on the related sheet. While operating in listing, it is desirable to eject the ledger sheet when the end of a related group of cards is reached. Then, too, it is well to determine which account is represented on the next group of cards to be sensed, so that the proper ledger sheet can be advanced to the print receiving position. Both of these controls are exercised over the posting devices by the tabulating machine which initiates the ejection of a ledger sheet, sets up numeral sectors to indicate and compare the group number of the cards about to be sensed, and controls the rapid passage of unselected sheets past the printer without operation until the related sheet arrives and stops automatically in the proper posting position.

The ledger posting devices in turn exercise control over the operation of the tabulator. The starting of the tabulator is automatically delayed until after the high speed sheet feeding and line spacing operations have ceased. When the comparing unit finds a sheet out of order, the machine is stopped so that the operator may put it in proper place in the pile of sheets. The machine is stopped automatically when either of two other conditions prevail, i. e. when there is an overflow of items on a sheet, and when a full sheet is not followed by another sheet of the same account with room for additional items. Other controls and interlocks between the tabulator and the sheet posting devices are described hereinafter.

The main purpose of the feeding devices is to select and move a ledger sheet 50 (Fig. 1) to the correct printing position as rapidly as possible. If the ledger sheet already contains six lines of print, then when it is reinserted it is to be fed to the seventh line. A perforation 51 is punched in the margin of the sheet for each line of print, and it is through such perforations that electrical control of sheet feeding and positioning is established.

The sample sheet shown is one that has been filled on one face. After being turned over, six lines are already used to record the summary entry, four items and the total resulting from the addition of the quarterly items.

As illustrated in connection with the posting of Social Security payments, there are usually four quarterly payments represented by four item cards to be posted. In addition to the four item cards, the card group includes a summary card which includes all amounts previously paid into the account. The summary card leads the cards of the account group, and the spaces shown on sheet 50, Fig. 1, between the item groups are representative of the operation wherein the old balance on the summary card is entered into an accumulator before the items are added thereto. After the four items are added to the old balance and an account group change is detected, a total taking cycle is initiated to print the sub and grand total amounts and at the same time the grand total is punched in a new card in the summary punch, said new summary card later being grouped with new item cards and the grand total thereon then becoming the old balance amount. The operation of punching a summary card while totals are printed is set forth in detail in Patent 2,126,595.

In some respects, the posting devices of the present application are similar to those disclosed in the copending application Serial No. 97,372, filed August 22, 1936, and issued as Patent 2,297,-743. However, in that case the sheets are inserted singly by hand and there is no automatic comparison of account numbers on ledger sheets and related item cards to prevent posting on wrong sheets. The devices of the present case have further novelty in sensing the approach of the end of sheets and the presence of full sheets and thereby warning the operator by flashing lights and offsetting the sheets in the receiving stack, so that at the end of one run new sheets can be inserted for a plurality of accounts, while another run is being made automatically. Many other novel controls incidental to automatic sheet feeding are discussed herein.

*Review of sheet feed controls*

Figure 3A:
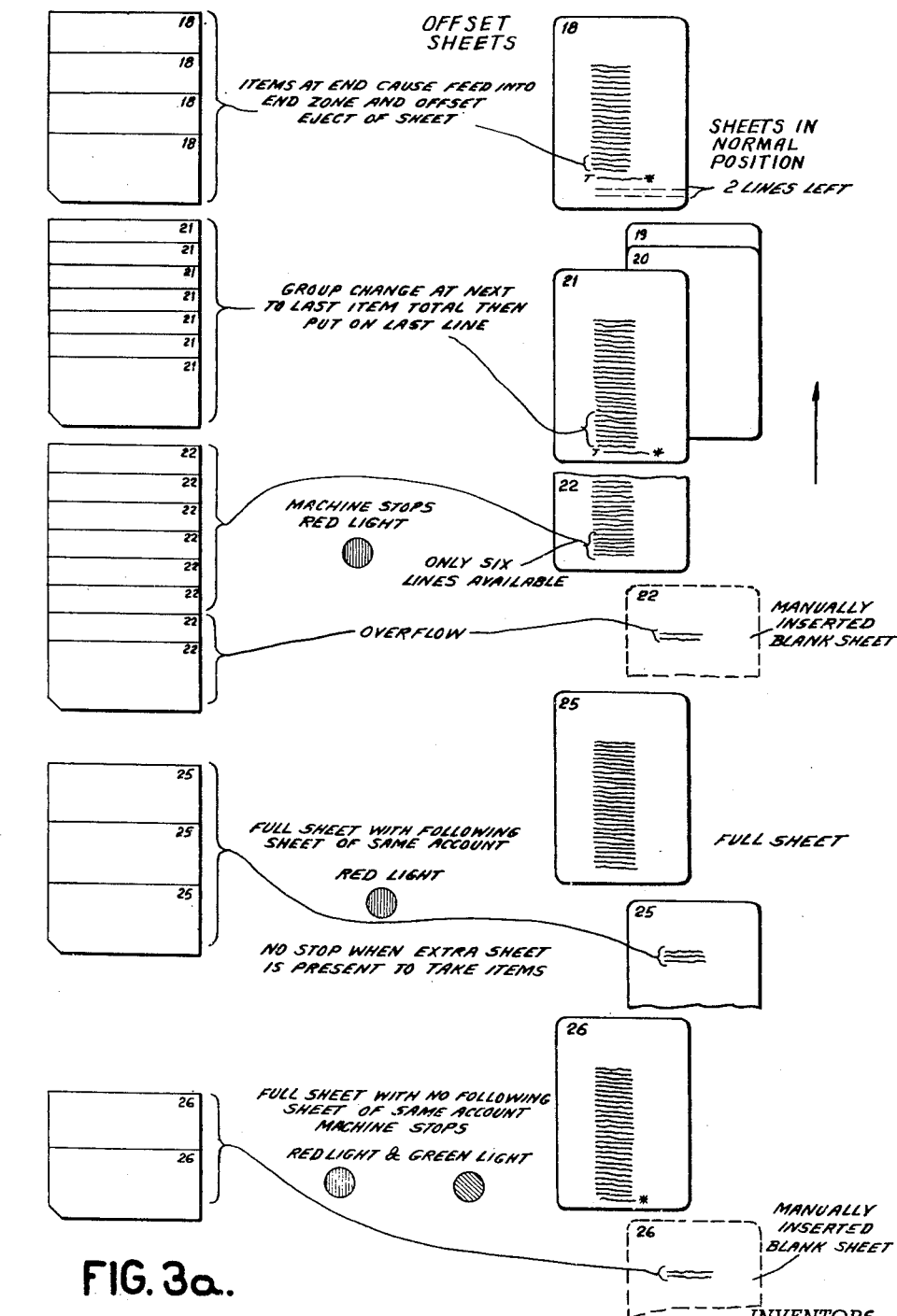

A general idea of the mode of operation of the posting devices may be grasped by reference to the diagrammatic showing in Figs. 3 and 3a. There a series of card groups and a sequence of related and unrelated ledger sheets are brought together in a way to make evident the various possibilities and what is done about them. Of course, under ideal conditions the sheets would all be in the proper sequential order, all the full sheets would be removed and new blank sheets inserted to receive additional items. The machine is designed to take care of conditions as they actually occur, with sheets out of order, full sheets remaining in the magazine with and without related blank sheets inserted thereafter, and an overflow of items being prevented when card groups are large and posting space is small.

Figure 1:
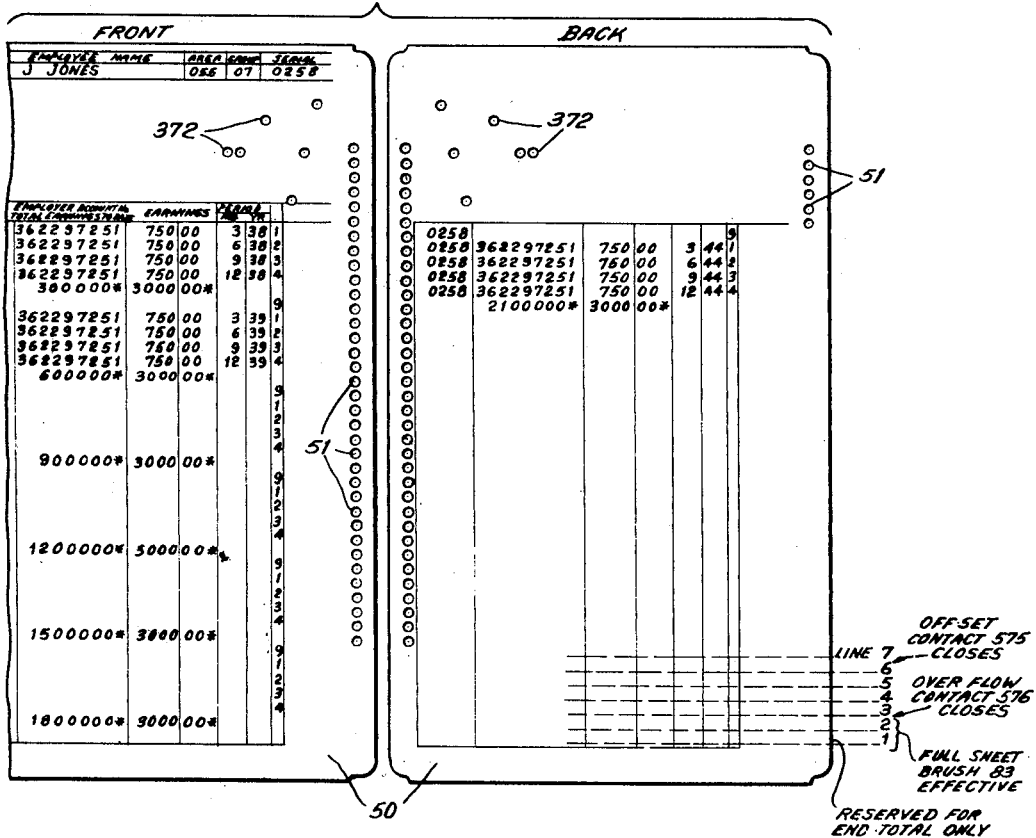
Figure 2:
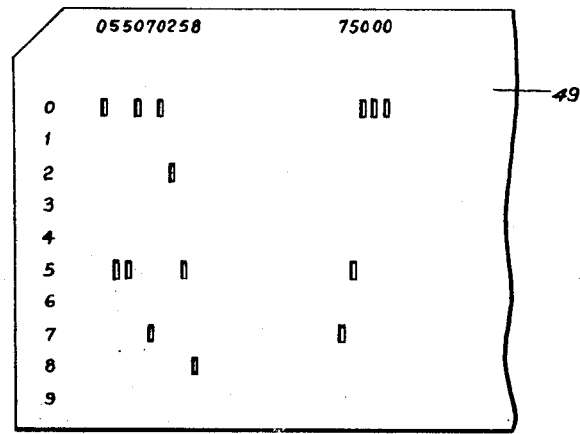

In Figs. 3 and 3a, cards 49 are arranged at the left in a vertical row with the cards spread out and arranged in a descending order, the cards of group #10 being at the top and group #26 at the bottom. It will be assumed that cards are advanced one by one from the top of the row and toward the top of the sheet. Opposite the cards in the row at the right are representations of a series of ledger sheets 50, starting with the sheet of account #7 at the top and descending to sheet #26 at the bottom. Here again it will be assumed that the sheets are advanced from the top upward. The large account numbers appearing on the cards and sheets are there only for purposes of illustration. They do not appear on the actual elements which are perforated to represent the account numbers as seen in Figs. 1 and 2.

A peculiar arrangement of cards and sheets is presented in order to bring out the various conditions that are encountered in the actual operation of the machine. Starting at the top of the sheet, Fig. 3, the first condition encountered is one that happens frequently during the normal control of the machine. There it is seen that a comparison was made between cards of account #10 and a sheet related to account #7. This high card condition calls into operation the sheet feeding mechanism to advance sheets #7, #8 and #9 through the machine rapidly past the platen without receiving any printing impressions. The appearance of the next sheet relating to account #10 is detected in the comparing unit as involving an equal condition, and this serves to control the feeding devices so that sheet #10 is stopped while wrapped around the platen and held in a position wherein the first line of print is recorded directly under previously printed matter. Since there are three cards in group #10, sheet #10 will receive three successive line spacing movements alternating with three recording operations. After the last recording operation, a group change is detected between the last card of group #10 and the first card of the following group. This brings into operation the feeding controls for ejecting sheet #10. It happens that the following card relates to account #13 while sheets #11 and #12 are presented on the sheet feeding side of the machine. The two sheets #11 and #12 are advanced without receiving impressions as explained, and the following sheet #13 is brought into position to receive an impression of the single item represented on the card of the one card group #13.

After the ejection of sheet #13, a comparison is made between the cards of account #17 and a misplaced sheet #20. This results in a condition in the comparing unit indicating a low card and a high sheet condition. When such a relationship is presented, it is always indicative of a misplaced sheet. The machine is stopped and a green warning light is flashed to inform the operator regarding the cause for the break in the operation. After the operator has removed sheet #20, the machine is again started and the following sheets of accounts #14, #15 and #16 are directed into the stacker. Upon the appearance of account sheet #17, the five items represented on cards of group #17 are recorded on the posting lines. It is noted that the items entered on sheet #17 do not reach into the end zone at the bottom of the sheet which is composed of the last six lines. The controls effected upon printing near the bottom of the sheet are about to be explained.

Passing down to the next sheet relating to account #18, it is seen that this ledger sheet contains a large number of printed items before the four items are added represented by the four cards of the account group #18. However, on the previous recording operation, the printed items or totals did not extend into the end zone. The four items and a total are recorded in the usual fashion but, as soon as any datum is printed within the zone bounded by the last six lines, a control is initiated which is effective after printing to eject the sheet to one side when it it directed into the stacker. These offsetting controls are provided to distinguish sheets that are filled with items from the other sheets having at least six unused lines remaining. Sheet #18 is shown in an offset position, Fig. 3a, to illustrate how it is positioned in the stacker after being ejected from the platen.

The next example associated with account #21 is arranged to illustrate a condition wherein the number of items printed falls within one line of the end of the sheet. Usually, when the next to the last line receives an item impression, the sheet is ejected and the machine stops if there is no other sheet of the same account, or resumes operations with the overflow items on the second sheet of the same account. However, when the items fall exactly within the allowable area of the sheet and a group change in the record cards is detected as the last item is printed on the second line from the bottom, the record sheet is retained so that the total may be printed on the last line of the sheet. Sheet #21 is then full on one side and should be turned over, or removed if another sheet is substituted.

The example of account #22 reveals in a diagrammatic fashion the situation presented when the number of items represented by the record cards is greater than the number of printing lines available on the ledger sheet. In Fig. 3a it is seen that account #22 comprises eight item records within a group while only six lines are available on the corresponding ledger sheet. It is also supposed that sheet #22 is the only sheet of the account and, therefore, there is no receiving medium for the two overflow items and the total. After six items are entered, the machine is stopped and a red light is flashed to indicate to the operator that a full sheet or overflow condition exists. The operator then inserts a sheet manually by successive operations of a sheet feed key, said sheet being perforated with the account #22 to agree with the full sheet which should be removed. The machine is started and the last two items of account #22 are placed on the new sheet.

There are times when the operator, upon the insertion of a second sheet, fails to remove the full sheet which precedes it. The machine is provided with controls for detecting the appearance of such a full sheet before it reaches the platen. The illustration presented in connection with account #25 is related to such a condition. There it is seen that the three items relating to account #25 find no room on the first ledger sheet #25 but the following sheet of the same account is adapted to accommodate the printing impressions. Under such conditions, the red warning light is flashed but the machine continues to operate and the first sheet is ejected in an offset position, while the other second sheet is stopped to receive the items and is later ejected in the normal aligned position.

The conditions associated with the next account #26 relates to another state of affairs. The ledger sheet #26 is a full sheet such as that of account #21, having been filled on the previous posting operations, but the operator has failed to remove the full sheet and has also failed to insert a second sheet. Since the machine not only senses the presence of a full sheet but also detects a second sheet of a higher account number than the account number of the record cards, a double indication is given by the flashing of both red and green lights in addition to the stoppage of the machine. Then it is required that the operator insert another sheet for account #26 to take care of the items represented by the record cards.

*Placement of units*

In Figs. 4 and 5 is illustrated the placement of the various units of the sheet feeding controls with respect to the tabulator. It is seen that most of the mechanism is placed directly over the printer of the tabulator. The sheet magazine, Fig. 4, is situated in an opening near the center of the feed mechanisms which carry the sheets downward, then toward the front, and up into the stacker that hangs over the front of the machine. Most of the driving mechanism, Fig. 5, is assembled on the outside of the rigid left side frame 85 to which the comparing unit is fastened at the top and toward the front of the machine.

On the right is a control box 33 containing the switches of the sheet start, stop and clearing keys, and the bulbs for the red and green warning lights. Also, on the right is a cover over the unit for perforating and sensing the feed control indicia 51, Fig. 1, in the margin of the sheet.

*Path followed by the ledger sheet*

In the diagrammatic view, Fig. 6, is shown the path followed by the ledger sheet 50 in going from the magazine to the stacker. The top sheet is pushed to the right into engagement with the first set of feed rollers 55 and 56 and is then curved downward and toward the front by a pair of guides 57 and 58. An auxiliary roller 59 and a flat guide 60 direct the sheet into a second pair of rollers 61 and 62. After leaving the second set of feed rollers, the sheet continues forward and downward in a straight path between guides 63 and 64. It is sensed by a brush 83 and contact 84 to detect the presence of a full sheet. The sheet is next drawn between feed rollers 65 and a contact roller 66 cooperating with two sets of sensing brushes 67 for reading the account number perforations in the sheet. Advancing further, the sheet passes along one of two alternate paths defined by a separation plate 68 and two outer guides 69 and 70. As the sheet passes around the front of a platen 72, it is held thereon by curved guide wires 82 and pressure rollers 71 and 73. In going upward, the sheet is elevated by ejection feed rollers 74 and 75 and rearward movement is reversed by curved guides 76 and 77 which direct the sheet between ejecting rollers 78 and 79 and other selectively effective offsetting ejection rollers 80 and 81 which throw the sheet into the stacker box.

During normal printing operation, three sheets are in the course of advancement from the magazine to the stacker. The first sheet is around the front of the platen 72 where it is pinched by rollers 71 and 73, ejection rollers 74, 75 being normally open. The position of the first sheet is dependent on the number of previously recorded lines, said sheet standing with the top blank line at the printing position.

The second sheet is under the contact roller 66 with the top of the sheet (the part carrying the account number perforations) already past the rollers and near the platen. One side of the double channel 69, 70 contains the tail of the first sheet which is overlapped by the top of the second sheet in the other side of the channel. When the card groups change, the constantly rotating rollers 74, 75 are closed to eject the first sheet, and at the same time rollers 71 and 73 are lifted to allow the top of the second sheet to thread its way around the platen 72 as driven by feed rollers 65 and 66.

The third sheet normally rests with its front edge against a gate or stop 299 and the rollers 61 and 62 are open.

When a sheet feeding operation is initiated, four sheets are advanced along the path shown in Fig. 6; the first sheet is ejected, the second sheet is advanced around the platen, rollers 61, 62 close to move the third sheet under sensing brushes 67, and the fourth sheet is picked off the top of the pile in the magazine and pushed into the bite of rollers 55, 56.

Reference to the timing chart, Fig. 32, reveals that the sheet feeding cycle covers a period of 48 cycle points, or three times the duration of the 16 points of the card feed cycle shown in association therewith. Although the sheet cycle is longer than the card cycle, it does not hold up the operation of the tabulator to an appreciable extent because sheet feeding occurs only after a group change. The larger the card groups, the smaller the proportion of time devoted to sheet feeding.

The sheet feed operations diagrammatically represented in Fig. 32 are related not only to one sheet, but to the four sheets that are at one stage or another of the course from the magazine to the stacker. The time chart is a composite representation of the happenings along the entire path of the sheet feed shown in Fig. 6.

Card feeding devices

The record cards 49, Fig. 2, are handled in the usual way in the tabulator. The mechanism for feeding the cards is similar to that disclosed in Patent 1,976,617. A picker device is used to advance the cards one at a time from a feed magazine, and then they are engaged by pairs of feed rollers which move them past a set of upper brushes UB and, exactly one machine cycle later, past a set of lower brushes LB. Cooperating with the two sets of brushes are group control devices for detecting a change in group or account numbers between two successive cards.

Framework

Figure 9:
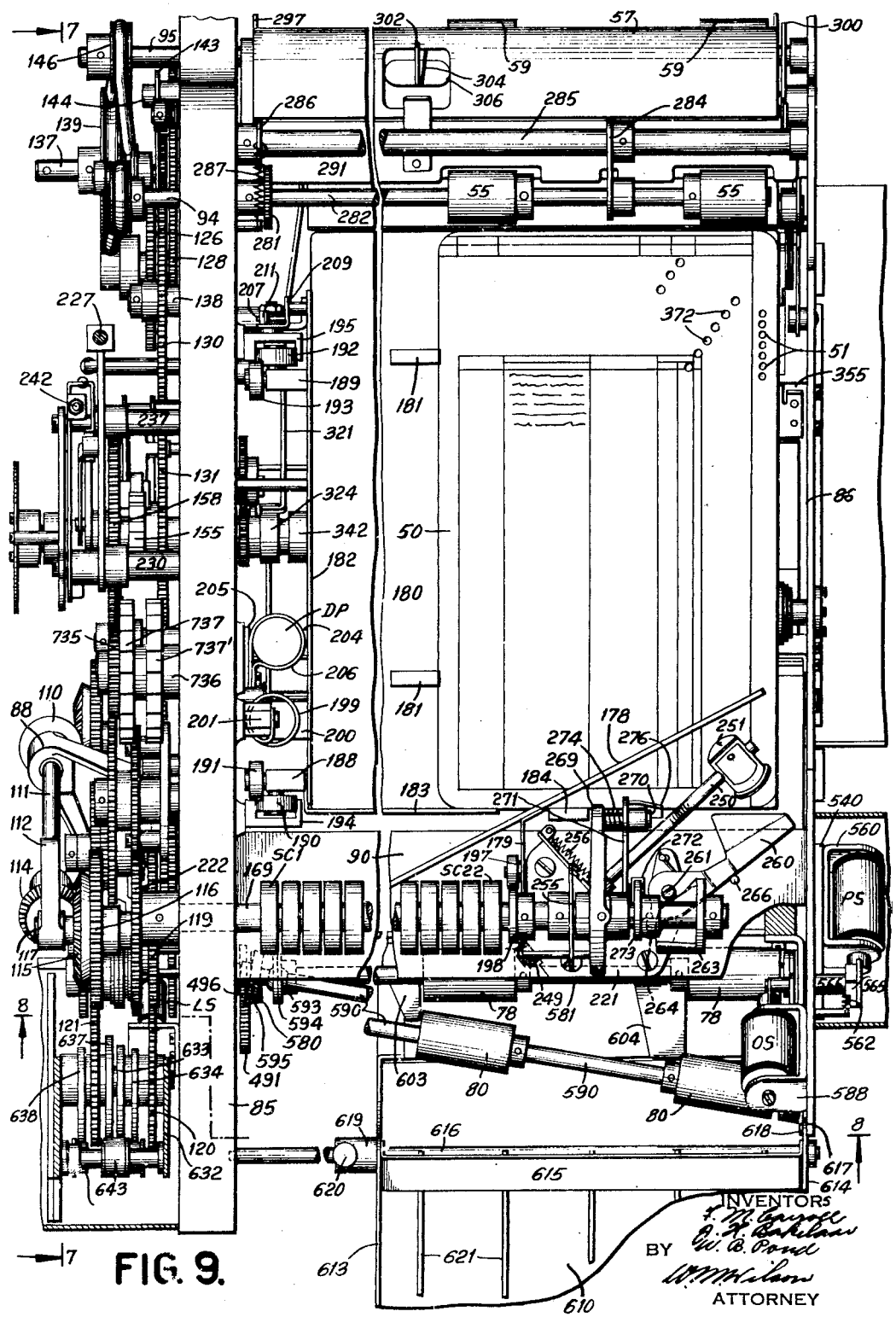
Fig. 9 is a plan view showing a sheet magazine and the devices for advancing the sheets into the print receiving position.

The framework of the feeding devices comprises the thick rigid left side frame 85, Figs. 7, 8 and 9, and a thinner U-shaped right side frame 86. The left frame, Fig. 7, is fastened to the tabulator by a pair of brackets 87 and 88, while a support 89, Fig. 4, and other connections fasten the right frame to the machine.

A number of strong castings 90, 91, 92 and 93, Figs. 10 and 10a, are fastened between the side frames to brace them and provide supports for various mechanisms. Also fixed between the side frames are quite a number of rectangular bars for supporting the sheet guides. The feed rollers with fixed positions are on shafts rotating in bearings formed on the side frames. Rollers 56, 59, 62, 74 and 79, Figs. 10 and 10a, are attached to shafts 94, 95, 137, 99 and 100, respectively, rotating in, and projecting through the left side frame 85. A platen shaft 105 inside part of platen 72 also projects through the left side frame.

An intermediate frame 96, Figs. 8 and 10a, is spaced from side frame 85 by screw studs 97 to support ejection guides 76, 77 and provide space for the feed roller gearing on the inside of frame 85.

The main driving mechanisms

Two sources of driving power are used to operate the various sheet feeding control devices; the one is the motor M, Fig. 7, and the other is the list shaft L, Fig. 4, of the tabulator, which shaft operates whenever cards are fed and analyzed.

One side of the comparing unit is set up to represent card account numbers, and it is this side that is set up and restored by connections from the tabulator.

Attached to list shaft L is a gear 106 in mesh with a gear 107 fastened to a bevel gear 109. In mesh with the gear 109 is another bevel gear 110 fastened to the lower end of a drive transmitting shaft 111 that is rotatably supported by the bracket 88, Fig. 9, and at the upper end, Fig. 7, it rotates in a bearing bracket 112 fastened to an extension 113 on the left frame 85. Attached to the upper end of shaft 111 is a bevel gear 114 in mesh with a similar gear 115 fastened to a spur gear 116 rotatable on a stub shaft 117. An upwardly extending arm of bracket 112, Fig. 8, supports one end of shaft 117 and the other end rides in frame 85. Also on shaft 117 but independent of gear 116, Fig. 8, are two gears 118 and 119 coupled together, loosely mounted, and driven by connections from motor M as explained hereinafter.

Gear 116 drives a gear 121, Fig. 7, for operating the card controlled set of comparing unit parts, while gear 119 drives another gear 120 on a common shaft 122 for controlling a sheet controlled set of comparing unit parts. The reason for the divided drive is to provide independent control of the two parts of the comparing unit by the sheet sensing and card sensing devices. It is explained further hereinafter, how, for purposes of account number comparisons, one set of comparing unit indicators are set to represent the account number punched in the cards, while another set of comparing unit parts are set to correspond with the account numbers perforated in the sheets.

Turning now to the drive connections from motor M, Fig. 7, it is seen that the motor shaft carries a driving pinion 125 which meshes with gear 126 of a speed reduction train comprising pinion 127, gear 128, pinion 129 and idler gear 130. Gear 126 and pinion 127 are fastened together and pivoted on a stud 98.

The other feed roller shafts 94 and 95 are driven by a belt drive. Referring to Figs. 7 and 14, it is seen that gear 128 and pinion 129 are fastened together and attached to shaft 137 which carries feed rollers 62, Fig. 10, and also carries a drive pulley 139. An endless belt 141, Fig. 7, is drawn around pulley 139 and passed over a small pulley 140 secured to shaft 94. The belt is then passed under an idling tension roller 142 before passing around another pulley 146 secured to shaft 95. Tension roller 142 is pivoted on an arm 143 fulcrumed at 144 on the side frame. A spring 145 tends to rock the arm in a clockwise direction to take up the slack in the belt 141. By means of the connections traced, shaft 94 is rotated in a counterclockwise direction, Fig. 7, and shafts 95 and 137 are rotated in a clockwise direction to operate the feed rollers near the back of the feeding device, so that any sheet pushed out of the magazine is advanced downwardly and forward toward the platen.

A train of drive gearing extends across the machine in a horizontal line to reach the drive connections for the line spacing, head spacing, high speed feed and ejecting mechanisms. It is already explained that gear 130 is driven by the speed reduction gearing connected to the motor. This gear is loosely pivoted on a stud 138 projecting from the side frame. It meshes with another gear 131 loosely mounted on a shaft 132. Gear 131 meshes with another idler gear 133 pivoted on a stud 147 secured to the left side frame 85. The idler meshes with a pinion 134 secured to another gear 135 which is loosely pivoted on a fixed rod 148 extending from the side frame. Gear 135 meshes with a pinion 136 attached to the line space clutch ratchet 150, Figs. 19 and 21, secured to the shaft 149. The mechanism for making the line space clutch effective is described hereinafter.

Also secured to shaft 149, Fig. 19, is a gear 485 for driving the clutch gear 470 of the high speed sheet inserting controls. At the inner end of shaft 149 is attached gear 491 for driving the constantly rotating shafts carrying the fixed ejection rollers.

Sheet feed clutch and drive connections

Shaft 132, Fig. 7, controls the suction devices for lifting the top sheet out of the magazine, and this same shaft is part of the sheet feed clutch for operating gate 299, Fig. 6, and closing feed rollers 61, 62.

Attached to the large drive gear 131, Figs. 7 and 22, is a clutch ratchet 155 loosely mounted on shaft 132. Cooperating with the ratchet is a clutch pawl 156 pivoted at 157 on the side of another large gear 158 fixed to shaft 132 and of the same diameter as gear 131. The pawl 156 is normally held out of engagement by a disengaging member 159 pivoted on a stud 160 on the side frame. Member 159 is limited in its movement by a stop pin 154 projecting from the side frame and through a hole in a projection 168 formed on the member. A spring 161 attached to the member 159 urges it in a clockwise direction and tends to release the pawl. However, the rotation of the member is obstructed by the upper end of an armature lever 162 pivoted on a stud 163 extending from the side frame. Attached to the armature lever is a spring 164 tending to rock it in a counterclockwise direction to latch member 159 in a restored position. Whenever a sheet feeding operation is selected, a magnet SF is energized to attract armature lever 162 and rock it in a clockwise direction to release member 159 which in turn releases pawl 156 so that the clutch is engaged and gear 158 is connected to the drive gearing from the motor for one complete revolution.

In order to prevent backward movement of the gear 158 when it is stopped at the end of a cycle of operation, there is pivoted on stud 163 a stop bail 165 with an arm extending under a block 166 attached to gear 158 for the added purpose of carrying a compression spring cooperating with the clutch pawl. Another arm of stop bail 165 is attached to one end of spring 161 and cooperates with a stop pin to limit the movement of the stop member.

Soon after pawl 156 is tripped and the gear 158 starts to rotate in a clockwise direction, block 166 on the gear cooperates with the projection 168 on the latching member 159, so that it is rocked about pivot 160 and restored to an effective position over armature lever 162 and ready to disengage the pawl when gear 158 reaches the home position.

Cooperating with gear 158 are gear connections leading to various mechanisms made effective whenever sheet feeding is selected. Meshing with gear 158 is a gear 170 attached to a shaft 171, Fig. 10a, carrying the contact roller 66 with which the sheet analyzing brushes 67 cooperate to sense the account number perforations of the sheet.

Another gear 173 meshes with gear 158 and acts as an idler in transmitting motion to a large gear 174 attached to a shaft 175 rotating in the side frame 85. Shaft 175 also carries a smaller gear 176 and a cam 177 attached to gear 174 to rotate in unison therewith. Gears 158 and 174 are of the same diameter, so that each cycle of operation of the former causes a similar operation of the latter. Gear 176 meshes with gear 118, described hereinbefore as loosely pivoted on the shaft 117, and provides a drive connection to gear 119 which is attached to gear 118 and in mesh with the gear 120 cooperating with the number setting devices on the sheet side of the comparing unit.

Cam 177 is the operating means for a train of connections extending to the platen for operating it to adjust the sheet through a head spacing movement to lead the top of the sheet around the platen, after which the high speed and line space mechanisms adjust the sheet in the accurate posting position.

The sheet magazine

In Fig. 4, it is seen that the sheet magazine is supplied with sheets 50 through a large centralized opening O in the right side frame. The magazine comprises a large tray which is movable up and down, so that the operator can pull it down to place a pile of ledger sheets thereon and then allow it to move upward again until the top sheet is in the sheet feeding position.

The sheet tray, Fig. 9, is composed of a base 180 with settable edge lugs 181, a left side wall 182, and a short front wall 183. It is proportioned to handle sheets of various widths. In the plan view it is apparent that the right side of the tray is without any wall, thus giving ready access for the removal and insertion of sheets through the opening in the right side frame. The rear edge of the tray is also without an upper wall because it is over this edge that the top ends of the sheets 50 are pushed into engagement with the feed rollers 55, 56. A flexible front gage is provided in the form of a removable L-shaped bar 184, Fig. 10, in contact with the flange on the front of the base 180 and secured at 185 to the under side of the base. In Fig. 10 it is seen that the left side wall 182 extends below the base and provides front and rear ends 186 and 187 to which various magazine controls are attached.

Attached to left wall 182 (Fig. 9) are two long roller holding bars 188 and 189 of rectangular cross section. Pivoted on bar 188 (Fig. 10) are a pair of rollers 190 and another pair of rollers 191 mounted at right angles to the first pair. On bar 189 there are also pivoted two pairs of angularly disposed rollers 192 and 193. A pair of long channels 194 and 195 are secured to frame 85 in vertical spaced alignment to act as tracks with which the rollers cooperate to make the tray readily movable upward as the top sheets are fed therefrom. From the showing in Figs. 9 and 10, it is clear that the pairs of rollers 190 and 192 cooperate with inner walls of channels 194 and 195, while the other pairs of rollers 191 and 193 contact with the edges of the channels. Thus, the magazine tray is held in a true horizontal plane in all positions and yet readily responsive to vertical adjustment.

A large spring 199 is attached to one end to an extension 200 on the bottom wall 186 and at the other end the spring is held by a fixed stud 201 on the frame 85. The spring tends to raise the tray and bring the top sheets into feeding position regardless of the number of sheets or the thickness of the pile on the tray.

A handle 202 (Fig. 10) is attached to the flange of the tray base 180, so that the tray can be pulled down against the tension of spring 199 when it is desired to insert sheets into the magazine.

A shock absorber or dash pot DP is provided to cushion the upward return of the tray should it slip out of the operator's grasp when it is drawn down. A downwardly extending plunger 203 of the dash pot is in the path of a lug 204 fastened to the base 180 of the tray. An extending plate 205 is offset and perforated to guide the lower end of plunger 203. A strap 206, Fig. 9, is wrapped around the dash pot, and screws pass therethrough and through plate 205 into the frame 85 to hold the body of the device fixed with respect to the tray.

The magazine is provided with stopping and full stroking devices for controlling the movement of the sheet tray. It is desired that when the tray is pulled down initially, it be held there until filled and then be pulled down again before being released to move upward a differential extent according to the number of sheets on the tray. The part for locking the tray down is the rotating cam latch 207 (Fig. 10b) which is pivoted on a stud 208 fastened to the side of the guide channel 195 (Fig. 10). Normally, one long side of latch 207 merely rubs against the side of an elongated strip 209, spaced from and fastened to the side wall 182 of the tray. However, the strip is bent at the top to form an extension 210 carrying a pin 211 which strikes a cam face 212 on the latch when the tray is first pulled down as far as possible. This camming action serves to turn the latch clockwise (Fig. 10b) so that its lower end projects into an opening or notch 213 cut in the strip, thus preventing the tray from rising more than the short distance moved while the edge of the notch cooperates with the bottom face 212 to cam the latch further in a clockwise direction. The latch 207 then lies at such an angular position that when the tray is pulled down the second time, pin 211 strikes the side of the latch and rocks it further clockwise, out of locking engagement with the strip, thus freeing the tray for upward movement.

A lug 214 (Fig. 10) is attached to the right side 187 of the tray wall, and it is aligned to abut against stud 208 when the tray is allowed to move upward all the way. The shock of a sudden release is eased by dash pot DP before the lug strikes the stud.

When released to move upward to a sheet feeding position, the tray moves to a position determined by the thickness of the pile of sheets on the tray. The tray is stopped with the top sheet 50 (Fig. 10) pressing against the under side of a long stop lever 178 pivoted on a rod 196 (Fig. 13) supported in the frame casting 90. In Fig. 9 it is seen that the lever extends at an angle across the lower right hand corner of the sheet, and it is braced in the middle by an operating bell crank 179 riveted thereto and fulcrumed on the same rod 196. Lever 178 and crank 179 together form a stopping bale which is held in the normal position by a spring 172. A roller 197 on bell crank 179 cooperates with a cam 198 on an operating shaft 169 to raise and lower lever 178. It is explained hereinafter how the lever is raised away from the sheets during sheet feeding when another means is brought into play to hold down all sheets except the top sheet.

Many control devices other than cam 198 are mounted on shaft 169. This shaft is supported at the right end by a large bearing standard 221 (Fig. 8) fastened to the top of frame 90, while the left end passes through side frame 85 and carries a gear 222 in mesh with gear 118. It is explained hereinbefore that gear 118 is driven by a train of gearing (Fig. 7) extending down to gear 158 which is rotated whenever a sheet feeding operation is selected by magnet SF. Gear 222 is equal in diameter to the drive gear 176 and therefore it is rotated through one complete revolution for each sheet feeding cycle. Shaft 169 also carries a set of contact operating cams SC1–SC21 for operating a series of feeding control contacts S1–S21. These contacts control the timing of the various sheet feeding functions. In Fig. 32 the timing of the S contacts is shown in detail with the stopping point at the 48th cycle point line which coincides with the 0 starting point.

*Sheet separating and picking devices*

The sheets are fed one by one from the top of the pile on the magazine tray. In order to separate the top sheet from the other sheets in the magazine, the corner of the sheet is engaged by a suction device and bent upward away from the other sheets. A separator blade passes under the raised sheet and holds down the pile while a sheet picker pushes the top sheet off the pile and into the feed rollers.

Suction for the sheet separator is provided by a suction pump shown in Fig. 7. There it is seen that a cylinder head 225 is fastened to the outside of side frame 85. Within the cylinder is a piston 226 connected to a piston rod 227, the lower end of which is articulated at 228 on an arm of a crank lever 229 pivoted on a stud 230 and provided with an operating roller 231. A spring 232 tends to rock lever 229 in a counterclockwise direction to pull down piston 226. However, the lever is held in a normal position by a latch lever 233, the upper end of which cooperates with a notch in a stud 234 attached to the side of lever 229. The operating lever 229 is restored to the home position by a cam 235 attached to the sheet feeding gear 158 and cooperating with roller 231 whenever a feeding operation is selected.

In the normal position of the parts, cam 235 holds the lever 229 in a raised position so that the latch 233 may fall under the shoulder on stud 234. At the beginning of a sheet feeding cycle, cam 235 moves clockwise away from roller 231 and allows lever 229 to depend on latch 233. After a short interval of time, a pin 236 on cam 235 strikes the lower arm of latch 233 which is pivoted on stud 237 extending from the side frame. When the latch is so operated and rocked in a counterclockwise direction, it is moved out of the path of stud 234 and lever 229 is free to be operated by a spring 232. The spring moves down the piston 236 and creates a partial vacuum in the top of the cylinder 225. In communication with the top of the piston is a tube 237 leading to suction devices for engaging the top sheet in the magazine. The condition of a partial vacuum is maintained above the piston and throughout the length of tubing 237 for a short interval of time, during which the top sheet is lifted and separated from the remaining sheets in the magazine.

Before the sheet is pushed out of the magazine it is desired that the vacuum condition be relieved to release the sheet. This is accomplished by opening an air port 238 leading into the top of the cylinder. The air inlet port is normally closed by a valve lever 239 pivoted at 240 on the top of the cylinder head. A spring 241 tends to hold the valve closed. Abutting against the under side of the valve lever is a rod 242 guided near the top by a hole in the lug on the side of the cylinder head, and at its bottom end the rod is adjustably connected to one end of a bell crank 243 pivoted on stud 230. The vertical arm of bell crank 243 is formed with an offset portion 244 in the path of pin 236. As pin 236 is moved with cam 235 in a clockwise direction, it first encounters latch 233 to release the parts for the creation of suction in the feeding devices, and then, continuing in the same direction and soon after passing out of engagement with latch 233, the pin strikes offset portion 244 and rocks bell crank 243 in a clockwise direction to lift rod 242 and valve lever 239, so that air is allowed to enter above the piston and throughout the tubing 237 to relieve the vacuum condition causing suction therein.

A spring 245 is connected between latch 233 and bell crank 243 to hold these parts in the normal positions and to restore them when they are operated. As cam 235 continues to rotate in a clockwise direction and as it nears the end of the cycle, it cooperates with roller 231 to move lever 229 in a clockwise direction to restore the piston to the normal position near the top of the cylinder head and latch stud 234 over lever 233. As the piston moves, the air above the piston is driven through the port 238 automatically to permit an easier movement of the parts.

In Figs. 8 and 10, it is seen that the line of suction tubing 237 is terminated underneath the frame member 90 directly under the standard 221 and an opening within the standard provides an air passage between tubing 237 and a hollow shaft 249 pivoted horizontally at an angle within the lower part of the standard. Extending rearwardly from the tubular shaft 249 (Fig. 9) is a smaller tube 250 which carries at its end a suction cup 251. In Fig. 10, it is seen that the lower part of the suction cup 251 is cut away with an opening that leads into the hollow tube 250, the end of which is filled to prevent leakage of air except through the cup. The cup is clamped onto tube 250 at an angle poised above the lower right hand corner of the sheet (Fig. 9). Tube 250 does not project in a straight line beyond the inside of the bearing tube 249 but is bent to form a crank (Figs. 8 and 10), so that when the shaft 249 is rocked in the standard 221 the cup is clamped down upon the end of the top sheet, and then upon the return twisting motion the crank lifts the cup into the position shown in Fig. 10.

The arrangement for raising the suction cup and lowering it is shown in detail in Fig. 12. There it is seen that an operating arm 253 is secured to the hollow shaft 249 and carries a projecting pin 254 in cooperation with a cam 255 which holds the cup in the normal raised position. A spring 256 urges the engagement of the cup and sheet. However, as soon as the feeding cycle is initiated and shaft 169 starts to rotate counterclockwise, a depression in cam 255 permits counterclockwise motion of arm 253 and the suction parts connected therewith, with the result that the suction cup is clamped down upon the corner of the top sheet. Since a vacuum condition is created in the tubing leading to the cylinder already described, the top sheet is attracted to the cup and moved along therewith when it is raised by the cam shoulder 257 on cam 255. The suction cup is held in the raised position through the remainder of the cycle, but the vacuum condition therein is terminated shortly after a sheet separator is operated to pass under the lifted corner of the top sheet.

In Fig. 9 is shown a plan view of the sheet separator blade 260 which is pivotally mounted on a screw 261 fastened in the standard 221. The blade is shaped with a pointed end bent downwardly above the pile of sheets 50 (Fig. 10) but normally out of alignment with the front edge of the sheet, therefore permitting the suction cup to lift the edge of the top sheet higher than the blade. However, as soon as the cup and attached sheet edge are lifted, blade 260 is released to snap under the single lifted sheet and press down the other sheets as seen in Fig. 11. A coil spring 262 (Fig. 10) is coiled around a hub on screw 261 and tends to push the blade towards the sheets. However, movement of the blade is normally obstructed by a face cam 263 (Fig. 9) secured to shaft 169. Cooperating with the face of cam 263 is a pin 264 extending vertically upward from a short arm on the end of the blade opposite the separating point. As the cam 263 moves in a counterclockwise direction (Fig. 10) the pin 264 is in contact with a concentric level part of the face of the cam (Fig. 9) so that during the early part of the feeding cycle, while the suction cup is moving, the blade remains stationary. However, after about 90° of movement, a sharp depression 265 (Fig. 8) comes opposite the pin 264 and frees the blade for operation by the spring 262. The blade 260 is snapped into the sheet separating position and remains there until near the end of the cycle when a rise on the face of cam 26, strikes pin 264 and rocks the blade back in a clockwise direction (Fig. 9) to the home position. Overthrow of the returning blade is prevented by a long pin 266 riveted in frame 90 and projecting alongside the blade. The pin also aids in holding the blade hooked while the cam is assembled.

After the top sheet 50 is lifted by the suction cup 251 and held separated by the blade 260, lever 178 (Fig. 13) is lifted by cam 198 to free the sheet for horizontal movement by a pushing device.

The sheet pushing device is shown in detail in Fig. 11 where it is noted that a vertical web 269 of the standard 221 (Fig. 10) projects rearward to provide a fulcrum 270 for an L-shaped lever 271 carrying a roller 272 cooperating with a cam 273 on shaft 169. A coil spring 274 is wound around fulcrum 270 and pressed against a pin on the lever to urge it clockwise and press the roller 272 against the cam. Fastened to the side of lever 271 is a downwardly extending arm 275 formed with an offset pusher or picker extension 276 bent to cooperate with the front edge of the lifted sheet. During the first part of the rotation of shaft 169, lever 271 remains idle as roller 272 rides over a concentric part of cam 273. However, as soon as the sheet lifting, separating and releasing operations are completed, a sudden rise on cam 273, strikes roller 272 and rocks the lever 271 in a counterclockwise direction, causing extension 276 to push against the edge of the top sheet 50 and shove it towards the rear of the machine, into the bite of the feed rollers 55 and 56 (Fig. 10). Lever 271 is allowed to restore slowly by following a smooth descending surface on cam 273.

*The first set of feed rollers*

Directly behind the rear edge of the top sheet 50, (Fig. 10) are mounted the cooperating feed rollers 55 and 56 which rotate continuously during machine operation. When the top sheet is pushed between the rollers, it is carried along toward the rear and down between guides 57 and 58. The clockwise rotating rollers 56 are fastened to the shaft 94 which is driven by belt 141 (Fig. 14), as explained hereinbefore. A pinion 280 fastened to shaft 94 meshes with another pinion 281 on a shaft 282 carrying the upper pair of feed rollers 55, thus providing a driving connection between the rollers. Shaft 282 is not mounted in fixed bearings in the side frames 85 and 86 as is shaft 94. Instead, it is loosely supported at the right end in a bearing 283, and its left end is flexibly supported by an arm 284 on a shaft 285 loosely mounted in the side frames. Also attached to shaft 285 (Fig. 10), is an arm 286 to which is connected a spring 287 pulling the shaft in a counterclockwise direction to press rollers 55 down upon rollers 56. Therefore, rollers 55 are free to rise when a sheet of substantial thickness is fed, but they are maintained in contact with rollers 56 at all other times by spring 287.

A shield 288 is fastened to frame 91 under rollers 56 and not only holds the rear edges of the sheets away from the rollers, but also pushes the sheets into alignment when the magazine is raised.

The sheets are aligned in the other direction by a guide strip 289 (Fig. 10), which is attached to the inside of right frame 86 and bent to cam the edges of the upper sheets into the proper position.

As the top edge of the sheet 50 appears behind the rollers 55, 56, it is directed downward by a deflector 291 with ears 292 attached to the side frames.

The top end of the outer guide 57 is attached to deflector 291 by a clamp comprising an inner holding block 293, a leaf spring 294 and a screw knob 295 for tightening the connection.

The lower end of guide 57 is pivotally fastened to studs 296 on the side frames by ears 297 projecting from the sides of the guide.

While the sheet is passing down between guides 57 and 58, it is urged downward by the counterclockwise rotation (Fig. 10), of rollers 59 on the shaft 95 which is belt driven as already explained. Rollers 59 do not press the sheet against guide 58 and feed it positively, but instead they merely contact the underside of the sheet and urge it downward. After the sheet has passed beyond the feed control of rollers 55, 56 and is loose within the guides 57, 58, rollers 59 urge it down against the sheet stop 299.

*The sheet aligner*

While the sheet is loose within the guides 57 and 58, it is aligned laterally before being engaged by the normally open rollers 61 and 62 and carried further into the machine. There are two side aligners for putting the sheet in the proper position before it is analyzed. The one aligner 300 (Fig. 14), is fixed in the machine directly adjacent the open ended left side of guides 57 and 58. It is secured to frame 91 and a pair of square bars 301 which also stiffen the inner guide 58.

The other aligner 302 is located near the center of the machine and attached to a rod 303 which is moved at the beginning and ending of each cycle. Attached to aligner 302 (Figs. 10 and 14) are upper and lower flexible fingers 304, 305 which project through openings 306 and 307 cut in guides 57 and 58. The fingers usually assume the dotted line position shown in Fig. 14. However, as soon as the sheet feeding cycle is started, aligner 302 is withdrawn to the full line position and remains there until the sheet is away from rollers 55 and 56 and loose within the guides 57 and 58. Then, near the end of the sheet feeding cycle, aligner 302 is pushed toward the left to locate the sheet as the flexible fingers 304, 305 push it against the stationary aligner 300.

The left end of aligner rod 303 (Fig. 14) is loosely mounted within a bearing 311 secured to the side frame 86. The other end of the rod is formed with a stop shoulder 312 and a reduced portion slidably mounted within a bearing 313 secured in a hole in the main side frame 85. Fastened to the end of the rod is a collar 314 which serves to confine a coil spring 315 that tends to hold the rod over toward the right at all times. Another collar 316 is fastened to the rod to form an operating projection cooperating with a bell crank 317 pivoted at 318 on a boss extending from frame 91. Articulated on the horizontal arm of the bell crank is a link 319 (Fig. 10) which is pivotally connected at 320 on an operating lever 321 fulcrumed at 322 on the main side frame. The operating lever is formed with an offset shoulder 323 cooperating with a cam 324 secured to the feed clutch shaft 132. Referring to Fig. 7, it will be noted that shaft 132 is connected to the sheet feeding driving gear 158, the operation of which is mentioned hereinbefore. Turning back to Fig. 10, it is seen that cam 324 normally assumes a position wherein lever 321 is rocked in a clockwise direction to pull down link 319 and rock bell crank 317 (Fig. 14) in a counterclockwise direction, pushing rod 303 toward the left against the pressure of spring 315. However, cam 324 is shaped so that early in each feeding cycle, lever 321 is released to rock in a counterclockwise direction, so that the aligner 302 assumes the full line position shown in Fig. 14, wherein it is out of the path of the incoming ledger sheet. Late in every feeding cycle, at the time the sheet is free from all feeding rollers, the cam 324 again comes into action to operate the lever and push the aligner toward the left to confine the sheet within the appointed lateral bounds.

*Sheet stop and feed roller engaging devices*

While the sheet is being aligned within the guides 57 and 58 (Fig. 10) it is located longitudinally by the end stop 299 in engagement with the front edge of the sheet. The movements of the sheet laterally and longitudinally into a correct position are made possible by the opening of a space between the feed rollers 61 and 62. The operation for separating the feed rollers is synchronized with the operation for putting the sheet stop in the path of the advancing sheet, because normally when the stop is in effect, the rollers are ineffective, and conversely, when the rollers are made effective, the stop is to be withdrawn.

The lower pair of feed rollers 62 (Fig. 15) are attached to the shaft 137 provided with fixed bearings in both side frames and having gear connections with the driving motor as revealed in Fig. 7. The other upper rollers 61 are fastened to a rod 330 (Fig. 15) which carries a gear 331 in mesh with another gear 332 attached to shaft 98, so that the rollers are in constant operation as long as the motor is energized. Rod 330 carrying the upper feed rollers is arranged to be moved as part of a bail suspending the upper rollers above the lower fixed rollers. The bail comprises a pair of side arms 334 and 335. Arm 335 is pivoted on a stud 336 secured to the left side frame 86 (Fig. 15), while the other arm 334 is fulcrumed on the end of a stud 337 attached to the inside frame 85. The two arms are connected by a tube 338 to which is attached the hub of a connecting bracer link 339 encircling rod 330 to stiffen it midway between feed rollers and also act as a carrying means to rock the feed rollers in and out of contact with rollers 62.

The one side arm 334 (Fig. 10) is extended toward the front of the machine and formed with an offset lug 341 cooperating with a cam 342 attached to shaft 132. The cam is proportioned so that it normally depresses arm 334 to open rollers 61, 62 and close gate 299. Early in the feeding cycle, the rise on cam 342 moves away from lug 341 and allows closure of the rollers for sheet feeding until it nears the end of a complete revolution. Then, the rise on the cam cooperates with lug 341 to push down the front end of side arm 334 and rock it in a counterclockwise direction about the pivot 337. This serves to lift the entire roller holding unit comprising rod 330 and rollers 61.

At the time that this separation is caused between rollers 61 and 62, the advancing edge of the incoming ledger sheet is approaching a position between the rollers. It is, therefore, advisable to provide means for stopping the front of the sheet, and such a means is provided in the form of the stop or gate 299. The stop forms a cross member of a bail including a pair of levers 344 and 345 (Fig. 15) and an operating lever 345' secured to a rod 346 supported between the side frames. The cross section of stop 299 is formed in the shape of an L with a series of vertical extensions movable into the path of the advancing sheet. The ends of the stop member are formed with overturned ears riveted to the side levers 344 and 345. A link 347 is connected between the lever 345' and the operating side arm 334. A spring 340 attached to arm 334 holds the arm rocked in a clockwise direction with lug 341 in constant cooperation with cam 342. As the end of the cycle approaches, the cam pushes down the end of the arm as already explained to separate the rollers, and at the same time, link 347 is pushed down to rock the levers 344 and 345 in a counterclockwise direction to lift stop member 299 into the path of the advancing sheet. The parts are held in this position with the sheet aligned at the end of the cycle when sheet feeding is suspended.

Early in the next cycle of operation, cam 342 presents an abrupt depression which allows spring 340 to rock the operating arm 334 in a clockwise direction to lower feed roller 61 into contact with the ledger sheet and press it against the lower feed roller 62. At the same time, link 347 is pulled upward and the sheet stop is lowered out of the path of the sheet which is now properly aligned and ready to be directed forward by rollers 61 and 62 which continue to rotate.

The sheet guides 63 and 64 are supported on pairs of hinge hangers 350 and 351, Fig. 15, which encircle a rod 352. The rear edges of the guides are flared as at 353 to facilitate the entry of the sheet, and the edges are also scalloped to provide spaces for the upstanding projections 354 on the sheet stop 299. The lower ends of the guides 63 and 64 (Fig. 10a) are supported on studs extending from the top of brackets 377 fastened in the machine. These and other of the hinged guides give ready access to all parts of the sheet path for the removal of sheets should any jam occur.

A sensing device is provided to detect the appearance of a full sheet before the sheet reaches the platen. The brush 83 (Fig. 10a) is fastened to an insulating bar 355 above an insulation block 356 carrying a contact 84. The brush is situated in the path of the marginal perforations 51 in the sheet. Electrical connections in series therewith are timed to close when the last two marginal perforation positions pass the brush. If the sheet is full of lines of print, one or both of the last two perforations are present to allow brush 83 to make contact and set up a full sheet detecting circuit.

Referring to the timing diagram at the bottom of Fig. 32, the sequence of operation of the sheet feeding controls is apparent. There it is seen that suction is provided early in the cycle for grasping the sheet to be inserted. This is followed by action of the sheet separator, release by the sheet retainer, and operation of sheet pusher in the order mentioned. It is also noted that as the one sheet is inserted early in the sheet feed cycle, the ejector mechanism is operating to throw out the printed sheet. As the sheet is inserted, the side positioner operates to effect lateral alignment and then late in the cycle the sheet stop is put in the path of the sheet for longitudinal alignment. The feed rollers associated with the sheet stop are opened when the stop is in effect and then suddenly closed as the stop is withdrawn. Also occurring late in the sheet feed cycle is the analyzing and comparing operation in connection with the sheet passing to the print receiving position.

*Sheet account number sensing devices*

After the sheet passes stop 299 (Fig. 10) it is moved by rollers 61 and 62 toward the left and directed between the contact roll 66 (Fig. 10a) and feed rollers 65 which form part of a sensing unit for analyzing the perforations 372 (Fig. 9) representing the account number of the sheet.

Reference to Fig. 16 reveals that the metallic contact roll 66 is a tube that is fastened to two end collars 358 and 359 made of insulation material. The left collar 358 has a bushing which turns on the reduced end of a trunnion 360 fastened to the side frame 86. The other collar 359 is secured by pin 361 to a pinion 362 secured to the inner end of shaft 171. This shaft passes through a long bearing 363 fixed in the main frame 85, and at its outer end it is fastened to the drive pinion 170 in mesh with the gear 158 rotated for each sheet feed cycle. In mesh with pinion 362 is another pinion 364 attached to a shaft 365 carrying the pair of feed rollers 65. Through the driving connections mentioned, roll 66 (Fig. 10a) is driven in a clockwise direction and rollers 65 turn counterclockwise to carry the sheet forward during the sheet feeding operation.

Shaft 365 is supported by a pair of bearing brackets 366 and 367 (Fig. 16), fastened to the side of the angular frame member 92. Also secured to member 92 is a bar 368 of insulation material. The bar is screwed to the top flange of member 92 and it is shaped as a trapezium in cross section (Fig. 10a) and is cut away for the clearance of rollers 65 at the top of bracket 366. The top of the bar is notched to receive a number of brush holders 369 attached thereto by pins 370. The holders are arranged in three groups to place brushes 67, 67j, 67' and 67c in contact with the under side of contact roll 66. The equally spaced set of nine brushes 67 are the ones that are usually effective to sense the account number perforations 372 (Fig. 9) as they appear in the upper right corner of the ledger sheet 50. However, when a sheet is filled with printing impressions on one of its faces, it is turned over and then the account number perforations appear at the upper left corner of the sheet. As the sheet passes through the machine in the reversed position, the account number perforations are sensed by the other set of brushes 67' (Fig. 16). It is realized that in order that either of the sets of brushes 67 and 67' can be effective with respect to the account perforations 372, they must be symmetrically arranged so that they are equidistant from the center of the sheet as aligned by side guides 300 (Fig. 14) and 302.

Brush 67j (Fig. 16) is part of a jam detecting device. Electrical relay connections are established through brush 67j at a time when the sheet should be past the contact roller 66. When a sheet is delayed by a jam, brush 67j is insulated and the relay connections effect controls to stop the machine and hold up other functions as explained further hereinafter.

The single brush 67c (Fig. 16) is a common contactor for completing the circuit through the roll 66 and the brushes 67 or 67'. The tips of the brushes, 67, 67j, 67' and 67c pass through slots in an insulation plate 375 mounted directly beneath the contact roll 66 (Fig. 10a) as a continuation of the lower guide 64. Plate 375 is supported on the pair of brackets 376, 377 (Fig. 16) secured to the sides of the bar 368. The plate not only guides the sheet but it also protects the flexible ends of the brushes.

A narrow deflector bar 379 (Fig. 10a) is mounted across the machine directly above the front end of plate 375. The deflector is tipped downward to straighten any sheet that has a tendency to follow around roll 66. It directs the front edge of the sheet straight ahead into either of the channels above or below separator 68. Deflector 379 is fastened to an L-shaped cross bar 380 with ears fastened to the side frames.

*Oscillating guide with two sheet receiving channels*

When a sheet 50 moves forward from the sensing roll 66 (Fig. 10a), it is directed into one of two channels, between guide 69 and separator 68, or between guide 70 and separator 68. The reason for the two paths is to provide a means for overlapping two successive sheets so that, as one sheet is being printed upon at the platen 72, the next sheet may be analyzed and fed near the platen before the first sheet is ejected.

The upper edge of the center separator 68 is pointed and the edges of guides 69, 70 are bent or flared to provide for ready entrance of a sheet into the guide. All three guide members 68, 69 and 70 are fastened together and rested on a movable frame 381 for oscillating the upper ends of the members up and down alternately in front of the opening between plate 375 and bar 379. Near the end of the members are fastened two bars 382 and 383 which are joined together and attached to an extension 384, which merely rests on the top of the lifting frame 381. The frame is clamped on a shaft 385 after being set in the proper angular position thereon. Shaft 385 is pivotally mounted in the side frames. The mode of connection of the frame and guides is shown further in Fig. 16a.

The lower ends of the guides are secured to bars 386 and 387 (Fig. 10a) which are loosely fitted between overturned shoulders 397 and 398 bent in from auxiliary side frame 96. A grooved bar on the side frame 86 locates the other ends of bars 386, 387, but the entire channel unit is loose and removable.

Frame 381 is rocked by an arm 388 attached to shaft 385. Articulated on the end of arm 388 is one end of a link 389, the other end of which is pivoted on the bottom of a lever 390 fulcrumed on a stud 391 on the side frame 85. Pivoted on the top of lever 390 is a roller 392 cooperating with a cam 393 fastened to a gear 394 rotating on a screw stud 395 fastened on the side frame. Meshing with gear 394 is a pinion 396 fastened to the feed control shaft 132. Gear 394 is proportioned to be twice the size of pinion 396, so that two feeding operations take place while it turns through one complete revolution. Cam 393 is formed with concentric surfaces at two levels, and it is positioned to cooperate with roller 392 so that during one feeding cycle the roller is riding high when the sheet is inserted between guides 68 and 70, and on the next cycle it is riding on the lower face so that the channel is lowered to receive the second sheet between guides 68 and 69.

As shown, the guides are lowered with the channel between separator 68 and guide 69 receptive to the sheet coming out of the gate. However, on the next cycle, cam 393 pushes roller 392 to the left, rocking lever 390 counterclockwise, pulling link 389 to the right to rock frame 381 counterclockwise, lifting guides 68, 69, and 70, placing the channel between separator 68 and guide 70 available to receive the second sheet.

*Platen pressure rollers*

Cooperating with the upper and lower surfaces of the platen 72 (Fig. 10a) are a number of rollers for pressing the sheet against the platen while feeding and printing are taking place. As the sheet passes down from between the guides 68, 69 and 70, it is directed between the platen and a curved shield 400 (Fig. 8) shaped concentric with the outer surface of the platen. The sheet also passes over a long pressure roller 71 mounted on a tube 402 fastened to a shaft 403. The shaft is attached to a pair of side arms or bail levers 404, one of which is shown in Fig. 10a. There it is seen that the arm is shaped as a bell crank pivoted at 405 and provided with an operating pin 406 whereby the arms may be rocked about center 405 to separate the pressure roller 71 from the lower part of the platen.

Since the shield 400 does not extend upward into the printing zone to hold the sheet against the platen in that area, other confining means are provided in the form of a series of wires 407 (Fig. 8) arranged vertically and curved to cooperate with the periphery of the platen. These wires are attached to a bar 408 secured to the carriage frame 93 and side frame 86. The top part of shield 400 is notched to allow the wires to pass therebetween into contact with the platen. The top ends of the wires are fixed in a plate 409 which is attached to a cross bar 410 and arranged tangential to the upper surface of the platen.

Plate 409 is cut out with rectangular openings to allow the pair of upper pressure rollers 73 to cooperate with the platen. These rollers 73 are loosely pivoted in yokes 412 attached to a rectangular bar 413 which is in turn secured to the cross bar 410 pivoted in the side frames. Bar 410 is formed with round trunnions 417 received in rocking openings formed in frame 85 and the punch unit near the right frame 86.

An operating connection is provided for the holder of the upper rollers in the form of an arm 414 (Fig. 8) attached to the left side of rectangular bar 413. This arm carries an operating pin 415 in vertical alignment with the other operating pin 406 relating to the lower roller. These pins are operated to separate the rollers as explained hereinafter. A spring 416 is drawn between extensions on arms 404 and 414 to hold rollers 71 and 73 normally in cooperation with the surface of the platen.

Through the cooperation of shield 400, roller 71, wires 407, plate 409 and rollers 73 with the periphery of the platen, it is evident that the sheet is confined to contact with the platen as it passes around and upward toward the ejection devices.

Above the platen are the ejection feed rollers 74, 75 for carrying the sheet away from the platen. Roller 74 is fixed with respect to the platen since the center shaft carrying it is fulcrumed in the side frames. However, the other feed roller 75 is movable to provide a separation between rollers 74, 75 so that ejection feeding may be suspended while high speed insertion, line spacing and printing operations are taking place. The shaft 419 carrying roller 75 is mounted on a pair of side arms 420, one of which is shown in Fig. 10a. There it is seen that the arm is pivoted at 421 on the side frame 85 and has a spring 422 tending to hold roller 75 against the upper roller 74. Arm 420 has a dependent operating extension 423 pivotally connected to a link 424 which forms part of the operating connections for disengaging the pressure rollers.

Link 424 not only controls the movement of roller 75 into an effective position but it also has a similar control over the rollers 71 and 73. Near the forward end of link 424 is attached a semicircular operating end 425, the upper part of which is in contact with pin 415 and the lower part is in alignment with pin 406. Normally, the link is positioned to permit the rollers 71, 73 to cooperate with the platen while ejection roller 75 is separated from roller 74. However, as soon as a sheet feeding cycle is initiated, the link is moved to the left, rollers 71, 73 are moved away from the platen to permit sheet ejection and roller 75 is lifted to cause sheet ejection.

The upper end of link 424 is pivoted on the end of an arm 429 attached to a shaft 430 passing through the side frame 85. Referring to Fig. 7, it is noted that on the outside of frame 85, shaft 430 is secured to an operating lever 431, the lower part of which cooperates with the armature 432 of an ejection feed control magnet EM. A spring 433 attached to the armature 432 tends to hold the armature upward in cooperation with the end of the lever. Whenever it is desired to eject a sheet from the platen, magnet EM is energized to draw down the armature and release lever 431 which is then rocked in a counterclockwise direction due to the pull exerted by a spring 434 (Fig. 10a) attached to link 424 and tending to draw the link into a roller disengaging position at all times.

As soon as the sheet being ejected is engaged by rollers 78, 79 (Fig. 10a) the rollers 74, 75 can be opened to permit the insertion of the second sheet around the platen. The ejection initiating mechanism is restored soon after the sheet feeding cycle is started due to the cooperation of a sector 435 (Fig. 7) with a roller 436 on the end of one arm of lever 431. Sector 435 forms part of a head space operating lever 437 pivoted at 438 and formed with an operating arm carrying a roller 439 in cooperation with the feeding control cam 177 already mentioned. During each feeding cycle, cam 177 makes one revolution and in so doing rocks lever 437 with a uniform counterclockwise and then clockwise movement. Since lever 431 is released upon the initiation of a sheet feeding cycle, the roller 436 thereon will stand in the path of the cam face on the sector 435 attached to the lever 437 and will be restored thereby at about the middle of the head spacing part of the sheet feeding cycle. When restored, the connections including link 424 withdraw to permit cooperation between the pressure rollers and the platen, and at the same time separate the ejection roller 75 from fixed roller 74. A driving connection is maintained between the platen and the bottom pressure roller 71 through a gear 441 (Fig. 8) attached to the platen and meshing with a pinion 442 attached to the shaft 403 and tube 402 carrying the roller 71.

*Manual sheet feeding selection*

Referring to Figs. 22 and 23, it is seen that beyond the outside of frame 85 there is secured a triangular plate 445 attached to the ends of studs 230 and 237 and supported on a screw stud 446. The plate carries a stud 447 upon which is pivoted a three-armed lever 448. One arm carries a pin 449 cooperating with the armature 162 controlling sheet feeding. The other arm carries a pin 450 cooperating with the armature 432 for controlling sheet ejection operation, and the third arm is formed with a stop lug 451 cooperating with the side of plate 445 to hold lever 448 in the normal position as urged by spring 452. A finger piece 453 is formed on lever 448 near the end of the arm carrying pin 450. This finger piece 453 extends toward the outside of the machine and may be depressed by the operator to rock the lever 448 in a counterclockwise direction to trip both armatures 162 and 432 to select a sheet feeding and ejection cycle independent of the electrical controls of the machine. After being depressed momentarily, lever 448 can be released since it will be restored by spring 452.

Plate 445 (Fig. 22) is provided with a hub 455 supporting the end of shaft 132. Attached to the end of the shaft is a circular disk 456 bearing a series of graduation marks cut around the outer surface near the periphery of the disk. The graduations are related to the 48 cycle points of the sheet feeding cycle. A pin 457 extends from the plate 445 and projects directly above the upper edge of disk 456 and carries a vertical mark for registering with the marks carried by disk. These gauging devices are provided to control the timing positioning and assembly of feed control shaft 132, also the gearing and clutch devices carried thereby.

*Head spacing and high speed platen driving devices*

Mechanisms are provided to rotate the platen and advance the sheet thereon first over the head space and then beyond the heading space and near the posting position. After the sheet is advanced to within a few lines from the posting position, other line spacing devices carry on the operation of the platen at a slower rate, so that the final adjustment may be held to more accurate spacing. The high speed feeding devices are provided because it is desired that the sheet pass beyond the head space and up to the posting position as rapidly as possible.

During the initial part of the head spacing operation, the platen rotation is ineffective because at this time the pressure rollers are held away from the platen, so that the leading edge of the incoming sheet may be advanced within the grasp of pressure rollers, after which the rollers are released to engage and make effective the head spacing and high speed platen operation to carry the incoming sheet to the proper position as the preceding sheet is being ejected.

It is explained hereinbefore how the cam 177 (Fig. 7) is rotated through one revolution for each selected sheet feeding operation. This cam cooperates with sector 437 to rock it back and forth with a uniform motion during the sheet feeding cycle. Attached to sector 437 is a segment 460 (Figs. 19, 19a and 19b) meshing with a small gear 461 loosely mounted on a fixed stud 148. A spring 462 attached to segment 460 tends to restore the segment in a counterclockwise direction about pivot 438 after the first half of the cycle, during which it has been operated in a positive way by the cam.

Adjacent gear 461 (Fig. 19a) and connected thereto is a carrying arm 463 upon which is pivoted a head space pawl 464 on a stud 465 attached to the arm. A coiled wire spring 483 holds the pawl rocked into action. The pawl cooperates with a ratchet wheel 466 attached to a gear 467 also loosely pivoted on the stud 148. The driving connection is effective to operate gear 467 in a counterclockwise direction (Fig. 7) during the first half of the sheet feeding cycle. During the remainder of the cycle, pawl 464 escapes idly over the teeth on ratchet wheel 466. The motion of gear 467 is communicated to the inner clutch gear 468 (Fig. 19) of a pair of high speed driving clutch gears loosely mounted adjacent each other on a fixed stud 469. The outer clutch gear 470 is proportioned the same as the operating gear 468, and between the two there are clutch disks 471 normally separated so that the rotation of gear 468 is not communicated to gear 470.

Gear 468 meshes directly with gear 481 (Fig. 8) on the platen shaft 105 to drive it for the head spacing action. The ratchet drive and the platen operate idly until cam 435 (Fig. 7) engages roller 436 to rock lever 431 and engage the pressure rollers for head spacing. Soon after the sheet is pressed against the platen and spaced therein the high speed drive comes into action.

Adjustably secured to stud 469 (Fig. 19) is a fixed drum 472 carrying a fulcrum point 473 which engages the side of an armature 474 guided at its upper end by a projection 475 on the fixed drum and loosely pivoted at its lower end on a stud 476 projecting from a bracket 477 holding a high speed control magnet HS to the main side frame 85. The upper end of armature 474 is formed as a yoke embracing the sides of stud 469. The lower end of the armature is formed with a hole through which passes a reduced section of stud 476.

Pressing between the side of armature 474 and a head on stud 476 is a spring 478 tending to rock the armature in a clockwise direction about pivot 473. Keyed to stud 469 and slidable axially thereon is a pointed pressure block 479 cooperating with the sides of the armature 474 and gear 468. When the magnet HS is energized to cause high speed operation of the platen armature 474 is rocked in a counterclockwise direction about pivot 473 and the upper end of the armature is rocked toward the left (Fig. 19), pushing block 479 in the same direction and pressing gear 468 toward the left to engage the clutch face on the constantly rotating gear 470 to form a driving connection therebetween. Gear 470 is driven rapidly by a pinion 485 fastened to the shaft 149 which is in constant rotation as driven by the gear 136 secured thereto as already explained. The driving motion of gear 470 is communicated through the clutch to gear 468 and then to pinion 481 (Fig. 8) fastened to the platen shaft.

From the foregoing it is apparent that gear 468 (Fig. 19) is driven from two sources, the pawl 464 and ratchet 466 for head spacing, and the clutch gear 470 for high speed feeding. During high speed operation, gear 467 is also turned, but the ratchet teeth on wheel 466 pass ineffectively under pawl 464.

The duration of the energization of the high speed magnet HS and the extent of high speed feeding of the sheet is determined by the number of feed control perforations 51 (Fig. 1) extending down the margin of the sheet. A sensing brush 542, (Fig. 18) senses the procession of marginal perforations and maintains a high speed circuit until insulated by the unused part of the sheet.

*The brake*

A brake is provided for preventing overthrow of the platen at the end of a high speed operation. The braking action is normally applied, but a solenoid BS is wired in parallel with the high speed magnet HS, for regulating the withdrawal of the brakes so that when the fast feeding action is selected, the braking action is withdrawn.

Reference to Figs. 8 and 20 reveals that a brake drum 498 is fastened on the platen shaft 105 outside the left side frame 85. Around the drum is drawn a brake band 499 attached to one end to a fixed stud 500 on the side frame and at the other end the band is attached to a stud 501 projecting from the side of an operating lever 502 pivoted at 503 on the side frame. The end of lever 502 fits into a notch cut in the side of the solenoid plunger 504 passing upward through the center of the solenoid BS mounted on a bracket 506 attached to frame 85. A spring 507 is attached to lever 502 and tends to rock it clockwise about pivot 503 to exert a normal tightening action without any large amount of pressure to provide a normal restraining influence over the action of the platen. A larger spring 505 is coiled around the plunger 504 and cooperates with a shoulder thereon to push the plunger downward and rock the cooperating lever 502 in a clockwise direction. Whenever the high speed magnet HS is energized, solenoid BS is also activated and causes plunger 504 to lift so that lever 502 is no longer pressed in a clockwise direction but is released, so that only the light pressure spring 507 is exerted to keep the brake band taut without exerting any substantial braking action. However, upon the deenergization of the high speed magnet HS there is need for a slowing up of the rotating platen. Then solenoid BS is also suddenly deenergized, and spring 505 drives down the plunger 504 to rock the lever 502 and tighten band 499 with a sudden snubbing action that diminishes as the kinetic force of the parts is expended.

The amount of braking pressure normally applied does not prevent the operation of the platen for head spacing and line spacing, but merely restrains any tendency for overthrowing.

*Line spacing devices*

It is explained earlier in the specification that a constantly running drive connection from gear 131 (Fig. 7) is carried over by a train of gearing to drive gear 136 (Fig. 19) and operate a connected line space operating ratched 150 (Fig. 21). In alignment with ratchet 150 is an operating pawl 510 pivoted at 511 on the side of a clutch plate 512 loosely pivoted on shaft 149. The pawl 510 is formed with a notch into which is inserted a pin 513 on an oscillating engagement control member 514 also loosely pivoted on shaft 149 adjacent the clutch plate 512. Plate 512 and member 514 are connected by a pair of springs 515 which tend to draw the parts together, so that a stop 516 projecting from member 514 is brought against center 511. When such a movement is permitted, the pin 513 moves in the notch of the pawl 510, causing it to rock into engagement with the teeth of the constantly rotating drive ratchet 150. However, the parts are normally held out of engagement because one of the two lugs 518, 518' on member 514 abuts against the end of an armature 519 associated with the line space control magnet LS. The armature is pivoted on a stud 520 which holds a bail-shaped locking member 521 formed with a slanted offset portion 522 adapted to ride over one of a pair of projections 523, 523' formed on the outer edge of plate 512. A spring 524 is drawn between latch 521 and armature 519 and both parts cooperate with a stop stud 525 projecting from side frame 85.

When the magnet LS is energized, armature 519 is rocked in a counterclockwise direction to release member 514 which then is urged by springs 515 to rock counterclockwise with respect to plate 512. When this is done, the pin 513 causes pawl 510 to move into the path of the constantly rotating clutch driving ratchet, and the entire assembly of clutch parts is rotated in a counterclockwise direction. The operation is stopped after a half revolution because the stopping projections are duplicated at intervals of 180° around the clutch parts. After plate 512 has moved through most of the half revolution, projection 518' is obstructed by armature 519, and member 514 is rocked clockwise with respect to plate 512 which continues in operation even though pawl 510 is being slowly withdrawn from the operating ratchet. The plate moves until extension 523' is a short distance beyond offset portion 522, at which time the pawl 510 is out of the path of ratchet 150 and the parts are again held in a disengaged position somewhat similar to that shown in Fig. 21.

Integral with plate 512 (Fig. 19) is a collar 528 formed with an eccentric portion 529. Riding on the eccentric portion is a collar 530 formed with two concentric shoulders fitted within the circular ends of a pair of line spacing pawls 531 and 532 (Fig. 20). The pawls reach down and have pointed ends cooperating with a ratchet 533 (Fig. 8) attached to platen shaft 105 between gear 481 and brake drum 498. Turning back to Fig. 20, it is noted that a spring 534 is drawn between the two line space pawls and holds them in cooperation with the teeth on the ratchet wheel.

The reason for the provision of two line space pawls is to take advantage of both directions of movement of the eccentric 529 about the center 149. Pawl 531 is formed with a downwardly facing point to engage one side of a ratchet gear 533 to drive it one line space in a counterclockwise direction, while the other pawl 532 has an upwardly facing shoulder 535 cooperating with the opposite side of the ratchet wheel to pull the platen shaft around in the same direction through an extent of movement equal to one line space, when the eccentric is passing through the upwardly moving portion of its stroke about shaft 149.

The number of line spacing operations imparted to a platen shaft is determined by the length of time or the number of times that line space magnet LS is energized, and that in turn is determined by the last few marginal feed control perforations 51 (Fig. 1) appearing on the side of the ledger sheet 50 passing around the platen after high speed operation is terminated. The eccentric line space operating unit is supported on shaft 149 (Fig. 19) by a pair of ball bearings 537 fastened to the ends of the unit and spaced between gear 485 and ratchet 150.

The line space magnet LS is not only energized to control the positioning of the sheet to the proper posting position, but it is also energized as an incident to item and total printing operations. Brushes 543, 544 and 545 (Fig. 18) cooperate with the marginal perforations in the sheet to control operation of the line space magnet. Early in each item or total printing cycle, cam contacts close to energize magnet LS to advance the sheet one line space before an impression is recorded.

*The ejection drive*

A train of gearing is provided to maintain constant rotation of the ejection rollers. The short shaft 149 (Fig. 19) is supported by bearing 486 within the side frame 85 and another bearing 487 supported on an auxiliary frame 488 (Fig. 7) fastened on studs projecting from the side frame and serving to space the shafts 105 and 149. The shaft projects inside the frame 85 (Fig. 19) and the gear 491 is attached there to drive a train of connections to the ejection rollers best shown in Fig. 10a. Gear 491 rotates in a clockwise direction and drives a pinion 492 secured near the end of shaft 99 carrying the upper feed roller 74. Adjacent gear 492 (Fig. 8) is another pinion 493 cooperating with a similar pinion (not shown) on the lower feed roller 75. The ejection drive from gear 491 (Fig. 10a) is carried up to the upper ejection rollers through a pair of idler gears 494 and 495, the latter of which drives a pinion 496 (Fig. 8) secured to shaft 100 carrying the lower ejection roller 79.

Although the ejection rollers are always turning, the time when they are made effective is determined by the time of closure of the lower rollers 74, 75 (Fig. 10a) and that is determined by the energization of magnet EM.

*Devices for punching and sensing the marginal feed control perforations*

Attached to the right side frame 86 (Fig. 17) is a plate 540 carrying the devices for punching and sensing the feed control perforations 51 (Fig. 1) in the ledger sheet 50. Attached to the plate 540 and projecting inwardly beyond the inside of frame 86 is a semicircular block 541 (Fig. 18). This curved block is located with its center coinciding with the center of the platen 72 and its outer surface coinciding with the periphery of the platen. The right end of the platen (Fig. 8) does not pass over to the right side frame but is centered in the inner part of block 541, and the ledger sheet overlaps the joint between the two so that the marginal area carrying the feed control perforations is passed within the stationary continuation of the platen wherein a series of brushes 542, 543, 544 and 545 (Fig. 18) as well as the punch 546 cooperate with the sheet. The four brushes are fastened to a semicircular insulation piece 547 fastened to the curved block 541. The brushes are arranged in vertical alignment and directed outward at different angles to cooperate with the successive feed control perforation positions presented as a sheet passes around the platen.

The high speed control brush 542 projects into cooperation with a curved contact member 549 which is shaped to coincide with the diameter of the platen and spaced to act as a guide for the sheet as well as contact member, permitting the establishment of a circuit when a perforation appears under brush 542. Contact member 549 is fixed to bar 408 but insulated therefrom.

The other three brushes are line space feed control brushes cooperating with a common contact block 550 also shaped to coincide with the path of the record sheet and attached to an insulation bar 551 secured to the plate 540.

Brush 542 is the controlling member for the high speed drive to continue insertion of the sheet as long as marginal perforations are sensed. When sheet is about five lines short of the printing point, the marginal perforations move out of range of brush 542 and high speed feeding is terminated. The other brushes are the line space controls for directing successive impulses through the line space control magnet as long as perforations are sensed. Line space operation takes place ineffectively during high speed operation and then continues after the termination of the high speed feed.

Brush 545 is positioned so that the last perforation initiated cycle serves to operate the mechanism to carry the sheet forward with the last marginal perforation directly under the punch.

Early in each printing cycle, cam contacts close in series with the line space magnet to operate the spacing mechanism in order to move the sheet so that it is one line space beyond the line bearing the last printing impression and also to move the last marginal perforation one space beyond the punch.

The punch 546 is mounted in alignment with the brushes and at a distance of one line space beyond the upper brush 545 it is guided by a sleeve 553 attached to the outer plate 540. Directly beneath the lower end of the punch is a die plate 554 attached to the block 541 at an angle, so that the upper end of the die plate is tangent to the surface of the platen and directed to coincide with the path taken by the sheet as it leaves the platen. The circular chips of paper pushed down through the die plate 554 are directed into an enlarged opening 555 which is slanted through the block 541 and leads toward an opening 556 leading into a box 557 (Fig. 5) hung on the outside of the carriage frame.

The punch plunger is reciprocated under control of a punch solenoid PS (Fig. 17). This solenoid is mounted on a bracket 560 secured to the outside of plate 540. The core piece 561 of the solenoid is normally drawn outward by a spring 562 attached to a stud 563, to which is pivotally connected a link 564 articulated at the upper end on an operating arm 565. The arm is clamped to a short shaft 566 which extends through plate 540 to the inside of the side frame and there carries a short arm 567 (Fig. 18) with an extension fitted into a notch cut into the side of punch 546.

Whenever the solenoid PS is energized, the core piece is drawn downward against the tension of spring 562, and arm 565 is rocked in a counterclockwise direction to move arm 567 in the same direction and depress punch 546 through the record sheet and into the die plate 554.

The parts are restored by spring 562 as soon as the solenoid is deenergized. An impulse is directed to the punch control solenoid whenever a printing operation takes place. The number of marginal perforations 51 so produced form a gage or control for indicating what portion of the record sheet is already used for recording purposes. And the perforations also form the means for controlling the extent to which a sheet is reinserted to carry on the posting operations directly under previously printed impressions.

*End zone and overflow detecting devices*

While printing operations are taking place, the rollers 74, 75 (Fig. 10a) are separated to permit free movement of the top of the sheet toward the top of guides 76, 77. When a sheet is almost completely filled with recorded data, the top edge of it approaches a pair of sheet sensing levers 570, 571, the ends of which project into the path of the record sheet. These levers are pivoted on centers 572 and 573 extending from the inside of a U-shaped bracket 574 (Fig. 8) attached to the inside of side plate 86. A cover plate 589 is bent to form a contact box on the bracket. Also attached to the bracket 574 are a series of insulation blocks carrying pairs of contacts 575 and 576 (Fig. 10a). These contacts are normally open and remain so as long as the ends of levers 570, 571 project through openings in guides 76, 77 without detecting the presence of the upper edge of the record sheet. However, as soon as the record sheet feeds from the seventh line from the bottom to the sixth line from the bottom, said lines being at the printing point on the platen, the upper edge of the sheet cooperates with the end of lever 570 and rocks it in a counterclockwise direction about the pivot 572, so that pin 577 on the end of lever 570 operates contacts 575 to close them.

The other contacts 576 are closed in a similar fashion by a pin 578 on the lever 571 which is rocked in a counterclockwise direction when the end of the sheet brushes against the end of lever 571. If the last mentioned lever is operated while printing operations are taking place, it is an indication that the sheet is passing from the next to the last, to the last line on the sheet. Then the machine is stopped unless a group change is detected concurrent with the closure of contacts 576. A total can be printed on the last line of the sheet, but if other item cards await reading, the machine is stopped (see acct. #22, Fig. 3a) and a red light is flashed to warn the operator that the sheet should be turned over or a new sheet inserted.

Both levers 570, 571, control the operation of ejection offsetting devices for extending the sheets in the stacker after they are filled or receive lines of print in the end zone.

*Ejection devices*

After a sheet has been positioned around the platen and received all related printed matter, a change in group is detected on the cards in the tabulator. The group control devices then initiate a total taking and resetting operation after which there is operation of the controls for removing the sheet from the platen and ejecting it into the stacker. The sheet is first engaged by the lower set of ejection rollers 74, 75 (Fig. 10a) which are permitted to cooperate immediately upon sheet feeding initiation to carry the sheet upward between guides 76 and 77 at the same time that the pressure rollers are withdrawn from cooperation with the platen.

Ordinarily, the record sheet is driven upward by rollers 74 and 75 and then engaged by the other upper ejection rollers 78 and 79 which throw it straight into the stacker. Rollers 79 are mounted on a relatively fixed shaft 100 carrying gear 496 shown in Fig. 8. Adjacent gear 496 is another gear 580 connected thereto for driving another set of offsetting ejection rollers 80, 81 described hereinafter.

Shaft 100 projects through brackets near both side frames and is driven by the train of constantly rotating gearing made effective through the energization of the eject magnet EM as already explained. Directly above feed rollers 79, and normally in contact therewith for frictional driving, are the feed rollers 78 attached to a shaft 581 (Fig. 24) mounted for movement relative to shaft 100. One end of shaft 581 is formed with a ball end 582 rotating in a socket constructed on the side of a bracket 583 fastened to the stationary frame 90. The other end of shaft 581 (Fig. 25) is secured to a rocking frame 584 pivoted on a stud 585 projecting from a bracket 587 attached to frame 90. Pivoted on the top of the rocking frame is a link 586 which is articulated on the end of a solenoid plunger 587 which is part of the solenoid OS secured to the frame 86 by a bracket 588.

Rocking frame 584 not only carries a shaft 581 supporting the ordinary ejecting roller 78 but on the opposite side of center of 585 it is bent to receive one end of a slanted shaft 590 carrying the upper offset rollers 80. A spring 591 is attached to the end of the rocking frame and pulls it in a clockwise direction to lower the solenoid plunger 587 and press the feed roller 78 into contact with roller 79 and lift the offsetting rollers 80 away from the lower offsetting rollers 81. The shaft 581 holding the upper rollers 78 is formed with a ball end 579 (Fig. 24) fitted into the side of rocking frame 584 to permit a slight swiveling action when shaft 581 is rocked upward about center 582 at the other end of the shaft.

The upper offset roller carrying shaft 590 is also formed with ball ends 592 and 593 (Fig. 24) to permit rocking movement of the shaft. The ball 593 is formed near the left end of the shaft 590 and operates in a bracket 594 attached to the frame casting 90. Attached to the shaft is a helical gear 595 meshing with a similar gear 596 (Fig. 8) attached to the lower drive shaft 100 carrying the ordinary feed rollers 79. Through this gear connection a driving relationship is maintained at all times with the upper offsetting rollers. Of course, these upper rollers are normally ineffective due to the position in which they are placed by the rocking frame 584. From the foregoing it is apparent that only shafts 100 and 590 are driven and that the rollers on the other free shafts 581 and 596 are driven by frictional engagement.

The lower offset rollers 81 (Fig. 8) are carried on a shaft 596 which is also mounted at an angle to the ordinary roller shaft 100, but at the same angle and directly beneath the upper shaft 590. Shaft 596 is not rocked in any way but the right end of it is pivoted in a hub 601 on an offset portion extending from the bracket 597. The left end of shaft 596 is formed with a ball end 598, Fig. 24, seated in bracket 583 which is also the carrier for the left end of shaft 581. Bracket 597 supports the right ends of all the ejection roller shafts, shafts 100 and 596 being mounted directly on the bracket while the other shafts 581 and 590 are connected thereto indirectly through the center 585 of the rocking frame which is attached to the bracket. At the left end of the unit (Fig. 24) bracket 594 supports shafts 100 and 590.

The three brackets 583, 594 and 597 carrying the regular ejection rollers and the offset ejection rollers are tied together so that, when they are unscrewed from the main frame 90, they are held together and removable as a unit with the shafts carried thereby. They are tied together by bar 599 and which bar passes across the machine behind the brackets. Attached to the front of bar 599 are a pair of sheet deflectors 603 and 604 which have horizontal extensions located directly above the upper surfaces of the stationary rollers 79 and 81. The purpose of these deflectors is to prevent the record sheet from coming into contact with the rotating offsetting rollers 80 when the rollers are lifted to the position wherein they are supposed to be ineffective.

The rocking frame 584 (Fig. 25) is provided with a sheet guiding means for cooperating with the edge of the sheet to direct it downward. The guide takes the form of a block 605 fastened to a hub 602, Fig. 24, attached to the frame 584 and encircling the pivot 585. The block is shaped with a slanted lower surface, Fig. 25, for depressing the right edge, Fig. 24, of the ejecting sheet away from the right offsetting roller 80 when the roller is lifted.

From the foregoing, it is apparent that as the sheet passes through the ejection rollers, it is directed into the stacker in either of two directions. Normally, the sheet is not filled and has a capacity for additional items and, when ejected, is directed in a straight line by rollers 78, 79 so that it falls into the stacker near the right side of the stacker. However, if the sheet is found to be full or filled within the area of the end zone at the bottom of the sheet, this condition is sensed and the offsetting solenoid OS (Fig. 25) is energized to rock frame 584 counterclockwise and make the rollers 80 effective, so that as the sheet passes between rollers 80, 81 it is directed to the side and shifted or offset so that the left side of the sheet extends out of the side of the pile assembled in the stacker.

*The sheet stacker*

In Figs. 4 and 5, it is seen that the sheet stacker is a box which is hung at an angle at the front of the machine directly over the printer. The stacker box is composed of a base plate 610 (Fig. 10a) bent to form a rear wall 611 and a front wall 612 (Fig. 5). Side walls 613 and 614 are formed separately and attached to the base. A brace bar 615 (Fig. 9) is fastened between the side frames and not only spaces them but also acts as a bearing through which there passes a rod 616 located in the main side frame 85. The right side frame of the box 614 (Fig. 4) extends rearwardly with an ear 617 encircling a pin 618 extending inwardly (Fig. 9) from the right side frame 86. The box is held on pin 618 by a spacing collar 619 attached to the side wall 613 of the stacker and provided with a knurled set screw 620 for attaching the box to the rod 616 in a spaced relation with regard to the main frame 85. A series of wires 621 slope down from bar 615 to guide the sheets to the bottom of the box.

The base 610 (Fig. 10a) of the stacker carries a depending bar 624 containing a strip of rubber 625 adapted to press against the top of the printer, so that the weight of the stacker may be supported thereon.

Attached to the rear wall 611 of the stacker is a deflector 626 which is bent upward and curved into the path of the sheets where they leave the ejection rollers. This deflector prevents the sheets from curving downward and doubling up within the stacker as they leave the ejection rollers.

A curved cover 628 (Figs. 4 and 5) is hinged on rod 616 and loosely assembled to project over the front wall 612 of the stacker. In Fig. 5 it is shown that the front wall 612 is cut away with an opening and other semicircular openings are cut in the base 610 and the cover plate 628 to provide ready access to the pile of sheets within the stacker. The opening 629 is not large enough for removal of the sheets but is provided so that the operator may grasp the front end of the pile and lift it above the front wall when the cover is lifted.

Account number comparing and indicating mechanism

The main purpose of the comparing unit is to read account number perforations in the cards and related sheets store and compare the numbers and establish three circuit connections according to whether the numbers are equal, the card number greater or the sheet number greater. Two number storing devices are provided which are similar in many ways to the comparing devices of the collator device disclosed in Patent 2,359,670, filed December 24, 1936. As an incident to the storage of the card number, a visual indication is displayed revealing the card number before the card is sensed to control printing, thereby furnishing the operator with the information concerning the particular ledger sheet to be placed on the top of the pile in the sheet magazine.

In Fig. 5, it is shown that the comparing unit is mounted within a cover secured to the upper left hand corner of the main frame 85. Within the cover plate 631 (Fig. 26), the comparing mechanism is suspended between a pair of side frames 656 held together with a number of cross bars and attached to a rear frame 630 secured to the main side frame 85.

Attached to the right side frame 656 (Fig. 28) is a U-shaped bracket 632 forming a gear box within which the operating cams and gears are mounted. Bracket 632 is spaced from the side frame 656 by shaft 122 already mentioned as the fulcrum for the operating gears 120 and 121.

Referring to Fig. 7, it is noted that these operating gears 120 and 121 are in mesh with gears 119 and 116, respectively, relating to a drive from the sheet feeding mechanism and a separate drive from the card feeding mechanism as pointed out hereinbefore.

Turning to Fig. 29, it is noted that each of the gears 120, 121 has secured thereto pairs of cams for controlling the operation and restoration of the comparing mechanism. Sheet number setting gear 120 is associated with a pair of cams 633 and 634 mounted on a collar 635 and pinned together by pin 636, the entire cam unit being loosely pivoted on shaft 122. In a similar way there is associated with card number setting gear 121 cams 637, 638 mounted on a collar 639 and pinned together with pin 640.

Cooperating with the four cams are sets of follower rollers on arms pinned to a pair of operating shafts 641 and 642. The upper shaft 641 is the card number setting and restoring control, while the lower shaft 642 controls the sheet number setting and restoring. These shafts run through bearings provided in the side frames and the outer part of bracket 632 (Fig. 28). Attached to the upper or card setting control shaft 641 is a fixed collar 643, to which are attached a pair of depending arms 644 carrying rollers 645 cooperating with cams 637 and 633. The sheet setting control shaft 642 carries a long collar 646 supporting a pair of spaced arms 647 carrying a pair of rollers 648. These rollers cooperate with cams 638 and 634 attached to the different operating cam assemblies.

When a card feeding operation takes place, gear 121 is rotated and carries along therewith cams 637, 638 to operate the shafts 641, 642, the one being rocked to adjust the sectors of the card side of the comparing unit while the other attempts to restore the sectors of the sheet side of the comparing unit. In a similar way when the sheet feeding drive is in operation, gear 120 is rotated to turn cams 633, 634 and rock the two shafts 641, 642 to provide a setting for the sheet side of the comparing unit and make possible restoration of the card side of the comparing unit. This sort of complementary control is required because there are times when only one part of the machine is operating and the other side of the comparing unit should be restored. For example, after an equal comparison, sheet feeding is not operated while cards are fed and analyzed, and yet the sheet number should be restored to get ready for another comparison. Therefore restoration of the sheet side of the comparing unit is controlled by cam 638, Fig. 30, which is driven by the card feed gearing.

Cam 633 is operated by the sheet feed drive and it controls card number restoration. Cam 634 is also operated by the sheet feed drive, but it controls the setting and restoration of the sheet number side of the comparing unit. Cam 638 is operated by the card feed drive and it controls sheet number restoration. Cam 637 is operated by the card feed gearing and it controls the setting and restoration of the card number side of the comparing unit.

In Fig. 30, the cams are shown in an operated position near the end of an operating cycle. The normal or home positions of the cams with respect to the rollers 645 and 648 are shown by the dotted circles representing the rollers.

In Fig. 27 it is shown how the operating shafts 641, 642 cooperate with the two parts or sides of the interior mechanism of the comparing unit. The upper part or card side of the unit contains number registering sectors, the movement of which is controlled by a bail 683 pivoted on a rod 672. A similar but independent bail 684 is also pivoted on rod 672 and provided to control sectors in the lower part or sheet side of the unit. Pivotally attached to bail 684 is one end of a short link 649, the other end of which is articulated near the top of an arm 650 fastened to the sheet number setting shaft 642. In a similar way, the card number setting shaft 641 carries an arm 652 to which is pivoted a link 651 articulated on the card number setting bail 683. The two bails are shown in full lines in the fully operated positions to agree with the operated positions of the parts in Fig. 26. However, when in the home positions, the bails are set as shown in dotted lines, Fig. 27. The setting movements of the bails are made in clockwise directions, shaft 641 rocking clockwise, and shaft 642 rocking counterclockwise. Restoration is accomplished by springs 689 on the back stroke of the bails when they are released by the restoration control magnets CR and SR. The restoration movement of the bails is fast but not uncontrolled because the cams 633, 634, 637, 638 continue to exercise control over the bails. The restoring magnets operate when the high points of the cams are under rollers 645 and 648. The interior mechanism for the unit is mounted in the pair of side plates 656 (Fig. 26) secured together by six magnet support bars 657, two stop pawl support bars 658 and two spring anchoring bars 659. The magnet support bars 657 are secured to plates 656 by means of angle strips 660 screwed to said plates.

The two rigid frames thus formed by plates 656 and the bars 657, 658, 659 are fastened to plates 85' which are mounted on two rectangular bars 661, 662 and back frame 630 secured to the main framework of the machine.

The comparing unit is provided with the main support rod 672 (Figs. 26 and 27) which is secured to the centers of the side plates 656, and the bulk of the moving parts of the unit are supported by this rod. Rotatably mounted on rod 672 in interspersed relation are two series of sectors designated 673, 674 in Fig. 26. There are a plurality of sectors in each series to correspond with the number of comparing magnets in the comparing unit. Each sector 673 is associated with one of the card comparing magnets CCM and is paired with one of the sectors 674, which sector in turn is associated with one of the sheet control magnets SCM. There is a pair of magnets like CCM, SCM and a pair of sectors 673, 674 for each denominational order. The sectors for each denominational order are located side by side but are separated by certain parts which are mounted on rod 672 between the sectors.

The bars 658 are transversely slotted and are also longitudinally grooved to support pivot wires 675. The wires 675 act as pivots for stop pawls 676 located in and spaced by the transverse slots in the bars 658. There is a stop pawl 676 for each sector 673, 674 and each pawl is located in the plane of its cooperating sector so as to be capable of engaging ratchet teeth formed in the sector. Springs 677 attached to the pawls and to the spring anchoring bars 659 tend to rock the pawls 676 into engagement with the ratchet teeth on the sectors 673, 674. Combs 658a secured to bars 658 hold the pawls 676 and sectors 673, 674 in alignment.

Normally the pawls are held out of engagement with the sectors by means of the armatures 678 of the comparing magnets. The comparing magnets CCM and SCM are mounted on narrow plates 679, each secured to the central bar 657 and to one of the outer bars. Since the coils of the magnets are larger in diameter than the width of the space allotted to each pair of sectors 673, 674, with their pawls and other parts comprising one denominational order, the magnets of each group of ten are arranged in two parallel rows of five each, with the magnets in staggered relation. Thus, the two pawls 676 associated with the two sectors 673, 674 shown in Fig. 26 are controlled by the left hand magnet CCM and the right hand magnet SCM, while the right hand magnet CCM and the left hand magnet SCM control the pawls associated with the pair of sectors 673, 674 immediately behind those shown in Fig. 26. The numerals 1 and 2 on the coils of the magnets indicate the denominational orders.

The magnets CCM are plugged to the upper card brushes UB, Fig. 33b, to place the magnets under control of the holes in the successive cards. Similarly, magnets SCM will be connected to brushes 67 and 67' for reading the sheet number perforations. The comparing magnets have L-shaped yokes 680 (Fig. 26) secured to the plates 679 by the same screws 681 as are used to secure the cores of the coils to the yokes. The vertical portions of the yokes are provided at their ends with rectangular slots to form a pair of top posts 680a which project through aligned slots located on opposite edges of the armatures 678. The horizontal portions of the slots in the yokes 680 and the sides of the slots in the armatures 678 are slightly beveled and these beveled portions coact to form pivots for the armatures. Springs 682 attached to the armatures 678 and to pins carried by yokes 680 tend to hold the armatures in engagement with the stop pawls 676.

The free ends of armatures 678 associated with the left hand row of magnets CCM (Fig. 26) and the right hand magnets SCM rest on shoulders formed in the tails of the associated pawls 676 and abut the vertical walls of the shoulders. The armatures 678 for the right hand magnets CCM and the left hand magnets SCM have openings adapted to hook over the tooth formed by the shoulders in the pawls and rest on the shoulders. Thus, the armatures 678 normally hold pawls 676 out of engagement with the sectors 673, 674.

Rotatably mounted on the rod 672 are the two bails 683, 684 associated with the two series of sectors 673, 674, respectively. The bail 683 projects through the planes of all the sectors 673 and is connected to the sectors by means of springs 685 which tend to draw the sectors 673 into engagement with the bails so that oscillation of the bails will cause the sectors to follow the movements of the bails, provided none of the pawls 676 has been released. Bail 684 is similarly associated with sectors 674.

Oscillation of the bails is controlled by the cams 633, 634, 637 and 638, Fig. 30, and operating shafts 641, 642, Fig. 27, as already explained. Heavy coil springs 689 (Fig. 27), attached to pins 690 carried by the arms of the bails and to brackets 691 secured to plates 656, have a tendency to rock the bails in a counterclockwise direction and thereby through the shafts 641, 642 press the rollers 645, 648, Fig. 30, into contact with cams 633, 634, 637, 638.

There are nine ratchet teeth in each sector 673, 674, Fig. 26, and also abutments 673a, 674a comprising zero stops projecting a greater distance radially of rod 672 than the ratchet teeth, so as to arrest the sectors in a zero position by engaging the ends of stop pawls 676 in every case where a stop pawl is not released by energization of a magnet. In other words, the sectors 673, 674 will always move to zero positions unless stopped in other positions by release of the stop pawls 676. The ratchet teeth have the numerical values shown in Fig. 26 by the small numerals adjacent the teeth and the cams 634, 637 are so shaped that, as the bails move in a clockwise direction, the ratchet teeth will pass the ends of pawls 676 in synchronism with the sensing of the corresponding index-point positions on the ledger sheet and record card. In other words, all of the "9" teeth will be approaching close to the ends of pawls 676 when the brushes reach the "9" index-point positions, and so also for the other index-point positions.

Fig. 26 shows the positions assumed by the sectors 673, 674 for the units order of the comparing unit when both the card and related sheet have a "9" hole in the units column of the account number field, in which the numbers compared are recorded. In this figure, the bails 683, 684 have moved to their limit of travel in a clockwise direction, reached after all the number perforation positions have passed under the sensing brushes.

Normally, restoring movement of the bails 683, 684 is prevented by mechanisms controlled by certain restoring magnets, designated CR and SR, Fig. 27. These restoring magnets are constructed like the comparing magnets CCM and SCM and are similarly mounted on bars by means of plates 679a like the plates 679. The armatures 678a of magnets CR, SR engage shoulders in stop pawls 692 actuated by springs 693 anchored to bar 659. The stop pawls project into the paths of stop arms 694 pivoted on slotted blocks 695 secured to the centers of the crossbars on bails 683, 684. Springs 696 attached to bails 683, 684 and to ears formed in the stop arms 694 normally hold the stop arms against the bails which act as stops to limit clockwise movement of the stop arms. Stop pawls 692 are formed with restoring extensions 731, and bell cranks 729 are provided to restore the armatures 678a. Both 731 and 729 are struck at the end of the counterclockwise swing of the bails.

As the bails 683 and 684 (Fig. 26) move clockwise to control the movement of the sectors to their digit representing positions, the stop arms 694 (Fig. 27) snap past the stop pawls 692. The restoring movement of the bail 683 resets the card number register by moving the sectors 673 to their normal positions. If the magnet CR is not energized before the bail 683 starts to move counterclockwise, the related stop arm 694 will engage the stop pawl 692 and the bail 683 will not move counterclockwise. Thus, the card number register will not be reset. The magnet CR is energized before the bail 683 is restored when the card number side is to be reset. This magnet attracts its armature 678a to release the stop pawl 692 which is rocked by the spring 693 out of the path of the stop arm 694 so that the bail 683 can be restored and can reset the register. Magnet SR controls the reset of the sheet number register in the same way.

Each pair of sectors 673, 674 in moving to various positions under control of the card and sheet sensing brushes will also move relative to each other different extents angularly about rod 672 according to whether the hole in one of the columns compared is higher or lower in value than the other, but will not move relative to each other when the holes are of the same value. Each pair of sectors 673, 674 is connected together mechanically to control a switching device for manifesting which of the holes in the two record mediums compared is higher or lower with respect to the column compared and also to indicate when the holes are equal in value. This mechanical connection is shown most clearly in Fig. 26.

Both sectors 673, 674 are provided with pins 697 located equal distances from rod 672 and having circumferential slots riding in curved slots formed in a differential link 698, which in outline has some resemblance to an ox bow as viewed from the right hand margin in Fig. 26. Each differential link has a pin 699 which extends through, and projects from, both sides of the differential link. The front end or head of the pin 699 is provided with a circumferential groove embracing a straight slot formed in a guide 700, while the shank of the pin acts as a rivet to secure a grooved collar to the rear side of the differential link. The grooved collar is of substantially the same dimensions as the head of the pin and the groove in the collar embraces a cam slot formed in a contact control arm 701.

The guide plates 700 are forked at one end to partly surround rod 672 and also have a shallow rectangular slot at the other end embracing a support bar 702 secured to end plates 656. The upper and lower edges of bar 702 are provided with slots to prevent the guide plates from being displaced along said bar. The rod 672 is provided with circumferential grooves into which the forked portions of guide plates 700 are located. Thus, the guide plates are maintained in accurately spaced relation on rod 672 and bar 702, respectively.

The guide slots in the plates 700 are straight and extend radially of rod 672. It is evident that links 698 may rotate about pins 699 as an axis and that the pins may also slide radially of rod 672 but cannot be displaced angularly of rod 672. The curved slots in links 698 are so designed that, when both sectors of a pair move equal distances, as would be the case when both holes in a given column of two related cards and sheets have the same numerical value, both ends of the link will receive equal angular displacements and consequently pin 699 will remain stationary so far as movement radially of rod 672 is concerned. On the other hand, if a hole in a given column of the card, for example, is higher in value than the hole in the same column of the sheet, the sector 674 will move clockwise a greater extent than the sector 673. As a result, the lower end of link 698 will be moved farther to the left than the upper end is moved to the left, causing pin 699 to move to the left.

The contact control arms 701 are rotatably mounted on rod 672 and the slots therein have two long straight portions, angularly displaced with reference to rod 672 and substantially radial of rod 672, and also a relatively short straight portion connecting the longer portions but making a rather sharp angle to a line passing through the center of rod 672. When both sectors 673, 674 of a pair are at either of their limits of travel or in positions having the same value, the pin 699 will be located at the center of the short connecting portion of the slot in arm 701, thus holding said arm in a neutral position. When any pin 699 is caused to move to the left, as is the case where a hole in a given column of the card is higher than the hole in the sheet, pin 699 enters the left hand straight portion of the slot in the associated contact control arm 701, causing said arm to rock clockwise. On the other hand, when the numerical relation of the holes is reversed and pin 699 moves to the right from the neutral position, pin 699 enters the right hand straight portion of the slot in contact control arm 701, camming said arm in a counterclockwise direction.

Summarizing the foregoing, the switch control arms 701 move in a clockwise direction (Fig. 26) when the card account number is higher than the sheet number and move counterclockwise when the sheet number is higher in value.

Attached to the end of each switch arm 701 is a curved insulation block 745 cooperating with the center blades 746, 747, of sets of comparing contacts. An assembly 743 of blades and interspersed insulation pieces are fixed to a crossbar 742 at the top, and a similar assembly 744 is attached to another bar 742. When the center blades are positioned as shown in the normal or "equal" position, outer contacts 749 and 751 are closed and other inner contacts 748, 750 are opened. When any arm 701 is lowered to a "high card" position, block 745 moves away from the upper center blade 746 and it then springs over towards the left to close contacts 748 and open contacts 749. Should any arm be raised to a "high sheet" position, block 745 moves away from the lower center blade 747 which then bends over to the left to close contacts 750 and open contacts 751.

Contacts 748—751 are wired in series with relays for controlling the operation of the machine according to whether an equal, high card or high sheet condition is sensed by the comparing unit.

In Fig. 33b the contacts 748—751 are shown connected for control according to "equal," "high sheet," and "high card" conditions. Small numbers 1—7 are placed near the sets of contacts to distinguish the lower and higher orders in a left to right sequence. It is seen that the normally closed contacts 749 and 751 are interconnected for an "equal" circuit when the contacts are undisturbed. This condition also prevails for unused denominations of the comparing units.

Let us assume that a card is punched to represent account number 6896 while the compared sheet relates to account number 6977. Since the two numbers are equal in the highest or fourth denomination, contacts 749 and 751 of this and all higher orders remain closed as shown in Fig. 33b. Contact 750 of the third or hundreds denomination will close as well as the first order contact, because in both these denominations the sheet digit is larger than the card digit. In the second or tens order, the card digit is larger and contacts 748 are closed. It is apparent that when the third or hundreds order contact 750 is closed and the related contact 751 is opened, a high sheet circuit is sent through a wire 819 but the lower order contacts are separated from the circuit. The gist of the foregoing is that the highest denomination, in which there is a difference in the values of the digits being compared, predominates over all lower denominations of the comparing unit.

Knock-off mechanism is provided for the armatures of the comparing magnets CCM, SCM as shown in Fig. 26. A separate knock-off bail 722 is provided for the armatures of each group of comparing magnets. Each bail is pivoted on a pair of screw studs 723 carried by side plates 656 and extends transversely of the tips of armatures 678 on the same side thereof as the coils of the comparing magnets. Springs 724 anchored to bars 658 hold the knock-off bails against the edges of angle strips 725 secured to bars 657, which angle strips act as stops for the knock-off bails. Secured to each bail is a pair of side arms 726 which extend into the paths of bails 683, 684. When the latter push the sectors 673, 674 back to their starting position by rotation in a counterclockwise direction, the noses of pawls 676 wipe over the teeth in sectors 673, 674 and eventually ride up on the smooth portions 673b, 674b of the sectors which are made slightly higher than the teeth, for the purpose of camming the pawls 676 slightly beyond the latching position. At this point the bails 683, 684 strike the arms 726 and rock bails 722 clockwise, thereby forcing the armatures 678 into latching relation with the pawls 676 in the event the armatures should stick to the poles of the magnets.

The crossbars of bails 683, 684 swing to abut against extending arms on two armature knock-off levers 729, each associated with one of the restoring magnets CR, SR. The levers 729 are pivoted on brackets 730 secured to the L-shaped yokes 680a of the restoring magnets and the horizontal arms of levers 729 have bent-over lugs cooperating with the undersides of the armatures 678a of the restoring magnets. It is apparent that in the restored position of the bails, levers 729 are operated to force the armatures 678a away from the poles of the magnets. When this takes place, stop pawls 692 are also rocked and by engagement of the bails with extensions 731 formed thereon said pawls are rocked clockwise slightly beyond their latching positions with armatures 678a. Thus, both the pawls 692 and armatures 678a are positively restored whenever sticking thereof occurs.

The numeral settings of the sectors in the card side of the comparing unit are revealed to the operator so that he will know the account number of the card groups and be able to match them with related ledger sheets whenever the machine stops.

Adjacent each of the card number sectors 673, Fig. 26, is a segment 705 loosely pivoted on rod 672 and attached to the sector by the stud 697. An outer concentric flange 706 is formed on each of the segments, and this flange bears the indicating numerals 0–9 located to agree with the digital stopping positions of the associated sector. As shown in Fig. 26, the sector is stopped in the "9" position, and therefore a "9" on the segment is displayed through an indicator plate 707 and a window opening 708 in case 631. All the other segments are adjusted in a similar way to reveal the complete account number.

Accumulating devices

The mechanism controlled by adding magnet AM is shown in Fig. 31. This adding mechanism is of the well known Hollerith type and its operation briefly is as follows: A shaft 710 is driven in the usual manner in synchronism with the card feeding mechanism so as to make one revolution for each card passing through the machine. Attached to shaft 710 and rotating therewith are clutch elements 711 which are shiftable along the shaft to engage the other faces 712 of the clutches. These latter elements are integral with gears 713 which mesh with gears 714 associated with the usual numeral or index wheels 715 freely carried on resetting shaft 716. Each clutch element 711 is normally urged towards its related element 712 by a pivoted lever 717 which is urged in a counterclockwise direction by a leaf spring 718. Movement in this direction is normally prevented by an armature latch 719 which engages a block 720 to hold the arm 717 in the position shown. When magnet AM is energized, the latch 719 is released and the driving element 711 engages 712 to cause rotation of the index wheels 715. At the end of each revolution of shaft 710, the clutch 711 is mechanically disengaged in the usual manner so that the amount of rotation imparted to the index wheel 715 is dependent upon the time in the cycle at which magnet AM is energized. Thus, if magnet AM is energized at the "5" time, wheel 715 will be advanced five steps before the clutch 711 is disengaged.

Total readout devices

Associated with each adding wheel is a total readout device which consists of a commutator 721 provided with segments 732 corresponding in number and position to the several digit indicating positions of the index wheel 715. A brush structure 733 is carried by and insulated from a gear 734 meshing with gear 713 so that the brush structure 733 is angularly displaced an amount corresponding to the reading on the numeral wheel. The structure carries two brushes, one of which engages the segments 732 and the other engages a common segmental conductor 728 whose contacting surface is concentric with the supporting shaft of gear 734. The segments 732 and conductors 728 are diagrammatically represented in developed form in the circuit diagram at the top of Fig. 33b. Each group of segments 732 corresponding to the same digit is connected to a common conducting wire 752 whereby all the "9" segments are in multiple, all the "8" segments are in multiple, and so on. The wires 752 have a branch extending through a cable 753 to an emitter E shown diagrammatically, which is driven in synchronism with the movement of the printing mechanism during total printing operations and under control of this emitter total printing is effected in exactly the same manner as set forth in Patent 1,976,617.

The printing devices

The devices for printing on the ledger sheet are controlled by the record card sensing means in the tabulator. A printer control magnet PM (Fig. 4) is energized at a differential time according to the time of sensing a perforation in the record card 49 by a lower brush. Moving in synchronism with the feeding of the card is a typebar 755 formed with notches 756 that move in succession past a stop pawl 757. When magnet PM is energized it attracts an armature lever 758 to which is attached a call wire 759 connected at the opposite end to a latch 760 for releasing pawl 757. Thus, the typebar 755 is stopped differentially by the pawl engaging in one of the notches 756, the bar stopping between hammer 761 and platen 72 to place at the printing line a type 762 corresponding to the perforation sensed. There is provided for each order or denomination a set of printing elements such as those described. For a more detailed study of the printer, reference may be made to Patent 1,976,617.

Circuit breakers for sheet sensing circuits

A pair of circuit breakers is provided to control the direction of impulses through the sheet side of the comparing unit. A small gear 735, Fig. 7, is pivoted on a stud 736 and in mesh with the sheet feed gear 174. Gear 735 is proportioned to turn three times for each revolution of drive gear 174 and in so doing carries a pair of scalloped breaker wheels 737 and 737' past contact levers 738 and 738' (behind lever 738) in synchronism with the sheet feed. The levers are pivoted at 739 on an insulated holder 740 secured to frame 85. Extending from holder 740 are the upper points of contacts 741 and 741' closed by the elevation of the points on the ends of the levers. Although three series of closures are made by the breakers, only one series is used, and that is the series put into effect near the end of the sheet feed cycle as shown on the time chart, Fig. 32.

Circuit diagram

The complete operation of the machine will now be explained in connection with the circuit diagram, Figs. 33a-33d. Fig. 33a shows in part the wiring arrangement of the tabulator and it is similar in certain respects to that of the machine shown and described in Patent 1,976,617 already referred to. As machines of this type are well known, a detailed description thereof need not be made herein, other than to briefly outline the general operation of the machine and the manner in which it effects and is affected by control of the posting unit by means of the present invention.

Fig. 33a also shows the sheet feed motor M which is energized through closure of a switch 793 and its connections to a power plug 770. One side of switch 793 is connected by a wire 772 to the power source and one main line 773. The other side of the switch is connected to a wire 792 (Fig. 33d) and the circuit is completed through contacts R70b, wires 794 and 787 (Fig. 33b), list lever contacts 788 and line 773.

During adding operations, the tabulator section of the machine is driven by the tabulating motor TM controlled by a group of cam and relay controlled circuits indicated at the top of the diagram and is driven during total taking and resetting operations by a reset motor RM controlled by a group of circuits, contacts and relays also shown near the top. When the tabulating motor TM is in operation, it feeds the perforated tabulating cards 49 bearing differentially arranged index points representing digits, first, beneath the upper analyzing brushes UB, Fig. 33b, and exactly one machine cycle later beneath the lower analyzing brushes LB. By means of the group control mechanism indicated generally at GC, Fig. 33a, groups of cards as represented by the same data entry in certain selected columns may be operated upon separately, the items of each group being accumulated and the total of them taken before the machine begins operations under control of the following card groups. As the perforated cards pass the lower brushes LB, Fig. 33b, their index points instantaneously close circuits through the proper lower analyzing brushes LB to energize accumulator magnets AM. A representative adding circuit may be traced as follows: from side of line 772, wire 797, adding magnet AM, plug socket 764 and a connection to the lower brush sockets, lower brush LB, perforation in the record card and contact roller 765, lower card lever contacts R7Bb, impulse distributors CB1 and CB2 and wire 766 to the other side line 773. This is the usual adding circuit and, as usual, the timed energizations of the magnets AM control mechanism for entering the data corresponding to the card reading on the accumulator wheels. The circuit breaker split contacts L17 are provided to prevent "X" or "12" impulses from going into the lower brush adding circuit.

When any accumulator magnet AM is energized, a parallel circuit is directed through contacts 374a (similar to those contacts so identified in Patent 1,976,617) for energizing a printer magnet PM to select the type corresponding to the entered data for printing. In this fashion, the accumulated items may be listed. These functions do not enter specifically into the present invention and will not be described in detail as they are well understood and fully described and explained in the patents previously mentioned.

As explained in Patent 1,976,617 with reference to switching the printer magnets to the readout devices during total taking cycles, the magnet R374 is energized and causes opening of contacts 374a and closure of contacts 374b. The closure of the latter contacts connects the printing magnets PM to the common conducting strips 728 of the accumulator readout device. During total taking, circuits will be completed through the readout devices 732 and 728 at differential times according to the position of the brushes 733 by means of circuits of which the following is representative. Assuming a brush standing at "4," a circuit will be completed when one of the brushes 768 of emitter E contacts with the "4" segment as follows: from line 773, switch S, circuit breaking contacts 769, the common contact sector of the emitter, brushes 768, the "4" segment, "4" wire 752, cable 753, brush 733, common strip 728, closed contact 767b, print magnet PM and wire 763 to line 772.

At the center of Fig. 33a, it is seen that a number of relays are controlled by the card levers U and L for detecting the presence of cards at the upper and lower brush sensing stations. Contacts UCL are closed to make effective relays R4, R5, R6 and R6B and then a holding circuit for all is established through relay contacts R6a and cam contacts L5. Contacts LCL when closed cause energization of relays R7, R7A, R8, R8A, R7B and R8B. A holding circuit is set up through contacts R8a and cam contacts L6.

A special holding circuit is directed through relay R8B of the lower card lever control. The relay closes holding contacts R8Bb in series with cam contacts L40. The last mentioned contacts hold closed longer than contacts L6 in order that line spacing and punching operations may be performed in connection with the printing of the last total. The circuit through the holding coil of relay R8B includes line 772, Fig. 33a, wire 709, holding coil of relay R8B, contacts R8Bb, wire 727, contacts L40, wire 806, Fig. 33b, an auxiliary line 767, lever operated contacts 788 normally closed in listing and opened only when tabulating, and line 773. Relay R8B operates and holds related contacts R8Bc, Fig. 33c, and R8Bd, in the punch and space control circuits as explained hereinafter.

The automatic group control devices are of a form operative when both sets of card sensing brushes are connected to one side of the line. Since it is desired to read the account number from a card under the upper brushes UB, Fig. 33b, these brushes are connected to the same side of the line as the lower brushes LB which control adding and printing. In other words, the group control devices are constructed to conform with the arrangement of the brushes made to provide indicator readings. In Fig. 33b, it is seen that the lower brushes LB are effective to detect perforations in a card passing between the brushes and the contact roller 765. The latter is electrically connected through contacts R7Bb, closed by the lower card lever relay R7B, and circuit breaker contacts CB1, CB2 connected to the right side of the line 773. The other set of card sensing brushes, the upper brushes UB, are also connected to the right side of the line 773, through upper card lever operated contacts R5b and circuit breaker contacts CB3 and CB4.

Pairs of related group control pickup coils GCLp and GCUp are connected by plug wires to the lower and upper brushes respectively. If the control perforation appearing at the upper brush station agrees with the control perforation appearing at the lower brush station in the same column of successive cards, both pickup coils GCLp and GCUp are energized at the same time and a series circuit is directed through their holding coils. Cam contacts L27 in series with the control pickup coils are closed during the perforation analyzing part of the cycle.

Each pickup coil has associated therewith control holding coils shown in Fig. 33a. These holding coils GCUh and GCLh are connected in series with each other and also in series with related holding contacts GCUa and GCLa. When both pickup coils are energized at the same time, both holding coils are also energized and serve to set up circuits through cam contacts L12 and L13 closed to hold the circuit until near the end of the cycle. The holding relays GCLh not only operate contacts GCLa but they also serve to operate the ordinary group control contacts GCLb which are connected in series with each other and also selectively plugged in series with a number of control relays R18, R19, R20 and special minor control relays R53 and R54. These last mentioned group control relays are also connected in series with a special control testing cam contact L36 which is opened earlier than the usual minor control testing contacts L10 in order to prepare the card and sheet comparing controls operating at the 11 index point of the tabulator cycle. As long as contacts GCLb remain closed to indicate agreement between successive cards, the control relays will remain energized. However, when any change in card group occurs, one or more of the contacts GCLb are opened and the relays are deenergized.

The sectors in the comparing unit are set up under control of impulses directed through perforations in the cards and the ledger sheets. The card side of the comparing unit contains the control magnets CCM connected to the upper brushes. In Fig. 33b the control for the setting of the card numbers may be followed from line 772, through wire 797, wire 801, a setting magnet CCM, plug wire to the upper brush, then through contact roller 796, upper card lever contacts R5b, circuit breaker contacts CB3, CB4, and wire 766 to line 773. The sheet side of the comparing unit is adjusted under control of magnets SCM wired in series with brushes 67, 67' cooperating with the sheet sensing contact roller 66. An example of a circuit for setting up a sheet number in a comparing unit may be pointed out as follows: from line 772, through wire 801, common brush 67c, roller 66, sensing brushes 67, magnet SCM, wire 802, circuit breaker contacts 741, 741', jam control contacts R52b, and line 773. Brushes 67' are connected in parallel with the other brushes 67 which are ordinarily used. Whenever a sheet is turned over, the brushes 67 become ineffective and then the account number perforations in the sheet are sensed by brushes 67'.

Before going further into the description of the wiring of the separate controls, it is believed well to set forth the electrical controls brought into effect preparatory to machine operation.

The machine is connected to a direct current power source by inserting plug 770, Fig. 33a, into any convenient outlet. Switch 771 is then closed to direct the current through the two main lines 772 and 773. The direction of polarity of the current is dependent upon the position in which the plug is inserted, and it is of interest in this case because a number of amplifying tubes are used in the circuit and the direction in which they are biased is important. If the plug is inserted so that line 772 is on the positive side of the current, a polarity control tube P (Fig. 33d) is ineffective and a circuit direction control relay R102 is not brought into play. However, should line 772 be on the negative side of the current, tube P becomes effective because it is subject to current control from one direction only to direct a circuit through relay R102. The circuit through the relay includes the main line 772, relay R102, wire 774, the cathode side of the tube, and across to the plate and through wires 789 and 787, cam contacts S17, relay contacts R52d, closed immediately upon power connection, and line 773 to the power source. The relay then shifts its associated contacts R102a and R102b. These changes affect the direction of the current through the lines 775 and 776, the former being held constantly on the positive side and the latter always maintained negative.

In addition to the polarity control tube, a number of other beam power amplifying tubes are connected between lines 775 and 776, as illustrated in Fig. 33d. Tubes L, H and F are provided for the purposes respectively of controlling line spacing, high speed feeding, and full sheet sensing. All of these tubes are connected with sensing brushes detecting perforations in the record ledger sheets. The reason for the provision of the tubes is to prevent arcing at the brushes, which is eliminated because currents of small magnitude are used to render the tubes conductive. Another tube TD is provided to control a time delay relay R104. This tube TD is a gas triode tube also known as a "gas filled trigger tube." These last mentioned controls are necessary because a time interval of about 40 seconds is needed to permit the tubes to warm up before the machine is started into operation. Without such control, the start key of the carriage could be depressed and a sheet directed through the machine before the control brushes connected with the tubes are ready to analyze the feed control perforations.

When the machine is plugged with the correct polarity, there is only an interval of 40 seconds before the time delay tube TD is warmed up sufficiently to call relay R104 into action. However, when the reverse is true, an interval of 80 seconds is required because half of the time is needed to call the polarity control tube P into action, whereupon the connections to the time delay tube are reversed and it takes another interval of 40 seconds to call relay R104 into effect. Relay R104 has associated contacts in the tabulator start circuit to hold up starting conditions until the various tubes are ready to play their part. Relay R104 is energized through a circuit including line 772, upper contacts R102b, wire 777, relay R104, tube TD, wire 776, upper contacts R102a, wires 790, 791, jam control contacts R70b (closed because relay R70 is operated by contacts P13 on a preliminary reset cycle), wire 794 and auxiliary line 787. The relay then closes upper contacts R104a to establish a holding circuit through wire 778, passing around tube TD. Relay R104 also closes contacts R104b, Fig. 33a, to make possible a start circuit for the tabulator.

*Starting conditions*

When starting operation of the machine with the tabulator and sheet holder empty, it is only necessary to use the tabulator reset key and the feed motor start key. Automatic start control is set up so that it is necessary to have the first card at the lower brushes before the sheet feeding devices will operate through the initial cycle. The enforcement of this sequence of control is desirable because it provides a card account number reading in the indicating window of the comparing unit and enables the operator to place the correct ledger sheet on the top of the pile of sheets in the magazine. It is assumed that the operator inserts cards but no sheets and then throws the switch 771 of the machine. Depression of the reset key of the tabulator serves to pick up the usual control relays and operate relays R53 and R54 through a series of circuits which may be traced as follows:

The initial reset circuit is from line 772, Fig. 33a, through cam contacts P3 normally closed, relay R3, normally closed contacts R28b, reset key contacts RK, the lower contacts R2a, wire 779, contacts L2 and wire 780 to the other line 773. During the reset cycle, contacts P9 close to set up the usual minor control relays R19 and R20 and at the same time make effective the pickup coils of relays R18, R54, and R53. The circuits through the several pickup coils may be traced from line 772, through wire 781, contacts P9, the pickup coils of relays R18, R54 and R53, and wire 782, to line 773. The holding coil of relay R18 is in series with relays R19 and R20 and also in series with contacts R18a closed by the holding coil. This circuit through R18a is provided for the purpose of holding the energization of relays R18, R19 and R20 until control testing time in the cycle, when the test cam contacts L10 open. Then, if the card groups have changed, one or more GC contacts are opened and the relays are deenergized.

The holding coils of relays R53 and R54 are arranged in parallel with the ordinary minor control relays and are tested earlier than the other relays by means of a cam contact L36, which is open a short time before the testing time of the ordinary group control cam contacts. The circuit through the relays is established through contacts R54b closed by the holding coil relay R54. The holding circuit includes line 772, wire 781, contacts R54b, holding coils of relays R53, R54, card lever relay contacts R7b and R4a, and wire 782 to line 773. The controls affected by operation of the auxiliary minor control relays R53 and R54 are pointed out hereinafter.

At the time that contacts P9 close to effect operation of the control relays, another cam contact P13, Fig. 33c, is closed during the same reset cycle. This last mentioned contact is in series with a relay R70 provided as part of a jam detecting device. The pickup circuit through relay R70 (Fig. 33d) may be followed from line 772, through wire 783, the pickup coil R70, wire 784 (Fig. 33c), wire 785, contacts P13 and line 773. The relay then establishes a holding circuit through contacts R70a and a wire 786, which branches out in parallel connections through normally closed cam contacts S17 to the right line 787 connected to main line 773 (Fig. 33b) as long as contacts 788 are closed to select listing operation. The other part of the holding circuit is at most times effective to pass through relay contacts R52d, Fig. 33d, which are normally effective at the time when cam contacts S17 open, indicating that there is no jam condition at the sheet sensing rollers. Relay R52, Fig. 33b, is in series with a brush 67j sensing the sheet contact roller 66 at a time when the tail of the sheet is supposed to be past the roller. Should the end of the sheet be present under the brush 67j in series with relay R52, the brush is insulated, the relay is deenergized, and it is an indication that the sheet is jammed and should be removed before the operation of the machine is continued. Relay R70, Fig. 33d, operates its contacts R70b in series with the connections holding the feed motor and sensing tubes effective. The reason for these other connections is that, should any jam occur, it is also desirable to render these connections ineffective. Contacts R70b are in parallel with cam contacts S12 opened at a time when a sheet is supposed to be away from the sheet contact roller. These cam contacts S12 are connected to auxiliary line 787 and also attached to wire 790 carrying the polarity control contact R102a usually contacting with the negative side 776 of the amplifying tube circuits.

Wires 731 and 792 (Fig. 33d) also connect cam contacts S12 to the lower polarity control contacts R102b. Wire 792 also runs up to the motor M (Fig. 33a) to convey current from the right side of the line through the motor when the switches 793 are closed. Cam contacts S12 are open during most of each sheet feeding cycle but the circuit is usually maintained through contacts R70b and wire 794 connected directly to line 787 to maintain the motor in operation. This condition is in effect as long as contacts R70b are held effective by the relay R52, which in turn depends on the absence of a jam condition.

After the reset cycle, a pair of tabulator start cycles are initiated to bring the first card down past the upper brushes. The tabulating start operation may be initiated in one of two ways: By the depression of the tabulator start key TST (Fig. 33a), or by the closure of the sheet feed start key contacts CST (Fig. 33c). The key CST calls into effect a relay R62 with its contacts in parallel with the usual tabulator key. These connections are provided so that machine operation may be controlled near the sheet magazine while loading the sheet side of the machine. Referring to Fig. 33c, it is seen that depression of the start key contacts CST causes a circuit to pass from line 772, through wire 798, relay R62, key contacts CST, wire 799, cam contacts S19, and wire 787 to the other side of the line. Relay R62 then closes associated contacts R62b (Fig. 33a) arranged along with key interlock contacts R74b normally closed in parallel with the usual start key contacts TST. In addition to the parallel connections associated with the start key contacts, there are quite a number of control contacts arranged in series with the starting controls to prevent starting and operating conditions due to the presence of many conditions requiring suspension of tabulating operation or termination of its operation. The start circuit passes through contacts R62b, R74b operated to open when holding the key contacts CST closed too long manually, contacts R55a operated under high sheet conditions, contacts R58a controlled by high card conditions, contacts R72b influenced by the carriage clearing key, contacts R68b operated on a stop during a reset, and contacts R67b operated under the influence of double sheets. The start circuit passes along through wire 799, and then encounters other contacts R61b arranged to stop the tabulator under full sheet conditions, and thence through contacts R104b closed only after a time delay as already explained. The remainder of the circuit is the same as in the ordinary tabulator wiring because at the left it includes line 772, cam contacts P1, tabulating clutch magnet 22, contacts 27 and cam contacts L15, while at the right there are series connections through stop key contacts SP, closed contacts EPRa (not operated because paper end control is omitted), upper control contacts R19a (closed on initial reset cycle), and line 773. Energization of clutch magnet 22 causes opening of contacts 27 and inclusion of relay magnet R340 in the circuit. This relay then closes contacts R340a to complete a circuit through the tabulating motor TM as follows: from line 772, motor TM, contacts R340a and wire 780 to line 773. With both magnet 22 and motor TM energized, the card feed devices are connected and driven by the clutch.

After one card cycle is taken, the machine stops because the upper card lever contacts R4a are not closed when the cam contacts L2 open; therefore, the first card stops before the upper brushes.

The card side of the comparing unit operates in synchronism with the tabulator and the sheet side also operates, and both are fully driven by the checking time of cam contacts L30, Fig. 33b. The circuit is not completed through L30 because contact points R54a in series therewith are open under control of the special minor control relay. The card side of the comparing unit restores at the end of the cycle when cam contacts L37 close. The circuit includes line 772, magnet CR, contacts R72a, contacts R6Ba, cam contacts L37, contacts 788 and line 773. The sheet side of the comparing unit latches up and does not restore on this cycle.

The sheet feed start key is depressed for the second time and associated contacts R62b, Fig. 33a, close to effect a second tabulator starting circuit. Then the card passes under the upper brushes and sets up a reading in the card side of the comparing unit.

The minor control test contracts L36 open at $\frac{1}{16}$ past zero index point (Fig. 32). Relays R53 and R54, Fig. 33a, are not picked up to establish another holding circuit. Since none of the group control series contacts is closed, the relays become ineffective and associated contacts R54c, Fig. 33b, in series with the restoring magnet CR of the card side in the comparing unit, are opened to prevent restoration of the card setting in the comparing unit. Another contact point R54a associated with the control relay R54 is normally closed and connected in series with the comparing unit contact circuit with contacts 748—751 which are used to check up on the comparison between the card and the sheet when cam contacts L30 close. At the 11 index point, contacts L30 close to check through the contact points 748—751 of the comparing unit and there find a high card setting and picks up relays R58, R59, and R73. Relays R58 and R73 hold through relay contacts R58b, cam contacts S3 and L32 while relay R59 remains energized only as long as the cam contacts L30 remain closed. Relay contacts R59a close in series with the restoring magnet SR of the sheet side of the comparing unit and serve to restore the sectors in the sheet side of the unit under control of the tabulator driven restoring cam.

The other relay R58 closes associated contacts R58c and R58d (Fig. 33c) arranged in series with the sheet feed control magnet SF to provide part of two possible circuit paths in preparation for key starting through the relay contacts R62a.

At the same time, relay R58 opens the contacts R58a (Fig. 33a) in series with the tabulating start contacts TST to prevent a key operated starting circuit to be established on the next key selected cycle which is to be devoted solely to sheet feeding.

Since the first card has not passed the lower brushes, the automatic reset connections are maintained and there is nothing to make effective the automatic reset control relay R28 (similar to relay 51 shown in Patent 2,195,851) and therefore contacts R28b remain closed. This auto reset relay R28 (shown in dotted lines) is controlled by summary punching operation and called into operation upon group changes to insure that resetting awaits completion of punching, as explained more fully in Patent 2,195,851. However, when cam contacts L3 close, the reset relay R3 is energized by a circuit through line 772, cam contacts P3, relay R3 normally closed contacts R28b (Fig. 33a), cam contacts L3, switches MIR and MAR, lower relay contacts R19a, line 773 and the tabulator goes into a reset cycle and clears any of the accumulators that may have amount readings. Shortly before the end of the reset cycle, relays R18, R19, R20 and relays R53 and R54 are picked up, causing the opening of relay contacts R54a, Fig. 33b. They in turn prevent the establishment of a comparing circuit.

At the same time contacts R54c close in series with the card setting restore magnet CR, but cannot complete a circuit through cam contacts S18 and L37 because the relay contacts R73a are open at the time. They are opened through the effect of relay R73 held energized by S3 and L32 because of the previous high card indication.

The punch solenoid PS, Fig. 33c, and line spacing magnet LS operate ineffectively during the reset cycle due to closure of cam contacts P13 and P15 and continuation of the circuit through the lower card lever points R8Bc and R8Bd.

Near the end of the reset cycle, relay contacts R54d (Fig. 33c) close in series with cam contacts S7 to prepart part of the automatic sheet feed circuit.

Cam contacts P16 close near the end of the reset cycle, but they are not effective to energize the sheet feed magnet SF because at the same time relay contacts R52a are opened. These contacts are opened because the sheet sensing brush 67j, Fig. 33b, is holding relay R52 effective when there is no sheet at the brushes cooperating with the sheet contact roller 66.

The operator then arranges the ledger sheets so that the uppermost sheet presents an account number agreeing with the card account number reading showing at the indicating window. The sheets are placed in the magazine and move upward into cooperation with the picker mechanism. Then the sheet start key CST is depressed and a circuit is directed through relay R62 (Fig. 33c). The circuit through this relay has been described as passing through cam contacts 19. Relay R62 then closes associated contacts R62a in series with the sheet feed operating magnet SF. The circuit is then completed through line 772, wire 814, magnet SF, contacts R63a, R55b, R58c, wire 800, contacts R58d, R53b, and R62a to the line 787. The picker mechanism then cooperates with the top sheet and pushes it towards the initial set of feeding rolls which carry it down against the stop, where it comes to rest. The sheet side of the comparing unit goes to the zero position. The contact points R52b (Fig. 33b), in series with the circuit breaker contacts 741 and 741' remain open to cut off the impulses to the sector controlling magnets SCM in the sheet side of the comparing unit.

Cam contacts S10, Fig. 33a, close at the 29th index point, but do not serve to start the tabulator because, even though it closes a shunt around the start key contacts, it is ineffective due to the open condition of contacts R58a, held effective by high card relay R58, Fig. 33b, through cam contacts S3 and L32. Shortly thereafter cam contacts S3 open to deenergize the relays R58 and R73. At the 37th index point, cam contacts S2 close in series with the comparing contacts 748—751 and there find a high card setting and again direct a circuit through the pickup coils of relays R58, R59, and R73. Relays R58 and R73 hold through the cam contacts S3, which are closed at the time.

At the 41st index point, cam contacts S18 close to restore the sheet side of the comparing unit, since the restoring magnet SR is made effective through the closure of relay contacts R59a. The reading in the card side of the unit remains fixed because relay contacts R73a are held open as conditioned by the closure of cam contacts S2 at the 37th index point.

Since relay contact R52a, Fig. 33c, is open at the end of the first sheet feed cycle, the sheet feed stops with the first sheet contacting the sheet stop. The second sheet cycle is initiated by another closure of the sheet start contacts CST and energization of relay R62 to close contacts R62a and direct a circuit through the sheet feed magnet SF as already traced. During the second sheet feeding cycle, the first ledger sheet moves past the contact roller 66 (Fig. 33b) and under the account number sensing brushes 67. The sheet then insulates the brush 67j in series with relay R52 and at the middle of the cycle, when cam contacts S1 open, the relay is deenergized. Relay R52 then controls the operation of a series of associated contacts, one of which contact R52a, Fig. 33c, is in series with the sheet feed clutch magnet SF and cam contacts S7 which close on every sheet feed cycle to initiate another feed cycle. The other contact R52b, Fig. 33b, is closed in series with the sheet feed circuit breaker contacts 741 and 741' to set up connections for energization of the setting magnets SCM on the sheet side of the comparing unit. The control exercised by the contact R52d, Fig. 33d, is mentioned before. The functions of the other contacts R52c controlled by the relay are discussed hereinafter. Directly after the 33rd index point, relays R58 and R73, Fig. 33b, which were set up due to a high card reading, are dropped out at the time cam contact S3 opens.

As the first sheet passes the contact roller, a reading is taken in the comparing unit. The reading circuit may be followed from line 772 (Fig. 33b), through wire 801, common contact brush 67c, contact roller 66, sensing brushes 67, setting magnet SCM, wire 802, circuit breaker contacts 741, 741', contacts R52b, and line 773.

At the 37th index point, cam contacts S2 close and direct a testing circuit through the comparing unit contacts. If the operator has inserted the first sheet to coincide with the first card group, an equal setting is sensed by means of the following circuit: When a state of equality exists in the comparing unit, the normally closed contacts 749 and 751 (Fig. 35b) all remain in the normal position and the circuit passes through line 772, wire 803, relays R56, R57, wire 804, and then in series through contacts 749, 751 alternately on the opposite side of the comparing unit, over to L39 and R64a, cam contacts L30 or cam contacts S2 and L31, list contacts 788, and line 773. Contacts L39 are provided to pass the testing circuit around contacts R54a, which are closed only after a control break and open while the machine is in running condition, due to the normal energization of the control magnet R54. However, when the initial card and sheet feeding cycles are being taken, the control relays are set up on a last tabulator reset cycle and held in that condition while sheet feeding is initiated. The holding circuit for relay R56 is established through its holding coil due to the closure of associated contacts R56a in series with wire 805, cam contacts S3, and L32 connected to wire 787, list contacts 788, and line 773.

The other equal control relay R57 closes associated points R57c and R57d in series with the comparing unit restoring magnets SR and CR, respectively. They are effective when cam contacts S18 close in series with the comparing controls. The other relay R56, made effective and held upon an equal condition, closes other contacts R56b (Fig. 33c) in series with the sheet feed control magnet SF to make possible automatic operation of the sheet feed upon closure of cam contacts S7. When S7 closes, the third sheet feeding cycle is initiated. This cycle brings the first sheet around the platen and into a position where control is taken over by the high speed sensing brush 542 (Fig. 33d) and later by the line spacing control brush 545.

At the same time that the first sheet is wrapped around the platen, the second sheet is directed under the comparing brushes 67. While the second sheet effects a setting in the comparing unit, a testing circuit is prevented from flowing therethrough due to the presence of relay contacts R54a, Fig. 33b, in an open condition. Since the second sheet is of a higher account number than the cards passing through the tabulator, the operation of which is then initiated, a premature high sheet condition would be indicated, were it not for the operation of the contacts R54a. At about the 29th index point of the third sheet feeding cycle, cam contacts S10 close (Fig. 33a) and direct an automatic tabulating start circuit through the connections already traced.

Before the tabulating machine is started to effect the printing impressions on the ledger sheet, the sheet is brought to the direct posting position through the operation of feeding rollers cooperating with the platen. The feeding rollers are timed to engage the leading edge of the first sheet and advance it past the heading space, after which the advancing control is taken over by the brushes sensing the marginal perforations. The extent of high speed feeding is determined by the number of previously printed lines and a number of marginal perforations. These perforations are sensed by the high speed control brush 542 (Fig. 33d) in series with cam contacts S16 and made effective through the action of amplifying tube H, the plate side of which is connected to relay R101. Referring to Fig. 33c, it is seen that relay R101 closes contacts R101a in series with the high speed control magnet HS and brake solenoid BS to energize both and thereby operate the clutch to rotate the platen at high speed and release the brake band. The circuit includes line 772, magnet HS, a parallel brake solenoid BS, wire 807, contacts R101a, wire 808, and wire 787 leading to line 773. The high speed magnet HS is held effective as long as brush 542 senses marginal perforations in the edge of the advancing ledger sheet. When the last perforation passes, the brush is insulated and the contacts R101a open to deenergize the magnet HS and BS.

At the same time that the high speed magnet HS is energized, the other brake control magnet BS connected in parallel therewith is brought into operation to relieve the brake pressure on the drum secured to the platen shaft, thereby permitting the free operation of the high speed feeding. Upon the deenergization of the high speed magnet, the brake magnet releases to allow the brake band to engage and prevent overthrow of the platen. Then the line space control brushes 545 become effective to advance the sheet to one line short of the exact posting position. These line space control brushes 545 (Fig. 33d) are also connected in series with cam contacts S16 and cooperate with a contact block 550, having a wire 809 attached to the grid part of the amplifying tube L. The plate element of the tube is connected to relay R100, attached to the positive wire 775. Whenever relay R100 receives an impulse, it closes associated contacts R100a (Fig. 33c) connected in series with the line space operating magnet LS. The circuit through magnet LS includes line 772, magnet LS, wire 810, contacts R100a, wire 808, and auxiliary line 787. During the first item printing cycle and before the printing time, the list cam L35 closes to direct an impulse through the line space control magnet LS so that it operates to advance the sheet one line space to present a blank line ready for the group indication or the first item impression. The circuit through the line spacing magnet LS includes wire 810, relay contacts R8Bd controlled by the relay R8B which is made effective as long as cards are under the lower brushes, and the circuit continues through wire 811, cam contacts L35, and auxiliary line 787.

At the 11th index point of the ordinary tabulator cycle, the item is printed on the sheet by means of the usual printing control. At the same time, cam contacts L34 close in series with the punch solenoid PS. The circuit through the punch solenoid passes from line 772, through solenoid PS, normally closed cam contacts S20, wire 812, relay contacts R8Bc closed whenever cards are under the lower brushes, wire 785, and cam contacts L34 connected to line 787. The punch circuit is also made effective when cam contacts P13 close during a total taking cycle. Cam contacts S20 prevent operation of the punch while the sheet is in motion.

At the time when the second card is passing the upper brushes and the second sheet is passing under the sheet analyzing brushes, at approximately the 35th sheet index point, the sheet side of the comparing unit is set up with a new reading. This is followed at the 43rd sheet index point by a test of the reading of the second card number in the comparing unit which is a new account number when the first account number is related to a 1-card group, but if the 2 cards are related to the same group, the second number is a repetition of the first setting. Cam contacts S2, Fig. 33b, close at the 37th sheet index point, but this time is too early to test the account number selections, so the testing is done later by cam contacts L30 operated at the proper time. Contacts S2 are ineffective because the tabulating controlled cam contacts L31 in series therewith are opened while contacts S2 are closed and remain open until the end of a tabulating cycle.

*One card group*

Although there are usually a plurality of cards relating to one group or account, it is possible that only a single item or summary card, such as the card of account No. 13 (Fig. 3) may relate to an account. Under such conditions, a group change occurs while the single item is being listed on the first sheet. At the 11 tabulator index point, contacts L30 close to check on the comparing unit reading and it may be assumed that an equal reading is present to indicate coincidence of the second card group and second sheet. Contacts L30 pick up relays R56 and R57. Relay R56 is held through its own R56a contact points and cam contacts L32. Relay R57 is deenergized when contacts L30 open. Contacts L30 must be sustained long enough to overlap the closure of cam contacts L37 to trip the comparing unit restoring magnets through closed contacts R57c and R57d. Both sides of the comparing unit are restored due to action of the card drive cams 637 and 638 of the unit.

The other relay R56 closes the points R56b, Fig. 33c, in series with the sheet feed magnet SF, but the automatic restart of the sheet feed can not take place when cam contacts S7 close, because other contacts R54d were opened when the group change took place.

During the operation of the tabulator and coinciding with the detection of a group change, cam contacts L3 (Fig. 33a) close in series with group control relay contacts R19a to call in a total printing and summary card punching operation in the usual way. This operation is described in detail in Patent No. 2,195,851. The tabulator and sheet feeding mechanisms are latched up during the summary punching operation and withheld from operating by controls on wires S93 and S94 extending into the punch. Near the end of this summary operation, auto reset relay R29 (Fig. 33a) is called into operation by punch controls on wires S90 and S91 and it effects closure of contacts R29a in series with the tabulator reset controls. A resetting operation is effected, and during this cycle contacts are closed to call in further operations of the sheet feeding mechanisms.

With switches MAR and MIR, Fig. 33a, closed, a reset cycle is automatically called into action when control relay R19 is deenergized to close the lower contacts R19a. As contacts L3 close at the end of the last card cycle, a circuit is set up as follows: from line 773, lower contacts R19a, switches MAR and MIR, cam contacts L3, contacts R28b, relay R3, cam contacts P3 and line 772. A holding circuit for relay R3 is made up with contacts R3a and wire 104 directly to line 773. At the very end of the cycle, contacts L4 close and a circuit is completed for the reset clutch magnet RCM as follows: from line 773, through wire 104, contacts R3a, contacts L4, magnet RCM, contacts 384c (closed when card feeding is to be stopped), cam contacts P3 and line 772. Magnet RCM then trips the reset clutch mechanism and closes contacts 287' to call the reset motor RM into action. The circuit for the reset motor includes line 772, motor RM, zero button magnet ZBM, contacts 287' and wire 104 to line 773. As the motor operates the resetting mechanism for total taking, contacts P4 close to short circuit contacts 287' and later open to end the reset cycle.

Near the D point in the resetting cycle, control cam contact P16 is closed, a circuit is directed through the sheet feeding magnet SF, contacts R63a, R55b, R56b, R52a, cam contacts L9, wire 813, cam contacts P16 and line 773. While these operations were taking place, the first sheet was standing partially wrapped around the platen, bearing the first item impression and having its leading edge projecting through the ejecting rolls. When the sheet feeding cycle is initiated, and early in the operation, cam contacts S5 close (Fig. 33c) and complete a circuit through the eject magnet EM. The circuit includes line 772, wire 814, eject magnet EM, wire 815, cam contacts S5, wire 816, and auxiliary line 787. The eject magnet then operates mechanical connections to separate the pressure rollers from the platen and engage the ejection rollers, which are rotating rapidly to cause ejection of the first sheet at the rate of 200 feet per minute. Since the pressure rollers are open, the leading edge of the second sheet can find its way around the platen. As the second sheet moves into printing position, cam contacts S10, Fig. 33a, are closed to call in a tabulator starting circuit at the 29th index point of the sheet feeding cycle. The reading of the account number on the third sheet is directed into the comparing unit and is completed by the 35th index point of the sheet cycle.

Multiple card groups

In the illustrated use of the machine, the ordinary occurrence is one involving the presence of a plurality of item cards and a summary card relating to each account. Usually, the summary card is followed by four item cards representing quarterly payments extending throughout a yearly period. As the first card of the group lists on the second sheet, a reading is taken of the second card of the group and is completed at the zero index point of the tabulating cycle. At the 11 index point, cam contacts L30, Fig. 33b, close in series with the comparing contacts, but they are ineffective to check a high sheet reading as they normally would, because at this time contacts R54a are open in the comparing circuit. They are held open at this time because the tabulating control has not yet broken.

The card side of the comparing unit is restored through contacts R54c, R65b, R73a, R71a, and R72a when cam contacts L37 are closed. The reading in the sheet side of the comparing unit is held in since none of the points in series with the restoring magnet SR is closed to operate the restoring mechanism.

The tabulator continues to enter items and endeavor to store all items in the group by setting up the account numbers and restoring the card side of the comparing unit on each cycle. When the end of the card group is detected, the group control breaks shortly after the zero index point in the tabulating cycle on the last cycle, and then contacts R54a close to make effective the operation of the comparing circuit. Since the comparing condition is an equal one, the circuit is directed through relays R56 and R57. Upon detection of the group change, the tabulator goes through summary card punching and total printing operations, after which sheet feeding is automatically initiated by reset cam P16 already mentioned.

When the sheet feed magazine is loaded first, there are times when the operator may try to start operations after loading the magazine and at the same time forget to put the cards in the tabulator. He then resets the tabulator and operates the sheet feed start key. The relay contacts R62b, Fig. 33a, arranged in a shunt around the tabulator start key contacts TST and operated by depression of the carriage start key, cause the operation of one tabulating cycle, but at the same time even though contacts R62a, Fig. 33c, are closed in series with the sheet feed operating magnet, the sheet feeding operation does not take place because contacts R58c, R58d, and R53b are open at the time due to the absence of high card and group control conditions. The tabulator will then be the only part of the mechanism running, and it will continue to operate one cycle at a time until cards appear at the lower brushes. The detection of cards within the tabulator causes initiation of the sheet feeding operation as described hereinbefore with reference to the starting conditions.

High card condition (normal)

As illustrated in Figs. 3 and 3a, the sheets of all accounts are supposed to be assembled in the sheet feed side of the mechanism, but the groupings of the cards lack a showing for many of the accounts. In other words, many accounts lack the representation of new payments in the form of item cards. This brings about the condition wherein the card account number is often higher than the sheet number presented at the same time to the comparing mechanisms. It is a normal condition which requires that the unused sheets be advanced until the related sheet is brought into cooperation with the corresponding cards.

The sheet reading is always set up in the sheet side of the comparing unit while the preceding sheet is positioned to receive group listings at the platen. Therefore, no comparing unit detecting circuit is set up until a group change is detected, indicating that the first card of the group relating to the sheet already represented is passing under the upper brushes and making the setting necessary to afford the check. When the group change is detected, contacts R54a close, Fig. 33b, and when cam contacts L30 close a checking circuit is directed through the comparing contacts.

If the first card of the incoming group is several account numbers higher than the number on the corresponding sheet, which has been already set up, closure of contacts L30 finds a high card reading represented in the comparing contacts. Relays R58, R59, and R73 are then picked up by the following comparing circuit: Line 772, wire 803, relays R73, R58, and R59 in parallel, wire 817, then through one or more of the closed high card comparing contacts 748, contacts R54a, R64a, cam contacts L30, and the normally closed listing lever operated contacts 788 to the line 773. Relay R58 then closes associated contacts R58b to set up a holding circuit for itself and relay R73 through a wire 805 leading to cam contacts S3 and L32. Relay R59 operates contacts R59a to close them in series with the restoring magnet SR of the sheet side of the comparing unit in series with the cam contacts L37, which close to effect the restoration of the sheet side of the unit. Relay R73 opens contacts R73a to prevent operation of the card side restore magnet CR.

The other relay R58 operates to close the associated contacts R58c and R58d, Fig. 33c, in series with the sheet feed control magnet SF in readiness for a sheet feeding operation. At the same time, the relay opens related contacts R58a (Fig. 33a) in series with the tabulating operating circuit. Since a group change has been detected, the tabulator goes into a total recording and summary card punching cycle. This is followed by the usual automatic reset cycle, and when cam contacts P16 close during resetting (Fig. 33c), they effect a sheet feed initiating circuit passing through cam contacts L9 normally closed, contacts R52a, contacts R58c now closed due to the high card condition, contacts R55b, R63a, and then through the sheet feed clutch magnet SF. The sheet then feeds around the platen, but when cam contacts S10, Fig. 33a, close at the 23rd point in the sheet cycle, it cannot start the tabulator because of the open high card control contact R58a in the tabulator start circuit.

The next sheet passes under the sheet analyzing brushes and sets up another high card reading and passes out of the machine through the operations effected by the electrical controls already described with reference to the first sheet.

Assuming that the third sheet is in agreement with the card reading already present in the comparing unit, closure of cam contacts S2 (Fig. 33b) sets up a circuit through the closed equal comparing contacts 749, 751, and a circuit is completed through wire 804 to the equal comparing relays R56 and R57. The circuits through the equal operating relays are held through the closure of cam contacts S3 and, since relay R57 has associated contacts in series with both restoring magnets SR and CR, the closure of cam contacts S18 effects restoration of both sides of the comparing unit.

It should be noted that the high card comparing control relay R59 has associated points present in only one side of the restoring control of the comparing unit, and that is on the sheet side for clearing out all sheet readings encountered during the rapid ejection of sheets to bring about an agreement after a high card reading is sensed.

Since the high card control relay R58 is no longer effective, its associated contacts R58a (Fig. 33a) are allowed to close in series with the tabulating start circuit and the tabulator is again operated. When cam contacts S7 close, Fig. 33c, they trip the sheet feeding clutch magnet at the 46th index point through contacts R54d and R56b which are now closed. The sheet feeds around the platen and is positioned, and then at the 29th index point, cam contacts S10 (Fig. 33a) close to initiate operation of the tabulator to list the items of the incoming card group.

*High sheet condition (abnormal)*

There are times when a ledger sheet becomes misplaced in the pile of sheets. Such an example is shown in Fig. 3, where the sheet of account No. 20 is situated between sheets 13 and 14 instead of being in the usual sequential order. Therefore, when the first card of account 17 is compared with account No. 20, a high sheet condition is detected.

Of course, the reading of the sheet account number is set up in the sheet side of the comparing unit, and the reading is held in there until the end of the listing of the preceding card group on the preceding sheet. Then, at the end of the card group, as the first card of the new account feeds under the upper brushes, control is broken shortly after the zero index point in the tabulator cycle and the minor control relay point R54a (Fig. 33b) closes to direct a comparing circuit through the comparing contacts. Shortly thereafter, cam contacts L30 close and find a high sheet condition and, therefore, set up relays R55 and R71 by means of the following circuit: Line 772, relays R55, R71 arranged in parallel and connected to wire 819, then through one or more of the comparing contacts 750 closed by the high sheet condition, through contacts R54a, R64a, cam contacts L30, contacts 788, to the other line 773. The holding coils of both relays R55 and R71 are maintained energized by a circuit directed through contacts R55a closed in series with wire 805, leading to cam contacts S3 and L32.

Both readings in the comparing unit are latched in. The card side of the comparing unit cannot be restored because relay contacts R54c (Fig. 33b) are open due to the change in control and contacts R71a are also open due to the high sheet condition.

Relay R55 is effective to stop the tabulator and sheet feeding operations of the machine. The related contacts R55b (Fig. 33c) are opened to break the series circuit through the sheet feeding control magnet SF, and at the same time the other related contacts R55a (Fig. 33a) are opened in series with the tabulating operating circuit to suspend operation of the card feed.

Relay R55 is also effective to set up an indicating circuit to warn the operator regarding the high sheet condition. Contacts R55d (Fig. 33c) are closed in series with a green lamp 820, and a circuit may be traced from line 772, through wire 821, lamp 820, contacts R55d, wire 822, and auxiliary line 787.

Since a group change has been detected, the tabulator goes through a total recording and automatic resetting cycle. The minor control relay contacts R54c (Fig. 33b) close during the reset cycle, but operation of the magnet CR and restoration of the card side of the comparing unit is prevented because contacts R71a are open due to the high sheet condition. The closure of cam contacts P16 (Fig. 33c) effected during resetting is not operable to call in the sheet feeding clutch magnet SF, because it will be remembered that relay contacts R55b are open in the clutch circuit. The open contacts R55a (Fig. 33a) in the tabulating operating circuit prevent the sheet feed start contacts R62b from becoming effective and also prevent initiation of tabulator operation by depression of the start keys.

Then the sheet feed latches up with the green lamp lit and no keys are operative except the carriage clearing key. When the clearing key is depressed, contacts CK (Fig. 33c) are closed and a circuit is directed through associated relays R64 and R72. The circuit includes line 772, wire 798, relays R64 and R72 arranged in parallel, key contacts CK, wire 824, wire 799, cam contacts S19, and the auxiliary line 787. Relay R64 then closes associated contacts R64a to set up a holding circuit for both relays R64 and R72 through wire 825 and cam contacts S9. Contacts S9 hold until the 45th point of the sheet feeding cycle.

Relay R64 closes associated contacts R64b arranged in series with the sheet feed clutch magnet SF and thereby causes a single sheet feeding cycle unless the clearing key is held down to cause more than one feeding cycle.

Relay R64 operates other contacts R64a (Fig. 33b) to open them and prevent a testing circuit through the comparing unit. This is done to prevent the possible establishment of an equal check through the closure of cam contacts S2 and automatic starting of the tabulator and operation of the sheet ejection mechanism to stack the sheet, thus losing the sheet in the stacker when it should be taken out and put in its proper place.

Relay R64 performs a third function in closing contacts R64d arranged in series with the restoring magnet SR for the sheet side of the comparing unit. Operation of this magnet serves to cause restoration of the number stored on the sheet side of the comparing unit through a circuit including line 772, magnet SR, contacts R64d, wire 826, cam contacts S18, normally closed contacts L41, wire 787, contacts 788, and line 773.

Relay R72 is also effective to play a part in control during clearing of the high sheet condition. It opens associated contacts R72a connected in series with the restoring magnet CR for the card side of the comparing unit. This is done to prevent restoration of the card number properly set up in the card side of the unit.

Should the clearing key be released, Fig. 33c, the relays R64 and R72 are deenergized at about the 45th index point when the cam contacts S9 open. However, the key should be depressed until the sheet feed is clear of the sheets remaining in the magazine. To accelerate the clearing operation, the sheets should be removed from the magazine before starting the clearing operation. However, even if it is started before removing the sheets in the magazine, no harm is done, as the sheet feed cycles continue as long as the operator depresses the clearing key.

During the first cycle that there is no sheet at the sensing brushes, this fact is sensed by brush 67j (Fig. 33b) and relay R52 is energized through a circuit including line 772, wire 801, common brush 67c, contact roller 66, detecting brush 67j, wire 827, relay R52, wire 828, and line 773. The relay then closes associated contacts R52c (Fig. 33d) in series with a relay R66, which is energized by a circuit including line 772, relay R66, contacts R52c, wire 829, and cam contacts S11 connected to auxiliary line 787. Cam contacts S11 are proportioned to close at the 35th index point, which is later in the cycle than the time when cam contacts S1 (Fig. 33b) open in series with relay R52. The testing time is arranged to be independent of the operation of contacts S1 so that testing for the pickup of relay R66 is delayed as indicated.

When relay R66 is made effective, it closes associated contacts R66a (Fig. 33b) arranged as a shunt around the open contact points R64a, thus making effective a circuit upon the closure of cam contacts S2 to test the contacts of the comparing unit at the 37th index point. Since relay R52 is held energized through the sheet brush 67j during the full cycle, the related contact points R66a remain closed for the test through cam contacts S2.

A high card reading is detected through the comparing unit contacts because a card number is registered without any opposing sheet number and relays R58, R59, and R73 are picked up, thus preparation is made for the starting of a run of sheet feeding cycles through the closed contact points R58c and R58d (Fig. 33c) in series with the sheet feed clutch magnet SF.

Since both contacts R59a and R64d are closed in series with the sheet side restoring magnet SR, the corresponding sectors in the comparing unit are restored. Contacts R73a and R72a open in the card side of the restoring connections to magnet CR to prevent a restoration of the card side of the comparing unit.

Every cycle taken after the first one involving absence of a sheet will close contacts R66a and set up the high card control relays as already explained. Closure of cam contacts S7, Fig. 33c, does not direct an automatic starting circuit through the sheet feeding clutch magnet SF even though contacts R54d and R58c are closed, because at the same time contacts R52a are open to prevent establishment of a circuit.

Either the sheet feed start key or the clearing key may be operated for taking the last cycle after the sheets are past the sheet sensing brushes. In any event, the high card reading is set up so that contacts R58c and R58d are closed to prepare for the initial cycle of a new run of the sheets to be taken with the sheet start key. This is necessary because, if the contacts R66a were not closed on the last cycle of the clearing operation, starting could only be effected with the clearing key, and with contact point R64a connected in the comparing circuit as shown the clearing key would be ineffective to cause a comparison of any kind.

The operator removes the pile of sheets from the stacker and compares the account numbers through the reading of the indicator showing the account identification of the card above the lower brushes. He then rearranges the sheets in the proper sequence and replaces the pile of sheets in the magazine. The first cycle is taken by depressing the sheet feed start key to close contacts CST (Fig. 33c) making relay R62 effective to close contact points R62a in series with the sheet feed clutch magnet SF. The first sheet is then advanced to the initial position against the sheet stop and the machine also stops after this single cycle. The second cycle is also taken with the sheet feed start key to advance the first sheet under the sensing brushes and then all succeeding cycles are called in automatically. The comparison effected on the second cycle operates the equal control relays and tabulating unit operation is initiated as it was during starting conditions. Should the operator place the wrong account sheet on the top of the pile in the magazine, the comparing unit will check either a high sheet or a high card reading and the operation of the machine will be controlled as already explained.

Tabulating

Since the connections for sheet feed control are set up to operate when the tabulator is conditioned to do listing work, there are certain circuit connections to be operated when the machine is set to operate for tabulating. The normally open list control contacts SHC4 (Fig. 33a) must be closed in series with the lower card lever contacts R7a, the automatic restarting contact P2 and start switch SSW. These contacts SHC4 are provided to prevent any normal restarting operation independently of cam contacts S10 when the machine is operated for sheet printing control during listing.

At the same time that the tabulating shifting handle is operated to close contacts SHC4, the other contacts 788 (Fig. 33b) are opened to prevent circuits through auxiliary line 787 and the various sheet control devices during tabulating operation. These last mentioned contacts are normally closed when the sheet controls are in effect. However, during tabulating operation a sheet may be present at the platen and the cam contacts P13 and P15 (Fig. 33c) remain effective to cause punching of marginal feed control perforations along with total printing and also line spacing to be effected along with each printing cycle. The other total control cam contacts P16 are ineffective to cause automatic sheet feeding during tabulating control because at that time contacts R58c and R56b are open.

End of sheet operation

*Normal conditions.*—As already mentioned in connection with the mechanical description, the machine is provided with sheet sensing devices for detecting when the sheet approaches a position wherein printing is effective near the end of the sheet. The last 6 available printing lines are set aside as a safety or end zone into which printing is allowed to progress, but when once effected within that area, the ledger sheet is to be ejected in an off-set position so that the operator knows that the sheet should be removed or turned over to receive items on the blank side of the sheet. The first condition to be assumed is the one wherein the last item and total are within the safety zone without nearing the bottom of the sheet. As the items are being recorded on the sheet, the sheet feed is latched up, but the tabulator mechanism is running and cards are being analyzed to control the printing of the items on the sheet at the platen. During item recording, cam contacts L33 (Fig. 33c) close at the 11 index point during each list cycle. Then, as the platen advances the sheet from the position wherein the printing is 7 spaces from the end of the sheet to a position wherein the 6th line from the bottom stands at the printing line, the lever 570 is operated by the upper edge of the sheet and closes contacts 575. Then the closure of cam contacts L33 sends a circuit through relay R60 as follows: Line 772, wire 830, relay R60, wire 831, contacts 575, cam contacts L33 and line 787. A holding circuit is established for relay R60 through associated contacts R60a connected in series with cam contacts S4 by wire 832.

Relay R60 has a pair of points R60b arranged in series with the offset solenoid OS. The solenoid is made effective by a circuit including line 772, wire 814, solenoid OS, contacts R60b, cam contacts S6 and line 787. The offsetting devices are not effective immediately, since the record sheet often receives more than one item in the end zone before ejection occurs. The items continue to list until a group change is detected and then the machine breaks the control and goes into a total printing and summary card punching operation. An automatic resetting operation takes place and, assuming that the sheet is positioned to receive the total on the third line from the bottom, the sheet advances to that line, but the secondary full sheet control lever 571 is not operated.

During the total printing operation, cam contacts P16 close to energize the sheet feed clutch magnet SF and the sheet feeding operation is started. During the sheet feeding cycle, cam contacts S5 (Fig. 33c) close to effect energization of the eject magnet EM, and that causes closure of the lower eject rollers to grasp the portion of the sheet extending above the platen and drive the sheet up towards the upper eject and offset controlling rollers. Since the offset solenoid is energized at the time, the sheet does not pass through the upper rolls in a straight line, but is grasped by the offsetting rollers arranged at an angle to carry the sheet over towards the left so that it extends out of the pile of sheets in the stacker. The energization of solenoid OS is maintained during sheet ejection by the closure of contacts of relay R60, and this relay in turn is held through the closure of contacts S4. The cam contacts S6 in series with the offset solenoid OS are closed at the beginning of each sheet cycle and open as the end of the sheet passes the offset rollers. These contacts break at the 25th index point before the opening of cam contacts S4, thus the solenoid circuit is opened by contacts S6 instead of by relay points R60b.

*Last line control.*—The second line from the bottom of the sheet is allotted to receiving the last item of any continuous list of items. However, the last line is reserved for a total printing impression should the last item of an account coincide with the second line from the bottom of the sheet. When a group control change is to take place as a last item is printed on the next to last line, a number of controls are effected to ensure that the total of the account is recorded on the same sheet with the items that fill out the recording area of the sheet.

As the sheet spaces from the third line from the bottom to the second line from the bottom, the second sheet sensing lever 571 (Fig. 33c) is operated to close contacts 576. These contacts 576 are also connected in series with the cam contacts L33 which are closed at the 11 index point of the last list cycle and try to establish a circuit through contacts 576 to the relays R61 and R65 relating to a full sheet sensing arrangement. However, earlier in the cycle the group control devices become deenergized and one of the associated relays R53 has contact points R53a in series with the full sheet contacts 576. Therefore, under the present conditions, relays R61 and R65 are not made effective by the closure of contacts 576. Due to the group change, the tabulator goes into an automatic summary punching and automatic resetting sequence of operations. During automatic resetting the platen advances the record ledger sheet to the bottom line and prints the total on the last possible line. Cam contacts P16 close and call in a starting operation of the sheet feed. Since the sheet contact 575 is closed along with the other sheet sensing contact 576, relay R60 is picked up and held while the sheet is being ejected. This causes energization of the offset solenoid OS and operation of the offsetting rollers during the ejection of the full sheet and, therefore, the sheet is thrown out of alignment when it is passed into the stacker.

*Last line reached without total printing.*— There are times when an item is printed on the second line from the bottom of the sheet and this last printed item is taken from a middle card of a group of related records. Therefore, no control break occurs to call for the use of the last line to receive the total impression. As the sheet is advanced from the third to the second line from the bottom, lever 571 is rocked (Fig. 33c) and contacts 576 are closed. At the 11 index point, contacts L33 close and pick up relays R61 and R65 through the closed control relay points R53a. Both relays operate contacts to set up holding circuits. Relay R61 closes contacts R61c to close a holding circuit through wire 832 and cam contacts S4. The other relay R65 closes contact points R65a and a holding circuit is connected through contact points R57b and wire 822 to line 787.

Relay R61 has other contact points R61b (Fig. 33a) in series with the holding circuit of the tabulating clutch relay and in series with the contacts R2b and thereby prevents the holding of the tabulating circuit through the contacts of relay R2 when cam contacts L2 open at the 14th index point. Therefore, the tabulator is stopped and cannot be started until the sheet feed is cleared to remove the full sheet and insert a blank sheet or turn the full sheet over to receive the additional items of the same account.

Relay R61 has other contacts R61d (Fig. 33c) which are closed in series with the red signal lamp 835, which is lit to indicate to the operator that the machine is locked up due to the presence of a full sheet. The circuit through the red lamp includes line 772, wire 821, lamp 835, contacts R61d, wire 822, and line 787. Then the operator is required to clear the machine of sheets with operations of the clearing key as described hereinbefore with relation to a high sheet condition.

The clearing control relay R64 is made effective by key contacts CK and its contacts R64b operate in conjunction with cam contacts S19 to energize sheet feed magnet SF and clear out the sheets. Relay R66 (Fig. 33d) is operated by the contact points R52c to effect closure of its own points R66a (Fig. 33b) to prepare the checking circuit for the entry of a blank sheet. As the full sheet is ejected, contact points R60b (Fig. 33c), made effective by closure of the full sheet lever, control the offsetting of sheet as it passes into the stacker.

Sheet levers 570 and 571 are effective to control sheet offsetting only when they are operated during listing. The lever contacts 575, 576 (Fig. 33c) and relays R60, R61 and R65 are all in series with cam contacts L33 operated only during listing. Therefore, sheets can be advanced past the levers without being offset when moved independent of listing control.

Relay R65, made operative by the full sheet condition, operates to open contacts R65b (Fig. 33b) in series with the resetting control magnet CR for the card side of the comparing unit, so that the card reading is retained for comparison with the incoming blank sheet. These open contacts R65b prevent the closure of cam contacts S18 from effecting restoration of the card reading through the closure of contacts R54c relating to the group change devices.

When the new sheet is passed under the sheet analyzing brushes and the comparing unit sectors are operated, they are prepared for an equal comparison when cam contacts S2 close. Therefore, relays R56 and R57 are made effective. Relay R57 then operates to open contacts R57b (Fig. 33c) to deenergize relay R65. The deenergization of relay R65 permits the closure of contacts R65b (Fig. 33b) in series with the restoring magnet CR for the card side of the comparing unit. The operations are continued with the remainder of the plurality of items posted on the reverse side of the same full sheet or on the recording area of a new sheet.

Full sheet sensing control

As illustrated in the examples prepared in Figs. 3 and 3a, there are times when the operator fails to remove a full sheet even though the sheet has been offset before the operator removes the pile from the stacker. The full sheet may be present under varying conditions, that is, it may be followed by other full sheets of the same account or followed by a blank or partially filled ledger sheet of the same account, the operator failing to remove the full sheet when the new sheet is inserted. It is desired that the machine be controlled so that, if a full sheet is followed by another sheet having room for items, said other sheet also relating to same account number as the full sheet, then operation of the machine should not be suspended. However, if the full sheet is present alone and affords no place for recording the items of the related accounts, then the machine is to be stopped and a third form of signal is to be given showing the operator that a condition is present other than those revealed by the flashing of the red and green lights alone. Both lights are flashed at the same time to give the third form of indication.

The full sheet sensing contacts 576 (Fig. 33c) operated by the lever 571 are effective while the sheet is at the platen and being filled through the operation of printing. However, this control is positioned so that it is not effective early enough to provide a control for the full sheet condition presented when the sheets feed into the machine already filled with items. Then it is desired that the presence of the full sheet be detected before it reaches the platen. For this purpose, the full sheet detecting brush 83 (Fig. 6) is positioned between the sheet stop 299 and the sheet analyzing rollers 66. Referring to Fig. 33d, it is seen that the sensing brush 83 forms part of the circuit through the amplifying tube F in series with the sensing brush and the cam contacts S15, which are timed to close as the last two marginal perforation positions are passing under the brush; in other words, if the sheet passing is filled with items, the margin will be perforated within one or two points from the bottom of the available printing space depending upon whether it was filled with an item or filled with a total appearing in the last possible line. When the brush 83 makes contact through a perforation at the time cam contacts S15 close, a circuit is set up to effect the full sheet control. The circuit may be followed from the negative line 776, through cam contacts S15, sensing brush 83, contact 84, R75a, the grid side of the amplifying tube F, over to the plate side, and through wire 836, relay R103, and the positive line 775. Relay 103 closes associated contacts R103a to set up a holding circuit through wire 837 and cam contacts S14 connected to the negative side of the line.

If the brush station just mentioned were not in the sheet feeding path, an even comparison would be sensed and cam contacts S10 (Fig. 33a) could operate the tabulator start cycle to give an overprint on the last line of the sheet. The "end of sheet" contact 576 (Fig. 33c) functions too late in the cycle to prevent the automatic action of cam contacts S10, even though they would be effective to stop the tabulator before the second printing operation could be posted.

Cam contacts S15 (Fig. 33d) are operated at about the 39th index point, which is early enough to make ineffective the operation of cam contacts S18 or L37 (Fig. 33b), which would otherwise restore the setup in the card side of the comparing unit. Cam contacts S15 are operative only when relay contacts R75a (Fig. 33d) are closed in series with relay R103 because when they are open it is due to absence of a sheet rather than the presence of a full sheet. Relay R75 (Fig. 33b) is in parallel with relay R52 and in series with the sensing brush 67f which senses when there is no sheet at the sheet sensing brushes, as already explained. The full sheet relay R103 operates the points R103b to pick up the relay R67 (Fig. 33d) and hold it as long as cam contacts S14 are held closed. The relay R67 then operates contacts R67a in series with the equal contact point R57d (Fig. 33b) on the card reading restore circuit to open the connections and prevent operation when cam contacts S18 or L37 are closed.

The relay also operates other contacts R67b (Fig. 33a) in the tabulator start circuit to open it and prevent starting operation.

A third set of contacts R67d (Fig. 33d) closed by a relay R67 prepare a circuit through relay R76, but the connections are not completed because cam contacts S21 are open at the time.

The sheet feeding connections are latched up with relays R103 and R67 held up through holding circuits. The tabulator continues to operate to run all the cards relating to the preceding group under the lower brushes and list them on the sheet at the platen. As the last card of the group passes, the control breaks and a check of the standing in the comparing unit is taken when cam contacts L30 close, Fig. 33b. The equal setting in the comparing unit serves to make relays R56 and R57 effective when the tabulator is stopped. Closure of contacts L37 near the end of the last cycle is prevented from restoring the card side of the comparing unit by the open contact points R67a.

The group change calls in automatic summary and reset cycles. When cam contacts P16 close (Fig. 33c), they call into effect a sheet feeding cycle through the closed contacts R56b, R52a and cam contacts L9.

The sheet feeding operation is started and the sheet at the platen is ejected. The full sheet just checked under the sensing brushes and found equal with the card account feeds to the platen and into printing position, but the open contacts R67b (Fig. 33a) in the tabulator start circuit prevent an automatic tabulator cycle when cam contacts S10 close.

Assuming that the conditions are as shown with account No. 25 (Fig. 3a) where the first full sheet is followed by a partially filled sheet of the same account, then an equal condition is detected in the comparing unit. When cam contacts S2 and S3 close, Fig. 33b, they set up and hold the relays R56 and R57 related to the equal comparison control.

The opening of cam contacts S14 (Fig. 33d) serves to deenergize relay R67 during the sheet feeding cycle at point 86, but before it does so cam contacts S21 close and pick up relay R76 through the closed contacts R67d. Relay R76 is then held through its own contacts R76a and the cam contacts S22. Relay R76 has contact points R76a and R76b in the offset solenoid and red signal lamp circuits, respectively, the functions of which are described hereinafter.

The closure of cam contacts S7 calls into operation the automatic starting of the sheet feeding cycle through the closed contact points R56b, R54d, and R52a.

The first full sheet is offset when ejected because the points R76b in series with the offset solenoid OS (Fig. 33c) were closed when relay R76 was energized at the end of the previous cycle. When cam contacts S6 close at the beginning of the next cycle, a circuit is directed through the offset solenoid OS to offset the first sheet of the 2-sheet group. Cam contacts S22 (Fig. 33d) hold the relay points R76b closed until cam contacts S6 open the offset solenoid circuit.

The second sheet of the account group feeds into the printing position and the cam contacts S10 are then enabled to initiate tabulator operation because relay R67 was deenergized on the previous cycle, thus permitting the closure of contacts R67b in the auto start circuit. Relay R67 also allows the closure of contacts R67a (Fig. 33b) in series with the restoring magnet CR of the card side of the comparing unit. The card side of the comparing unit is restored and not latched in again until a group change is detected.

Should the second sheet following the first full sheet be also in a full condition, then the full sheet brush 83 (Fig. 33d) and the controls associated therewith as already described will function again and cause repetition of the cycles which offset and pass out the full sheets to bring a partially filled or blank sheet into printing position.

*Full sheet without following sheet of same account*

The machine is adapted to take care of conditions wherein the operator fails to remove the full sheet and also fails to place another sheet in the pile of sheets to follow after the full sheet. Under such conditions the operation is effective because the second sheet does not produce an equal reading in the comparing unit.

Starting by assuming that the full sheet is passing under the sheet sensing brushes, then the account number reading is set up in the sheet side of the comparing unit and the full sheet brush 83 sets up and controls relays R103 and R67 as already described. The tabulator continues to read the cards of the preceding group and then, when a group change is detected, the tabulator suspends operation. During the last tabulator operation, cam contacts L30 and L32 set up and hold the relays R56 and R57 because an equal condition is sensed in the comparing unit. Meanwhile, the opening of the contacts R67a prevents restoration of the card side of the comparing unit. Due to the detection of a group change, the tabulator goes into summary punching and automatic resetting operations. Late in the resetting operation, cam contacts P16 close to cause initiation of the sheet feeding operation and the preceding sheet is ejected and the full sheet advanced into printing position. Even though the sheet is at the platen, printing is not initiated because contacts R67b are open in the tabulator start circuit, thus preventing automatic starting by the closure of cam contacts S10.

While the full sheet was advancing around the platen, the second sheet, which in this instance is a sheet of another account, was passing under the sheet analyzing brushes and thereby set up in the sheet side of the comparing unit a reading which is bound to be a high sheet reading. When cam contacts S2 and S3 close, Fig. 33b, they set up and hold the relays R55 and R71 connected with the high sheet reading contacts of the comparing unit. Relay R55 then operates to open associated contacts R55b, Fig. 33c, thus preventing completion of the starting circuit for the sheet feed. At the same time, relay R55 opens contacts R55a, Fig. 33a, in the tabulator start circuit to prevent tabulator operations.

The relay R55 exercises a third control in closing contacts R55d (Fig. 33c) in series with the green lamp 820. This visual indication is not the only one given at the time, because contacts R76c have also been closed in series with the red lamp 835. The lighting of both lamps provides a third form of warning to indicate to the operator the condition present in the machine. The red light alone usually indicates an overflow condition and the green light alone is a warning that a sheet is out of order, but when both lights are flashed, it is an indication that a full sheet is present without the presence of another sheet of the same account.

Since the contacts R55b are open, the use of the clearing key is required to remove the sheets from the sheet feeding mechanism. The operator first clears the feeding mechanism by operation of the key and then inserts a new sheet for the same account or turns the full sheet over so that the blank side is presented to receive the printing impressions. As the full sheet is ejected during the clearing operation, it is offset because relay R76 is energized just as it was for automatic ejecting.

*Two-sheet group encountered after a high card reading*

There are times when the full sheet is encountered during sheet feeding cycles set up after a high card reading is established in the comparing unit. When the first sheet of the group, which is the full sheet, is encountered, the comparing unit establishes an equal checking condition, but provisions must be made to prevent printing on the first full sheet. As the full sheet passes under the sheet sensing brushes, its nature is detected by the full sheet brush 83, Fig. 33d, which sets up relay R103 before cam contacts S18, Fig. 33b, close. This is done in order to open contacts R67a in series with cam contacts S18 and thereby prevent restoration of the card side of the comparing unit. The equal but full sheet passes on into printing position by action of cam contacts S7, Fig. 33c, but since the card side of the comparing unit was not restored, the next sheet of the same account is checked against the same card reading. Since the next sheet is also prepared to give an equal reading, a second circuit is directed through cam contacts S7 and another sheet feeding cycle is initiated and the first sheet is offset into the stacker, while the second partially filled sheet is brought into printing position and the tabulator is started to record the items. During such operations the full sheet lamp 835 (Fig. 33c) is lit temporarily while contacts R76c are closed. After recording on the second sheet, the operation is normal from then on.

When an operator removes offset sheets for turning over or replacement, he must glance at the next sheet to determine whether it is of the same account or of a different account number. If of the same account, he must either remove the first offset sheet and file it in an inactive file or replace it in the present file. If the full sheet is not removed, the next posting operation will be carried on in the proper way because of the mechanism described. If the operator turns over the first sheet or replaces it with a new blank sheet, then the next series of posting operations which should go on a second sheet of the same number will be posted on the new sheet where they do not belong. After the posting is effected on the first sheet, the second sheet of the same account will then give a high card indication causing automatic ejection of the sheet.

The full sheet brush does not detect conditions wherein the sheet has items reaching into the end zone but not extending down within the last two lines from the end of the sheet. However, it is proper for the sheets to pass into the printing position and there receive as many items as possible before the end condition is sensed by the sheet lever cooperating with the leading edge of the sheet.

*Automatic jam stop*

When a sheet jams for any reason, it is desirable to sense the fact electrically and automatically stop the sheet feed as soon as possible. Since most jams occur between the sheet sensing brushes and the platen, it is possible to sense the condition wherein a jam is holding up the sheets that should be feeding past the sheet analyzing station.

When the machine is running with the sheets passing through in the normal fashion, the tail of each sheet passes the sheet analyzing brushes at the 14th index point of the sheet feed cycle, whereas if a jam occurs ahead of this station, the tail of the sheet will remain at the brushes or lag behind at this cycle time enough to insulate the jam detecting brush 67j (Fig. 33b). The failure of the circuit to be completed through brush 67j and a control relay R52 is used to exercise control over the operation of the machine depending on the absence of a jam.

At the 15th index point of the sheet feed, cam S13 opens and causes relay R52 to seek another holding circuit which normally exists through brush 67j when the sheets are feeding without a jam. However, should a jam occur, the holding circuit will not be available and then relay R52 is deenergized causing the opening of contact points R52d (Fig. 33d) in the holding circuit for the relay R70, which was energized on some previous reset cycle. Relay R70 still holds through its own contact points R70a and cam contacts S17 until the 18th cycle point, at which time cam contacts S17 open. When relay R70 is deenergized, its associated contact points R70b are open to break the sheet feed motor and amplifier circuits through wire 794. The opening of contacts R70b is not directly effective to cause deenergization of the motor and amplifier circuits, but they come into effect when cam contacts S12 open at the 20th index point in the sheet feeding cycle.

If the amplifier circuit is not opened, the high speed clutch magnet and the line space magnet would be energized as soon as the jammed sheet was removed. Current would be maintained in the clutch controls for an indefinite time and the platen would be operated in a manner found to be undesirable. As soon as the jam is cleared and the machine is restored to the normal conditions with the sheets inserted in the proper fashion, a reset cycle may be taken in order to pick up relay R70 by the closure of the cam contacts P13 (Fig. 33c). This serves to start the sheet feed motor preparatory to restarting a run through the operation of the sheet feed start key.

A sheet feed stop key is provided with contacts SP in series with a relay R63. When the key is depressed, a circuit is set up through line 772, wire 798, relay R63, contacts SP, wire 839 and auxiliary line 787. Relay R63 then opens contacts R63a in the feed control circuit to deenergize the sheet feed magnet SF. It also opens contacts R63b, Fig. 33a, in the tabulator running circuit. A third contact R63c, Fig. 33c, is closed to make relay R68 effective. Relay R68 is held energized through its own contacts R68c and cam contacts S8 for purposes described hereinafter.

During automatic operation of the machine combine it is essential that no operation be instigated at the wrong time by any of the three sheet feed keys, even though they are depressed at any odd time in any cycle or held down continuously. It is also imperative that the correct part of the machine be started after a stop caused by the sheet feed key depression during any one of the various cycles.

To accomplish the above control several key interlock relays and cams are required, the action of which will be described.

Assume a condition exists wherein an equal comparison has just been made, the first one after loading the sheet feed. If the operator accidentally holds the sheet feed start contacts CST down thus picking up relay R62 as soon as cam contacts S19 make, the contacts R62b, Fig. 33a, in the tabulator start circuit will be closed after the 47th point of the equal sensing cycle.

This closure of contacts R62b would effect an operation of the tabulator at the beginning of the next sheet cycle, which cycle is initiated automatically by contacts S7, if it were not for the fact that contacts R74b are then open.

Relay R74, Fig. 33c, is operated in turn by contacts S7 or any other impulse source that can operate the sheet feed magnet to open its points R74b in series with contacts R62b as mentioned. Contacts R74d in series with relay R74 holds the relay energized through cam contacts S8, which do not break to drop the contacts R74b until one half index point before the closure of the correctly timed tabulator start impulse from contacts S19, Fig. 33a.

Thus, even though the sheet feed start key is held down or depressed at any point of the cycle, it cannot start the tabulator at a wrong time in the cycle.

To prevent two sheet feed cycles occurring after only one key depression, cam contacts S19, Fig. 33c, are used in series with both sheet feed start and clear keys and made up only at "O" of the sheet feed cycle. If it were not for this protection, one key depression of 6 cycle points or over would call a second cycle due to the prevention of the required early mechanical restoration of the armature of magnet SF at approximately the 5th point, and the second latch trip that would take place after point 5 or 6. Cam S19 opens at index point 2 to prevent this undesirable action.

After stopping during a reset cycle by using sheet feed stop key, it is required that the start key cause a sheet feed cycle when depressed to start action again. Since there is usually an equal setup just prior to the reset, there are protective contacts open in the start circuit with contacts R62b, Fig. 33a, except the contacts R68b, the action of which is as follows:

When the sheet feed stop key is depressed during a reset, relay R68 is picked up by cam contacts P16 through contacts R63c held closed by the depression of the stop key. Relay R68 holds through its own contacts R68c and cam S8, the purpose of which has already been explained.

The tabulator stops either after completing the reset without calling for a sheet feeding operation through contacts P16 due to open contacts R63a in the sheet feed circuit. Relay 68 is now holding through contacts S8 and keeping contacts R68b open.

After stopping with the sheet feed stop key and when restarting is initiated with the sheet feed start key by operation of contacts CST, the sheet feeding operation alone is called by another start circuit path through contacts R62a, R53b, R68d, R56b, R55b, R63a and magnet SF. The tabulator is prevented from starting by contacts R68b held open in the circuit by means of cam contacts S8.

To prevent a feed back circuit from contacts S7 to relay R68 when stopping during the first card of a posting group, cam contacts L9 had to be added between contacts R54d and contacts R63c. This back circuit was closed as follows: When the stop key was depressed during the cycle involving the first card of a group, when both carriage and tabulator were running, contacts R63c were closed causing the feed back to occur from contacts S7 through contacts R54d, R63c and relay R68, thus picking up R68 which held through its contacts R68c and cam contacts S8. The sheet feed and tabulator both stopped, but contacts R68b held open in the tabulator start circuit and prevented contacts R62b from acting to restart the card run when desired. Cam contacts L9 are now in the circuit and open at all times, but at "D" of tabulator cycle, and thus prevent cam contacts S7 from causing the described feed back.

Provisions are made to allow the operator to again start the sheet feed after a full sheet (red light) stop and avoid the necessity of an equally punched new ledger sheet to take the overflow or balance of the group to be posted. It is expedient to use a blank sheet without any account number perforations. By using an unpunched ledger the operator is able to maintain machine production, whereas it would otherwise be necessary to get the new sheet punched before again starting the run. The blank must be detected and an account number heading punched at some later date, otherwise it will hold up operations during the next posting period.

The operation is as follows: After a full sheet stop, relay R65, Fig. 33c, is holding through contacts R57b (Fig. 33c), closed when relay R57 (Fig. 33b) was dropped by opening of contacts L31, thus keeping its contacts R65b, Fig. 33b, open in the card side of the comparing unit to prevent restoration until another equal account is sensed. Since the operator is planning to use an unpunched sheet, there cannot be an equal comparison so it is necessary to start by some other means.

The sheet feed is cleared by use of clearing key and a blank sheet is placed on top of the pile of sheets to take the other items of the card group, the identification of which is showing in the indicator.

Key contacts CST are depressed two times which brings the blank down to the platen but does not give an equal comparison or an auto carriage start. A third cycle is taken by depressing contacts CST which will position the sheet to be posted around platen and also set up a high sheet indication because the next sheet is related to the next higher numbered account.

Then, to list the group, the emergency tabulator start key contacts EST, Fig. 33a, are depressed which will cause tabulator to start. On the first list cycle, contacts L31 (Fig. 33b) close to pick up relay R57 which then opens contacts R57b (Fig. 33c) and allows relay R65 to drop out, thus closing contacts R65b preparatory to restoring the card side of the comparing unit at the end of the list cycle.

The balance of the group lists on the unpunched sheet, the card side of the comparing unit restores on the first cycle and allows the new group to set up a reading on the second cycle. If there is but one card left to post on the unpunched sheet, it can be seen that the comparing unit will not set up the new card group number, so the machine will stop with a high sheet indication and no reading in the card side of the comparing unit. It then becomes necessary to clear the tabulator and reload in order to get a comparing unit setup.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine for feeding record sheets, a sheet magazine, a sheet stacker, there being a sheet stopping station, a sheet sensing station and a sheet printing station between the magazine and the stacker, six sets of feeding rollers for carrying a sheet from the magazine through the three stations and into the stacker, a main operating means with driving connections to said rollers, means for picking the sheets out of the magazine in succession, a first set of said feed rollers for directing the sheet into the stopping station, a sheet stop, a second set of said feed rollers normally separated, means for aligning said sheet while said stop is effective and said second set of rollers are ineffective, a common means operated by said main operating means after alignment for removing said stop and making said second set of rollers effective to advance the sheet to said sensing station, a third set of said rollers at said sensing station for advancing the sheet to the print receiving station, a platen at said print receiving station, pressure rollers cooperating with said platen to hold the sheet thereon, a fourth set of said sheet feeding rollers located above said platen and separated to be normally ineffective, printing devices cooperating with said platen to record data on said sheet, a common operating means operated by said main operating means after printing for disengaging said pressure rollers and engaging said fourth set of rollers to carry the sheet away from the platen, a fifth set of said feeding rollers for engaging the sheet and directing it into the stacker in a straight line, a sixth set of said feeding rollers mounted at an angle to direct the sheet into the stacker in an offset position, means cooperating with the sheet for sensing the approach of the end of the sheet to the recording position, and means under control of said sensing means for engaging the sixth set of rollers and disengaging the fifth set of rollers so that a full sheet is directed into the stacker in an offset position.

2. In a machine for feeding and sensing ledger sheets bearing account number indicia, said sheets encountering a sheet stopping station and a sheet sensing station along the path of travel, a sheet magazine, means for feeding a sheet out of said magazine to advance it to said stopping station, means for aligning said sheet laterally while it is at said stopping station to bring the center line of the sheet to a predetermined point, means for feeding said aligned sheet from the stopping station through said sensing station, double sets of sensing devices cooperating with said sheet at the sensing station to sense said indicia, said sets of sensing devices being located equal distances from said predetermined point and the center line of said aligned sheet, and common group control devices controlled by either set of sensing devices, whereby sheets may be placed face up or face down in the magazine to receive item impressions on either side and have one or the other of said sets of sensing devices cooperating with the number indicia thereon.

3. In a machine for feeding record sheets past a printing station and a sheet sensing station, means for feeding said sheets to the sensing station and later to the printing station, a jam detecting brush cooperating with the sheets as they pass through said sensing station, a normally energized relay connected in series with said detecting brush, a shunt connection normally established around said sensing brush, means for opening said shunt connection at a time when said sheet is supposed to be past the sensing station, and means under control of said relay for stopping said sheet feeding means when the relay is deenergized by a delayed sheet breaking the circuit through said sensing brush.

4. In a machine for controlling the recording of lines of data on a sheet having an end zone near the bottom of the sheet and feed control indicia revealing the extent of previous printing operations thereon, printing devices, means for operating said printing devices, a lever arranged in the path of said sheet as it passes said printing devices and into said end zone, contacts closed by said lever when the end zone on said sheet is brought into cooperation with the printing devices, sheet ejecting devices comprising a set of normally operating ejection rollers and a set of selective offsetting rollers for directing an ejected sheet into a position offset to the normal position of ejection, electrical devices for calling said offsetting rollers into operation, and a relay controlled by said contacts for operating said electrical devices to select offsetting after a sheet is printed upon in the end zone.

5. In a machine for controlling the feeding of a ledger sheet and the recording of lines of data thereon, said sheet having an end zone near the bottom of the sheet, printing devices, means for operating said printing devices, means for feeding said sheet into cooperation with said printing devices, means for line spacing said sheet as printing progresses, a lever arranged in the path of the top of said sheet as it passes said printing devices and into said end zone, contacts closed by said lever when the end zone of said sheet is brought into cooperation of the printing devices, a second lever arranged in the path of said sheet and operated as the next to the last line on the sheet is brought to the printing line, a second set of contacts closed by said second lever when the next to last line on the sheet is brought into cooperation with the printing devices, sheet ejecting devices comprising two sets of ejection rollers, one set ordinarily operated to eject a sheet in a straight line and a second set to direct the ejected sheet in an offset position, means under control of the first mentioned contacts for calling said second set of ejection rollers into operation, and means under control of said second set of contacts for stopping the machine when the sheet is full.

6. In a machine for feeding record sheets with feed control indicia, means for sensing said indicia, amplifying tubes and control relays connected to said sensing means, means for feeding said sheets, means under control of said relays for controlling operation of said feeding means, auxiliary power lines between which said tubes and relays are connected with a certain polarity, main power lines connected to a plug which is to be connected to a power source regardless of polarity, shiftable contacts connecting said auxiliary power lines to said main power lines, a relay for operating said contacts, and means for operating said relay to reverse the connection of said auxiliary lines to the main lines when the polarity of the plugged main lines disagrees with the certain polarity needed in said auxiliary lines.

7. In a sheet feeding machine, means for feeding the sheets in succession past a sensing station, a motor for operating said feeding means, means for sensing feed control indicia on said sheets, amplifying tubes and relays connected to said sensing devices, means under control of said relays for controlling operation of said feeding means, electrical connections for energizing said motor, tubes and relays, a relay for maintaining said connections and sustaining operation of said motor, tubes and relays, a detecting device at said station for detecting lagging sheets, and means under control of said detecting device for deenergizing said maintaining relay to suspend operation of said motor, tubes and relays when a lagging sheet is detected.

8. In a record controlled machine for feeding ledger sheets, means for analyzing said records, means for feeding said ledger sheets, means for analyzing said sheets, a comparing unit comprising a set of settable sheet members adjusted according to data analyzed on said sheet and another set of settable record members adjusted according to the data analyzed on said records, separate devices under control of said sheet analyzing means and said record analyzing means for controlling the adjustment of said sets of settable members, separate restoring devices for controlling the restoration of said settable members, means for initiating restoration of the record settable members, means for initiating resetting of the sheet settable members, means operated by the sheet feeding devices for controlling operation of the sheet data settable members by the related adjustment devices and restoration of both sets of members by both said restoring devices, and means operated by the record analyzing means for controlling operation of the record data settable members by the related adjustment devices and restoration of both record and sheet setting members by both said restoring devices.

9. In a record card controlled machine for printing and feeding ledger sheets bearing account number indicia, card feeding devices, card sensing devices, sheet feeding devices, sheet sensing devices, printing mechanism, means under control of said card sensing devices for adjusting said printing devices to record items of data on said sheet, a driving means for operating said card feeding and sensing devices, a separate driving means for operating said sheet feeding devices, a comparing unit comprising two sets of settable sectors, means under control of said card sensing devices for adjusting one of said sets to represent the account numbers read by said card sensing devices, means under control of said sheet sensing devices for adjusting the other of said sets to represent the account numbers sensed by said sheet sensing devices, separate operating and restoring bails cooperating with said two sets of comparing sectors, two pairs of controlling cams, one pair operated by said sheet driving means and the other pair operated by said card driving means, one of the two card cams cooperative with the bail in the sheet side of the comparing unit to restore it, and the other operating the bail for setting and restoring the card side of the comparing unit, and of the two sheet cams, one cooperates with the bail in the card side of the comparing unit to restore it while the second sheet cam cooperates with the bail in the sheet side of the comparing unit to operate and restore it, whereby a comparison is made between the account numbers of the sheets and the cards.

10. In a record controlled machine for printing and feeding ledger sheets bearing account number indicia, means for analyzing account number indicia and amount indicia on said record cards, means for feeding the ledger sheets, printing devices, means under control of said card analyzing means for setting said devices, means for operating said printing means to record items of data on said sheets, means for sensing the account number indicia on said sheets before they reach the printing devices, a comparing unit comprising two sets of settable devices, means under control of said card analyzing devices for adjusting one set of settable devices to represent account numbers, means under control of said sheet sensing means for adjusting the other set of settable devices to represent account numbers, comparing condition instrumentalities cooperating with both sets of settable devices and adjusted thereby into one of three positions according to the comparison of account numbers of the cards and sheets, one of said positions representing an equal condition when both account numbers agree, a second position revealing a high card condition, a third position indicating a high sheet condition, devices made operative when said instrumentalities are positioned by a high card condition, and means under control of the last mentioned devices for controlling said sheet feeding means to operate until an equal condition is reached.

11. In a record controlled machine for printing and feeding ledger sheets bearing account number indicia, means for feeding the record cards, means for analyzing account number indicia and amount indicia on said record cards, means for feeding the ledger sheets, printing devices, means under control of said card analyzing means for setting said devices, means for operating said printing means to record items of data on said sheets, means for sensing the account number indicia on said sheets before they reach the printing devices, a comparing unit comprising two sets of settable devices, means under control of said card analyzing devices for adjusting one set of settable devices to represent account numbers, means under control of said sheet sensing means for adjusting the other set of settable devices to represent account numbers, comparing condition instrumentalities cooperating with both sets of settable devices and adjusted thereby into one of three positions according to the comparison of account numbers of the cards and sheets, one of said positions representing an equal condition when both account numbers agree, a second position revealing a high card condition, a third position indicating a high sheet condition, devices made operative when said instrumentalities are positioned by a high sheet condition, a signal lamp, and means under control of the last mentioned devices for lighting said lamp and stopping said card and sheet feeding means.

12. In a record controlled machine for printing and feeding ledger sheets bearing account number indicia, means for feeding the record cards, means for analyzing account number indicia and amount indicia on said record cards, means for feeding the ledger sheets, printing devices, means under control of said card analyzing means for setting said devices, means for operating said printing means to record the analyzed data on said sheets, means for sensing the account number indicia on said sheets before they reach the printing devices, a comparing unit comprising two sets of settable devices, means under control of said card analyzing devices for adjusting one set of settable devices to represent account numbers, means under control of said sheet sensing means for adjusting the other set of settable devices to represent account numbers, comparing condition instrumentalities cooperating with both sets of settable devices and adjusted thereby into one of three positions according to the comparison of account numbers of the cards and sheets, one of said positions representing an equal condition when both account numbers agree, a second position revealing a high card condition, a third position indicating a high sheet condition, means for resetting said settable devices adjusted by the sheet analyzing devices, means for determining when said resetting means is to operate, a clearing key, means under control of said clearing key for operating said reset determining means, and means under control of said instrumentalities for operating said determining means when said instrumentalities are positioned by equal and high card conditions.

13. In a record card controlled machine for printing and feeding ledger sheets bearing account number indicia, means for feeding the record cards, means for analyzing account number indicia and amount indicia on said record cards, means for feeding the ledger sheets, printing devices, means under control of said card analyzing means for setting said devices, means for operating said printing means to record items of data on said sheets, means for sensing the account number indicia on said sheets, before they reach the printing devices, a comparing unit comprising two sets of settable devices, means under control of said card analyzing devices for adjusting one set of settable devices to represent account numbers, means under control of said sheet sensing means for adjusting the other set of settable devices to represent account numbers, comparing condition instrumentalities cooperating with both sets of settable comparing devices and adjusted thereby into one of three positions according to the comparison of account numbers of the cards and sheets, one of said positions representing an equal condition when both account numbers agree, a second position revealing a high card condition, a third position indicating a high sheet condition, three sets of comparing control relays for controlling the card and sheet feeding means to match records of related accounts, means under control of said comparing instrumentalities for selectively actuating one of said sets of relays according to the condition of comparison, means for calling said selective actuating means into action, means for sensing a lagging sheet and detecting a jam of said sheets, and means under control of said jam detecting means for preventing operation of said selective actuating means.

14. In a record card controlled machine for printing and feeding ledger sheets bearing account number indicia, means for feeding the record cards, means for analyzing the account number indicia and amount indicia on said record cards, group control devices cooperating with said card analyzing means for detecting changes in the card groups, accumulating devices operated under control of said analyzing means for adding the amount data represented on the cards, total taking devices cooperating with said accumulating devices, total printing devices operated under control of said total taking mechanisms, means under control of said group change devices for initiating operation of said total printing devices, means for resetting said accumulating devices, means for initiating operation of said resetting devices, means for feeding the ledger sheets, means for initiating operation of said sheet feeding means as an incident to the termination of operation of said resetting means, means for sensing the account number indicia on said sheets before they reach the printing devices, a comparing mechanism, means for adjusting said comparing mechanism under control of said card analyzing devices and said sheet sensing means for comparing the account numbers of the sheets and cards, three sets of comparing controls, means under control of said comparing mechanism for making one of the three controls effective according to whether an equal account number condition, a high card condition, or a high sheet condition is detected as a result of the comparison, means for automatically calling said control effecting means into operation on each cycle of operation of the machine, a clearing key, means under control of said key for operating said sheet feeding means to clear the machine of sheets, means under control of said key for preventing operation of said control effecting means, and means under control of said group control devices for preventing operation of said control effecting means until a change occurs in the card groups.

15. In a record card controlled machine for printing and feeding ledger sheets bearing account number indicia, means for feeding the record cards, means for analyzing the account number indicia and amount indicia on said record cards, group control devices cooperating with said card analyzing means for detecting changes in the card groups, accumulating devices operated under control of said analyzing means for adding the amount data represented on the cards, total taking devices cooperating with said accumulating devices, total printing devices operated under control of said total taking mechanisms, means under control of said group change devices for initiating operation of said total printing devices, means for resetting said accumulating devices, means for initiating operation of said resetting devices, means for feeding the ledger sheets, means for initiating operation of said sheet feeding means as an incident to the termination of operation of said resetting means, means for sensing the account number indicia on said sheets before they reach the printing devices, a comparing mechanism, means for adjusting said comparing mechanism under control of said card analyzing devices and said sheet sensing means for comparing the account numbers of the sheets and cards, three sets of comparing controls, means under control of said comparing mechanism for making one of the three controls effective according to whether an equal account number condition, a high card condition, or a high sheet condition is detected as a result of the comparison, a stop key, means under control of said stop key for preventing operation of said sheet feeding means, means under control of said high sheet set of comparing controls for preventing operation of said sheet feeding means, devices under control of the high card and equal sets of comparing controls for effecting operation of said sheet feeding means, means under control of said group control devices for preventing operation of said sheet feeding means directly after detection of a change in card groups, a start key, and means under control of said start key for effecting operation of said sheet feeding means.

16. In a machine for operating on ledger sheets as controlled by record cards, means for sensing data on the cards, means under control of said card sensing means for printing data on the ledger sheets, ledger sheet feeding mechanism and record card feeding mechanism, comparing means for successively comparing for relative magnitudes between identification data on said ledger sheet and identification data on a plurality of record cards, means controlled by said comparing means for controlling said feeding mechanisms and interrupting feeding of said ledger sheets and causing further feeding of said record cards when said data are in agreement, means controlled by said comparing means for controlling said feeding mechanisms and interrupting feeding of the cards and causing further feeding of the sheets as long as the card data is found to be higher than the sheet data, and means controlled by said comparing means for controlling said feeding mechanisms and interrupting both feeding mechanisms when the sheet data is found to be higher than the card data.

17. In a card controlled machine for operating on ledger sheets, means for analyzing the ledger sheets and record cards, means under control of said card analyzing means for printing data on the ledger sheets, a set-up device controlled by each analyzing means, means for comparing the relative magnitudes of the settings of the set-up devices, means controlled by said comparing means for restoring both devices upon an agreement in their settings, means controlled by said comparing means for operating the sheet device restoring means and preventing restoration of the card set-up device when a high card setting is made, means under control of said comparing means for preventing restoration of the card set-up device when a high sheet setting is made, a clearing key, and means under control of said key for causing operation of said sheet restoring means and preventing restoration of said card set-up device.

18. In a sheet feeding device, a platen, means for recording lines of data on said sheet, recording control means for controlling said recording means, means for feeding a succession of sheets to said platen, pressure rollers cooperating with said platen to hold the sheet thereon, line space devices for operating said platen to advance the sheet, feeding devices for operating said platen to position the sheet thereon, a set of ejection rollers normally separated to be ineffective, means for rotating said rollers, common operating means for lifting said pressure rollers away from the platen and bringing said ejection rollers into cooperation with each other to engage the sheet and carry it away from the platen, means cooperating with said recording control means for detecting completion of recording on said sheet, sequentially operable means called into operation by said detecting means, means under control of said sequentially operable means for initiating operation of said operating means, an operator moved under control of said sheet feeding means, and means under control of said operator for restoring said common operating means to engage said pressure rollers and separate the ejection rollers when a second sheet is fed around the platen by the feeding devices.

19. In a machine for controlling the recording of lines of data on sheets bearing account identifications and having feed control indicia revealing the extent of previous printing operations thereon, means for feeding said sheets successively, printing devices, means for operating said printing devices, said sheet being reinserted to receive additional lines of print, means cooperating with said control indicia and operative upon reinsertion of the sheet for detecting the appearance of a sheet filled with lines of print, means under control of said full sheet sensing means and normally operative to stop the machine when a full sheet is sensed, means settable in agreement with said account identifications, means under control of said settable means for comparing the account identifications of the full sheet and the following sheet, and means under control of said comparing means for initiating operation of said sheet feeding means to cause feeding of another sheet upon agreement of compared account identifications, whereby upon the appearance of a second, unfilled sheet related to the full sheet, the machine stopping means will not be effective.

20. In a machine for controlling the recording of lines of data on record sheets bearing account number perforations and having feed control indicia revealing the extent of previous printing operations thereon, printing devices, means for operating said printing devices, said sheets being reinserted to receive additional lines of print, sheet feeding devices for advancing a reinserted sheet under control of said indicia into a position to receive printing impressions directly under previously recorded lines of print, means settable in agreement with said account number perforations, means under control of said settable means for comparing the account perforations of successive sheets, a pair of full sheet detecting devices, one of which cooperates with the sheet before it reaches the printing devices, said one device being controlled by said indicia when printing occupies all allotted space, means under control of said one device and said comparing means and effective to stop the machine when said sheet is not followed by another sheet of the same account having space to receive additional items, the second of which full sheet detecting devices cooperates with the sheet when it is positioned near the printing devices, said second device becoming effective through cooperation with an edge of the sheet upon detection of an extended sheet allowing space for but a few lines for additional printed items, and means under control of said second device for offsetting a full sheet when it is ejected after printing operation.

21. A machine as set forth in claim 20 including two signal lamps, and means under control of said comparing means for lighting one lamp upon detection that a first sheet is not followed by a sheet of the same account, and means under control of the first mentioned full sheet detecting device for lighting the other of said lamps when a full sheet is sensed before reaching the printing devices, whereby indications are given that a full sheet is present without being followed by another sheet of the same account.

22. In a record controlled machine for printing and feeding ledger sheets bearing account number indicia and having feed control indicia revealing the extent of previous printing operations thereon, means for feeding the record cards, means for analyzing the account number indicia and amount indicia on said record cards, means for feeding the ledger sheets, printing devices, means under control of said card analyzing means for operating said printing means to record said amount data on said sheets, said sheets being reinserted to receive additional lines of print, means for sensing the account number indicia on said sheets before they reach the printing devices, comparing devices including settable means adjusted under control of said card analyzing devices and said sheet sensing means, means cooperating with said comparing devices to provide three controls according to whether the card and sheet numbers are equal, involve a high card condition or involve a high sheet condition, a machine stopping means, a first full sheet detecting device cooperating with the sheet to sense a sheet filled with printing before it reaches the printing devices, said detecting device being controlled by said feed control indicia and effective to call the machine stopping means into action when printing occupies all allotted recording space, means cooperating with said comparing devices and the controls of said detecting devices for initiating operation of said sheet feeding means to cause feeding of another sheet upon agreement of compared account indicia when said sheet is followed by another sheet of the same account, a second full sheet detecting device cooperating with the sheet when it is positioned at the printing device, said second device becoming effective through cooperation with an edge of the sheet upon detection of a fully extended sheet allowing no room for additional printed items, signaling devices, means for controlling said signaling devices by said comparing control means and said first and second detecting devices for displaying three different kinds of indications involving the condition of the machine, one of said indications being effective under control of the comparing control means when a high sheet condition is detected, a second indication being effected under control of said first detecting device when it finds a full sheet, and a third indication being made under control of said second detecting device when it is operated by a fully extended sheet.

23. In a record controlled machine for printing and feeding ledger sheets bearing account number indicia, means for feeding the record cards, means for analyzing account number indicia and amount indicia on said record cards, means for feeding the ledger sheets, printing devices, means under control of said card analyzing means for setting said devices, means for operating said printing devices to record the analyzed data on said sheets, means for sensing the account number indicia on said sheets before they reach the printing devices, a comparing unit comprising two sets of settable devices, means under control of said card analyzing devices for adjusting one set of settable devices to represent account numbers, means under control of said sheet sensing means for adjusting the other set of settable devices to represent account numbers, comparing condition instrumentalities cooperating with both sets of settable devices and adjusted thereby into one of three positions according to the comparison of account numbers of the cards and sheets, one of said positions representing an equal condition when both account numbers agree, a second position revealing a high card condition, a third position indicating a high sheet condition, means for resetting said settable comparing devices adjusted by the card analyzing devices, means for controlling operation of said resetting means, a clearing key for controlling sheet feeding, means under control of said clearing key for preventing operation of said reset controlling means during feeding, means under control of said instrumentalities for operating said reset controlling means when an equal condition prevails, two full sheet detecting devices, one of said detecting devices including a sensing device for detecting a full sheet before it reaches the printing devices and the other detecting device cooperating with the edge of the sheet for detecting full sheets after they pass the platen, devices under control of said two detecting devices for preventing operation of said reset controlling means, and means under control of said instrumentalities for preventing operation of said reset controlling means when high card or high sheet conditions prevail.

24. In a record card controlled machine for printing and feeding ledger sheets bearing account number indicia, means for analyzing the account number indicia and amount indicia on said record cards, group control devices cooperating with said card analyzing means for detecting changes in the card groups, accumulating devices operated under control of said analyzing means for adding the amount data represented on the cards, total taking devices cooperating with said accumulating devices, total printing devices operated under control of said total taking devices, means under control of said group control devices for initiating operation of said total printing devices, means for resetting said accumulating devices, means for initiating operation of said resetting means, means for feeding the ledger sheets, means for initiating operation of said sheet feeding means as an incident to the termination of operation of said resetting means, means for sensing the account number indicia on said sheets before they reach the printing devices, a comparing unit comprising two sets of settable devices, means under control of said card analyzing devices for adjusting one set of settable devices to represent account numbers, means under control of said sheet sensing means for adjusting the other set of settable devices to represent account numbers, comparing condition instrumentalities cooperating with both sets of settable devices and adjusted thereby into one of three positions according to the comparison of account numbers of the cards and sheets, one of said positions representing an equal condition when both account numbers agree, a second position revealing a high card condition, a third position indicating a high sheet condition, means for resetting said settable devices adjusted by the card analyzing devices, means for selecting operation of said resetting means, means under control of said group control devices for preventing operation of said reset selecting means after a change in card groups, a device cooperating with the sheet for sensing the extent of recording present near the end of the sheet, means controlled by said sensing device upon sensing the presence of a full sheet, means under control of said last named means for preventing operation of said reset selecting means when a full sheet is sensed, and means under control of said comparing instrumentalities for preventing operation of said reset selecting means when high card or high sheet conditions prevail.

25. In a card controlled machine for feeding and printing on ledger sheets bearing account number indicia and blank sheets without such indicia, means for feeding the cards, means for sensing data indicia on the cards, devices under control of said sensing means for printing on the sheets, means for feeding the sheets, means for sensing the indicia on said sheets, a comparing means for comparing data to determine the relative magnitude thereof, means under control of said card and sheet sensing means for controlling operation of said comparing means, means under control of said comparing means for initiating operation of said card feeding means and said printing devices when an equal condition is sensed between a sheet and related cards, said initiating means also causing operation of said sheet feeding means alone when a high card comparison is found, and stopping both feeding means when a high sheet condition is sensed, a device cooperating with the sheet for sensing the extent of recording present near the end of the sheet, means controlled by said sensing device upon detecting the appearance of a full sheet, means under control of said detecting means for stopping both feeding means when a full sheet is detected, sequentially operable means called into operation by the last mentioned stopping means for automatically restarting operation of said sheet feeding means, means under control of said comparing means for preventing control by said automatic restarting means until an equal condition is created by a new sheet bearing number indicia agreeing with the card data, a clearing key, means under control of said key for operating said sheet feeding means to feed a blank sheet independent of said initiating means and control by the comparing means, a start key, and means under control of said start key for operating said card feeding means independent of said initiating means and control by the comparing means.

26. A machine according to claim 25, in which the comparing means comprises two sets of adjustable sectors, one set adjusted under control of said card sensing means and the other set adjusted under control of the sheet sensing means, means for restoring the card sectors, means for restoring the sheet sectors, means under control of said full sheet detecting means and said initiating means for normally preventing operation of said card sector restoring means until an equal condition is sensed after the appearance of a full sheet, and means operated as an incident to operation of card feeding as controlled by said start key to prepare for listing on a blank sheet, for disabling said preventing means and allowing restoration of said card sectors.

27. In a card controlled machine for operating on ledger sheets bearing identification data, data registering means, means for sensing the identification data on said sheets, means under control of said sensing means for effecting a setting of said registering means to represent the identification data found on a ledger sheet, card feeding means, means for sensing identification data on said cards, other data registering means, means under control of said card sensing means for effecting a setting of said other data registering means to represent the identification data found on the cards, means under control of both of said data registering means for repeatedly comparing said setting of identification data of said ledger sheet with identification data of each of a plurality of record cards, means for sensing other data on said record cards, printing means, a plurality of devices controlled by said comparing means for rendering said card feeding means operative to feed cards and enable said other sensing means to control said printing means to record an entry on said ledger sheet for each record card whose identification data are in agreement with the identification data on the ledger sheet, sheet feeding means, and means under control of said comparing means for automatically operating said sheet feeding means to eject non-agreeing sheets until an agreement is reached, one of said plurality of devices under control of said comparing means serving to suspend operation of said card feeding means while said non-agreeing sheets are being ejected, said one of the plurality of devices also serving for automatically resuming operations of the card feeding means when an agreeing sheet is compared.

FRED M. CARROLL.
JOHN H. BAKELAAR.
WILLIAM B. POND.

(References on following page)

REFERENCES CITED

The following references are of record in the file of this patent:

UNITED STATES PATENTS

| Number | Name | Date |
|---|---|---|
| 1,202,189 | Hoe | Oct. 24, 1916 |
| 1,224,645 | Hunting | May 1, 1917 |
| 1,861,975 | Page | June 7, 1932 |
| 1,972,977 | Carroll et al. | Sept. 11, 1934 |
| 1,993,413 | Mellon | Mar. 5, 1935 |
| 2,000,218 | Carroll | May 7, 1935 |
| 2,016,709 | Eichenauer | Oct. 8, 1935 |
| 2,066,029 | Carroll et al. | Dec. 29, 1936 |
| 2,110,853 | Daly | Mar. 15, 1938 |
| 2,131,895 | Kolm et al. | Oct. 4, 1938 |
| 2,149,044 | Clouse | Feb. 28, 1939 |
| 2,150,243 | Page | Mar. 14, 1939 |
| 2,158,872 | Johnstone et al. | May 16, 1939 |
| 2,189,025 | Carroll et al. | Feb. 6, 1940 |
| 2,269,894 | Cleven | Jan. 13, 1942 |
| 2,297,743 | Carroll et al. | Oct. 6, 1942 |
| 2,357,456 | Bryce | Sept. 5, 1944 |
| 2,359,670 | Page | Oct. 3, 1944 |

FOREIGN PATENTS

| Number | Country | Date |
|---|---|---|
| 41,901 | Netherlands | Oct. 16, 1937 |
| 829,248 | France | Mar. 21, 1938 |